(12) United States Patent
Bandy et al.

(10) Patent No.: US 12,494,907 B2
(45) Date of Patent: Dec. 9, 2025

(54) DELIVERING RANDOM NUMBER KEYS SECURELY FOR ONE-TIME PAD SYMMETRIC KEY ENCRYPTION

(71) Applicant: Matrics2, Inc., Warba, MN (US)

(72) Inventors: William R. Bandy, Gambrills, MD (US); Michael R. Arneson, Warba, MN (US)

(73) Assignee: Matrics2, Inc., Warba, MN (US)

( * ) Notice: Subject to any disclaimer, the term of this patent is extended or adjusted under 35 U.S.C. 154(b) by 595 days.

(21) Appl. No.: 17/934,832

(22) Filed: Sep. 23, 2022

(65) Prior Publication Data

US 2024/0022403 A1 Jan. 18, 2024

Related U.S. Application Data

(60) Provisional application No. 63/389,753, filed on Jul. 15, 2022.

(51) Int. Cl.
*H04L 9/08* (2006.01)
*H04L 9/14* (2006.01)
*G06K 19/06* (2006.01)
*H04L 9/40* (2022.01)

(52) U.S. Cl.
CPC .......... *H04L 9/0869* (2013.01); *H04L 9/0894* (2013.01); *H04L 9/14* (2013.01); *G06K 19/06037* (2013.01); *H04L 9/0891* (2013.01); *H04L 63/083* (2013.01)

(58) Field of Classification Search
CPC . H04L 9/14; H04L 9/08; H04L 9/0869; H04L 9/0822; H04L 9/0891; H04L 9/16; H04L 9/40; H04L 9/0894; H04L 63/083; H04L 63/08; G06K 19/06037
See application file for complete search history.

(56) References Cited

U.S. PATENT DOCUMENTS 10,579,830 B1 * 3/2020 Bendersky ............ G06F 21/602
12,278,894 B2 * 4/2025 Chu ........................ H04L 9/16
(Continued)

OTHER PUBLICATIONS

International Search Report and Written Opinion received for PCT Application No. PCT/US2022/076940, mailed on Jan. 5, 2023, 11 pages.

*Primary Examiner* — Shaqueal D Wade-Wright
(74) *Attorney, Agent, or Firm* — WEAVER IP L.L.C.

(57) ABSTRACT

Techniques are disclosed for the provisioning of secure keys to an application. A first globally-unique value of a plurality of globally-unique values is received via a user interface of the application. The first globally-unique value and an application identifier of the application is provided to a computing system via a network. The computing system is configured to determine a second globally-unique value and a third globally-unique value associated with the first globally-unique value based on the application identifier. The second globally-unique value is then received via the user interface. The second globally-unique value is designated as a first secure key. The first secure key is stored in a first location of a memory of the computing device allocated for the application. A third globally-unique value is received via the user interface. The third globally-unique value is designated as a buffer key.

15 Claims, 31 Drawing Sheets

(56) References Cited

U.S. PATENT DOCUMENTS

| | | | |
|---|---|---|---|
| 2016/0149879 A1* | 5/2016 | Haynes | H04L 63/067 |
| | | | 713/170 |
| 2017/0033925 A1* | 2/2017 | DeNeut | H04L 9/0819 |
| 2018/0069698 A1 | 3/2018 | Hong et al. | |
| 2020/0344048 A1* | 10/2020 | Fischer | H04L 9/0819 |
| 2021/0211279 A1 | 7/2021 | Nix | |
| 2022/0394026 A1* | 12/2022 | Liu | H04L 63/08 |
| 2023/0147221 A1* | 5/2023 | Fileccia | H04L 9/0631 |
| | | | 340/572.1 |
| 2024/0056438 A1* | 2/2024 | Bandy | G06K 19/06056 |

* cited by examiner

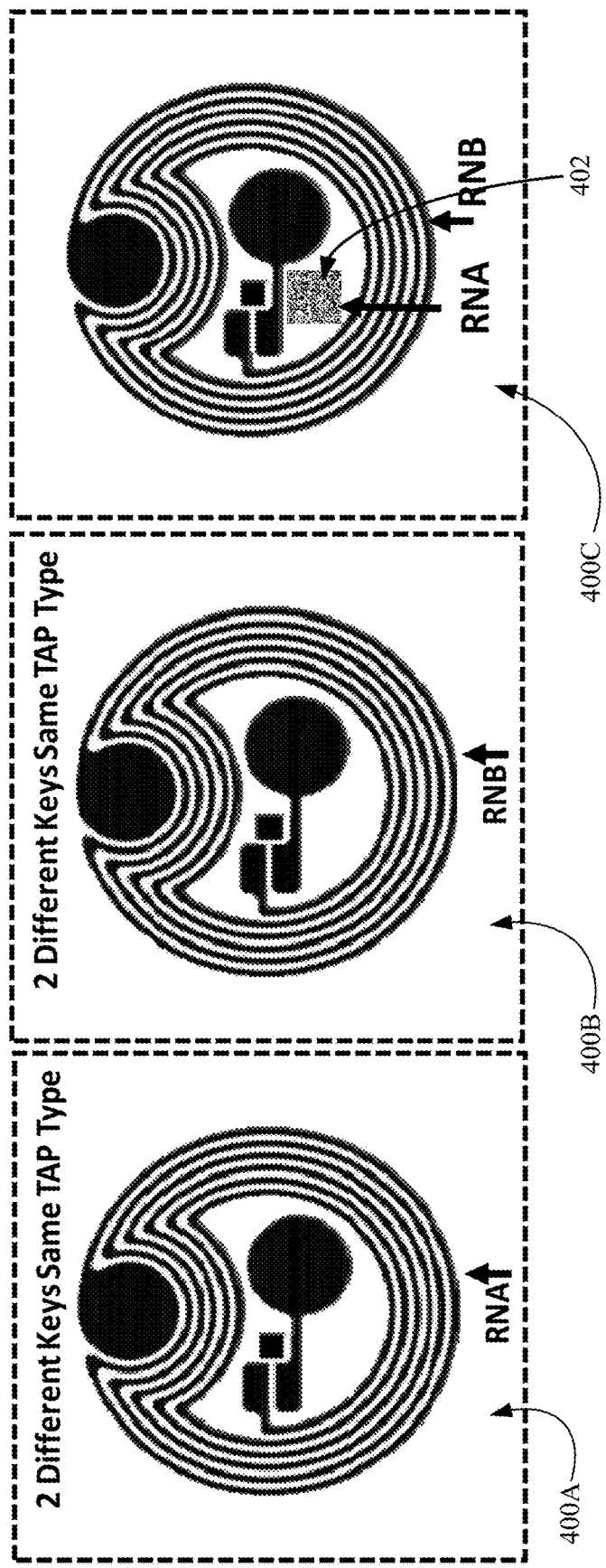
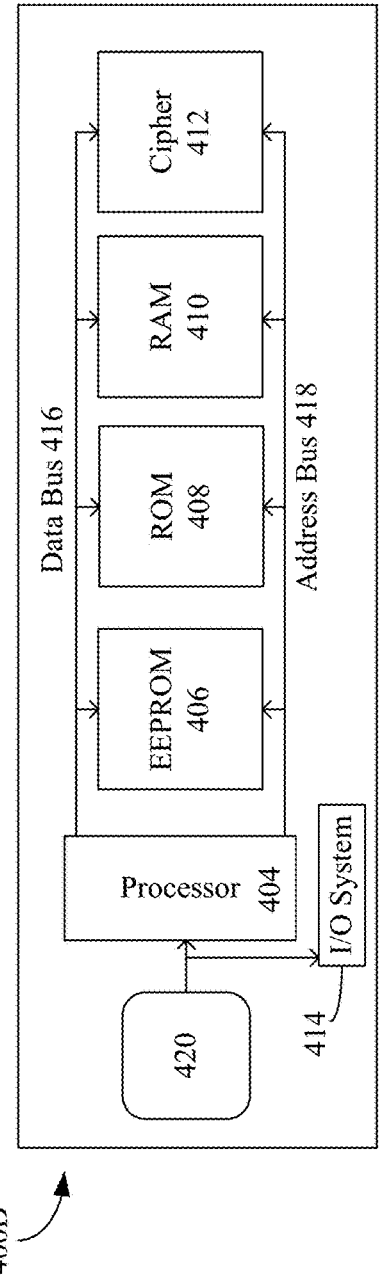
FIG. 4A
FIG. 4B

*The Random Number Distributed Database Nesting*

RNID Secure Treasury Databases
- Send RNID's to Converters

Converter RNID Secure Treasury Database
- Converter puts RNID's into Tags
- Converters send Tags to Manufacturers

Manufacturers RNID Secure Treasury Database
- Manufacturers put RNID Tags onto Product (if desired, can add a digital fingerprint photo into the database)
- Manufacturers put RNID Tags onto Package, Case, Pallet, etc.
- Manufacturers give Distributers enough Tamper Tags for all transit stop

Distributers RNID Secure Treasury Database App
- Distributer reads RNID Tags on Pallets (including all cases, packages, and product RNIDs) when loading truck
- Distributer puts RNID Tamper Tag on Vehicle
- Distributer's Driver reads RNID Tamper Tag on Vehicle which includes whole truck manifest
- Distributer's Driver needs to read with application Tamper Tag at every stop which is recorded via GPS
- Distributer's Driver drops each Merchant's pallet, which subtracts from distributer's manifest and is then added to Merchant's manifest with tap from distributer's application to merchant's application as a secure transaction using RNID's

Merchants RNID Secure Treasury Database
- Merchant puts RNID Tags received directly from customers facility onto front of aisle and onto desired shell locations for specific shelves for specific products and added to merchant's database for isolated locations of every merchant's product.

Customers Private RNID Secure Treasury Database
- Customer purchases product
- Merchant reads customers product RNID and prints customers receipt with QRC RNID specifically for that unique item
- Customers private database can then be tied to that RNID and any specific information from web sources and could be data-mined

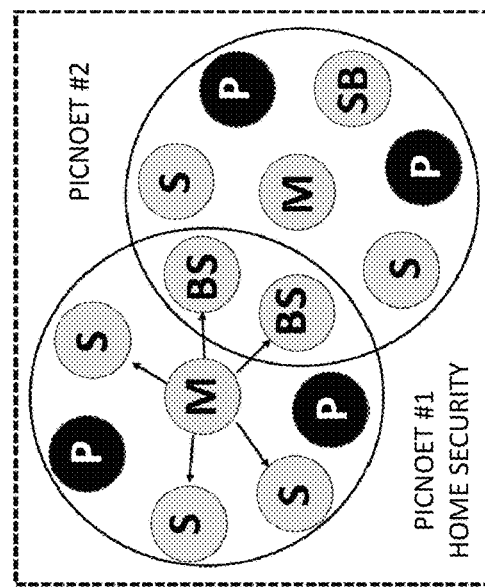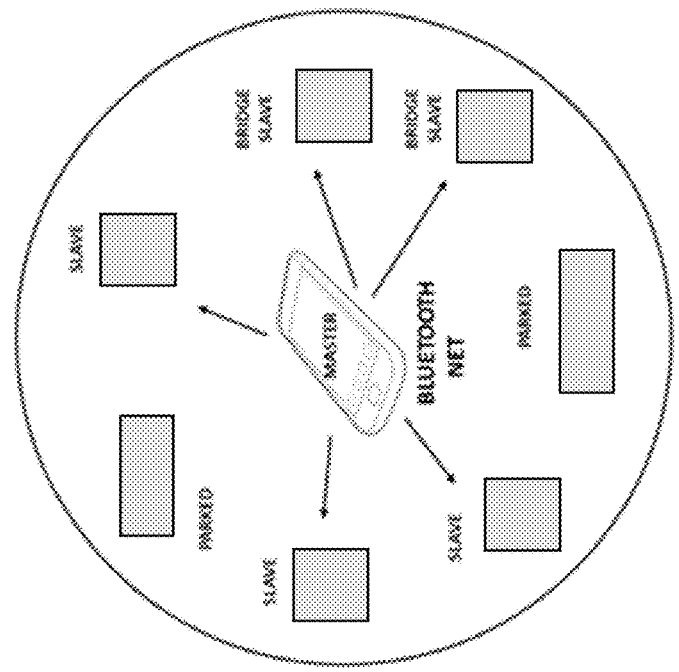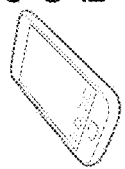
FIG. 20

Enabling Secure Messaging Between SAPs

Sending Secure Messages between SAPs

M = Message
MK = Message Symmetric Key
SK = Symmetric Key
BK = Buffer Key

DELIVERING RANDOM NUMBER KEYS SECURELY FOR ONE-TIME PAD SYMMETRIC KEY ENCRYPTION

CROSS-REFERENCE TO RELATED APPLICATION(S)

This application claims priority to U.S. Provisional Patent Application No. 63/389,753, titled "DELIVERING RANDOM NUMBER KEYS SECURELY FOR ONE-TIME PAD SYMMETRIC KEY ENCRYPTION," and filed Jul. 15, 2022, the entirety of which is incorporated by reference herein.

BACKGROUND

With the technical advancements in cyber security attacks, most experts and researchers are predicting that there will be some form of cyber-crime attack every 11 seconds and will cost businesses globally billions of dollars. Cyber-attacks have already doubled and tripled just over the past few years, especially within the world of the Internet of Everything (IoE).

In simple terms, IoE is defined as the intelligent connection of people, processes, data, and things. Also in its broadest conceptualization, IoE includes any type of physical or virtual object or entity that can be made uniquely addressable and given the ability to transmit specific, defined data about its unique self without any human-to-machine input—such entities are within the Internet of Things (IoT). Entities (or "things") are often simple items that would not normally have been networked in the past; automation of entity communications is also central to the whole of the IoT concept. The IoE also includes user-generated communications and interactions associated with the global entirety of every networked device involved. Just imagine a world where billions of people, objects or things have the ability to detect measure and assess the who, what, where, when, why, and how of their status; but each is connected over individual public or private networks and some using only substandard and/or proprietary protocols.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured for the provision of secure keys to an application. For instance, a first globally-unique value of a plurality of globally-unique values is received via a user interface of the application. The first globally-unique value and an application identifier of the application is provided to a computing system via a network. The computing system is configured to determine a second globally-unique value and a third globally-unique value associated with the first globally-unique value based on the application identifier. The second globally-unique value is then received via the user interface. The second globally-unique value is designated as a first secure key. The first secure key is stored in a first location of a memory of the computing device allocated for the application. A third globally-unique value is received via the user interface. The third globally-unique value is designated as a buffer key.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

FIG. 4A depicts tag devices in accordance with example embodiments.

FIG. 4B depicts a smart card in accordance with example embodiments.

FIG. 20 shows a block diagram of an example secured Bluetooth network in accordance with an example embodiment.

Figure 1:
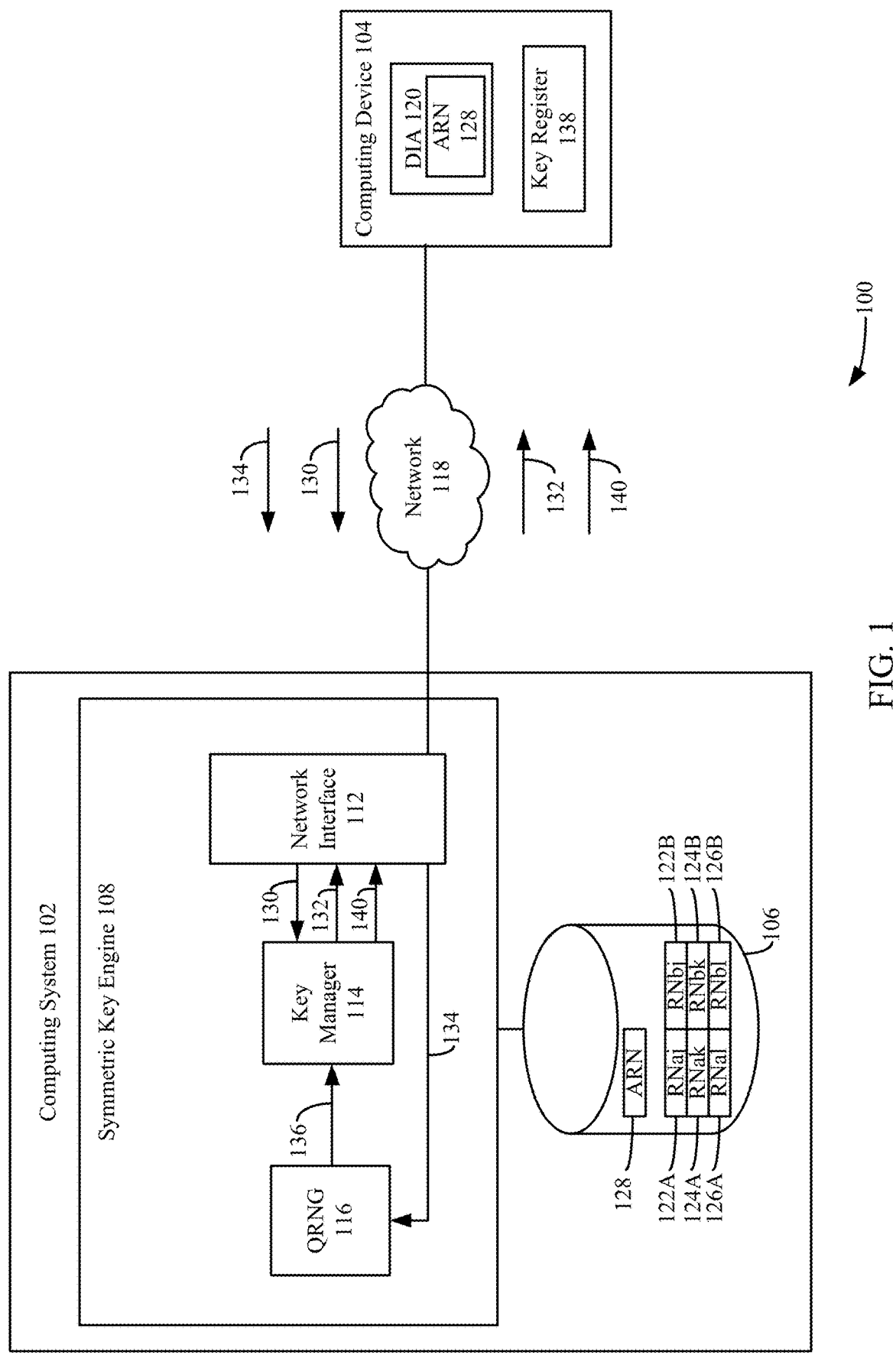
FIG. 1 shows a block diagram of a system configured to provide a secure key to a computing device in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein are directed to the assignment of individual globally-unique random numbers (RNs) to all and every entity that is of interest to be accounted for, where the entity is physical, and is defined as an entity that has a physical existence, an entity that which is perceived or known or inferred to have its own distinct existence (living or nonliving) thing. It also can be a separate and self-contained entity.

The following are only examples, but not limited to things or entities, such as computers, smart phones, smart phone applications, both commercial and consumer products, companies/institutions, software, computer programs, music, personal identification (SSAN (social security account number), Voting IDs etc.). Examples also include a single financial transaction or data within an accounting ledger (e.g., it could be greater than 1 bit of data or many terabytes of data). Simply stated, an entity may be anything that can be described as a physical entity.

Each of those unique physical entities would be assigned its own unique identity with its own unique RN, which is then, in perpetuity, linked or assigned to it within a database or network of databases, where the interface to those database(s) is only through a Database Interface Application (DIA), which can be secured by a Secure Access Portal (SAP).

These unique RNs are generated within a secure central database (SDB), which guarantees their uniqueness, as well as authenticates each of those unique RNs that are being queried from the SDB, ensuring that there aren't any attempts to counterfeit or subterfuge the uniqueness of the RNs. Total security is ensured by the use of a "One-time pad symmetric RN keying system," preventing any human interface into the SDB. The interface to the SDB is via the DIA, having its own unique application RN identification (ID) (ARNID). The DIA may be download from the SDB onto any authorized user's computing/communication device such as a smart phone or smart device. The DIA ARNID would then be able to be used in any transaction, with the SDB protecting both the privacy of the user as well as the security of the SDB. No personal or private user information or data is ever revealed, sent, or stored with any third party. When it is key-secured, the DIA then becomes operative as a Secure Access Portal (SAP). If the DIA is downloaded without an ARNID, it would log into the SDB for the user to enroll for having an ARNID sent to the DIA.

One aspect of the embodiments described herein is similar to that of a global clock or a distributed timestamp server, but instead, a RNID distributed timestamp server is utilized. A RNID timestamp server would work just like those used in bitcoin timestamps by taking a hash of a block of items, but the RNIDs are also timestamped as well. The hash may be published just like in a newspaper or like a public key. The RNID timestamp provides a unique fingerprint to that specific data, to prove that the specific data has existed at some time in space, obviously, in order for anyone to get into any hash, each of the RNID timestamps would have to include each of the previous RNID timestamps in its hash, forming the RNID block chain, and with each additional QRN ID timestamp it would reinforce each of the ones before it. In a different approach it would be such that the RNID supply database would provide RNIDs real time on demand with a time stamp of the time that the RNID had been created, which by definition will be as unique as the RNID, since the RNIDs are created serially at different times. The RNID supply database then retains both the RNID and the associated time stamp for any later authentication or forensics if needed.

This would be similar to a DBMS (database management system) in which transaction logs record all writes to the database to that extent. Each RNID block chain is essentially a Distributed Transaction Log.

In accordance with an embodiment, a quantum random number generator (QRNG) is utilized to generate true random number quantum using quantum physics. Such random numbers may be used as onetime symmetric keys for encryption that are not time stamped to prevent hacking of the keys based on time of use.

A. Secure Key Provision

FIG. 1 shows a block diagram of a system 100 configured to provide a secure key to a computing device, according to an example embodiment. As shown in FIG. 1, system 100 includes a computing system 102 and a computing device 104. Each of computing system 102 and computing device 104 may be communicatively coupled to each other via a network 118. Network 118 may comprise one or more networks such as local area networks (LANs), wide area networks (WANs), enterprise networks, the Internet, etc., and may include one or more of wired and/or wireless portions. Computing system 102 may include one or more server computers, server systems, database servers, cloud-implemented components, and/or computing devices. Computing device 104 may be any type of stationary or mobile computing device, including a mobile computer or mobile computing device (e.g., a laptop computer, a notebook computer, a tablet computer, etc.), a wearable computing device (e.g., a head-mounted device including smart glasses such as Google® Glass™, etc.), or a stationary computing device such as a desktop computer or PC (personal computer).

As also shown in FIG. 1, computing system 102 comprises a symmetric key engine 108 and maintains a database 106. Symmetric key engine 108 comprises a quantum random number generator 116, a network interface 112, and a key analyzer 114. Network interface 112 enables network-based communications with each other components over network 118, such as computing device 104 and database 106. Examples of such a network interface 112, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. It is noted that database 106 may be external to and/or communicatively coupled to computing system 102 via network 118.

QRNG 116 is configured to generate globally-unique number or values (e.g., random number or values) or identifiers (RNIDs). QRNG 116 may be configured to generate a true multi-bit (e.g., 256-bit) unique random number value based on quantum physics (e.g., by utilizing photo polarization techniques, radioactive decay detection-based techniques, etc.). Individual globally-unique RNIDs may be assigned to any entity that is of interest to be accounted for, including both tangible items (e.g., any physical object, including, but not limited to, land, vehicles (and any component thereof), equipment (and any component thereof), inventory, etc.)) and intangible items (e.g., software applications, non-fungible tokens, licenses, trademarks, etc.). Each generated RNID is globally-unique in that no RNID is used twice globally—that is each tangible and intangible item (regardless of its location globally) is assigned an RNID that is different.

To ensure that each RNID generated is globally-unique QRNG 116, each bit output by QRNG 116 may be input to one or more counters, where one counter counts the number of bits having a value of 1 (referred herein as a "bit 1 counter") and another counter counts the number of bits having a value of 0 (referred herein as a "bit 0 counter"). The number of total bits that are provided to the counters may also be counted. In an embodiment in which a 256-bit random number is being generated, at the $256^{th}$ count of total bits, the stream of bits is cut off (e.g., QRNG 116 is suspended and/or the counter temporarily ignores bits inputted thereto), as a 256-bit random number and the total bit counter starts over for the next 256-bit RN count. The 256-bit stream may represent a specific branch within the 256-bit binary tree. The tree starts out empty, and with each new random number, a new branch is created in the tree. If the new branch is duplicative of a previous branch, it is discarded. If not, it is added to the tree. In this way each new random number added to the tree is constantly unique, thus guaranteeing the uniqueness of every random number. Over some given window of bit counts, the bit 0 and bit 1 counters should converge to the same count for both, ensuring a maximum of 50% probability for either a bit having a value of 1 or a bit having a value of 0 at each bit. If an unequal count points to a lack of randomness within the physical process in the generation of the random numbers, it would then need to be corrected. A continual statistical analysis would provide for how wide that bit window should be. It is noted that other techniques for the generation of random numbers may be utilized and that the embodiments described herein are not so limited.

As further shown in FIG. 1, computing device 104 may comprise a database interface application (DIA) 120. DIA 120 may be downloaded from computing system 102. A globally-unique number or value (e.g., generated by QRNG 116) may be assigned to each instance of DIA 120 that is installed on any given computing device and/or associated with any given user of such computing devices. The RNIDs assigned to each instance of DIA 120 may be maintained in database 106. It is noted that database 106 may maintain any number of RNIDs that have been assigned to any given tangible or intangible object or entity. Any of the RNIDs maintained by database 106 may be assigned to any specific person, process data, or thing (either tangible or intangible). In addition, any of RNIDs maintained by database may be associated with another database. For example, suppose one or more of the RNIDs maintained by database 106 are assigned to specific pills or medication. Each of these RNIDs may be associated with one or more databases associated with the manufacturer of the pills or medication. Each unique pill or medication can then be linked to a package or container (which is also assigned an RNID) that it is included in, a box (which is also assigned an RNID) in which the package or container is stored, a pallet (which is also assigned an RNID) on which the box is set on, a shipper, truck, or driver, etc. (each of which being assigned an RNID), that transports the pallet, one or more distribution centers (each of which being assigned an RNDI) that distributes the pallets, a store (which is also assigned an RNID) to which the pallets are distributed, a shelf (which is also assigned an RNID) on which the boxes of mediation are placed, etc.

To prevent any eavesdropping and/or unauthorized use by any malicious party, DIA 120 uses a one-time pad symmetric RN key system for secure communications with authorized user authentication. After DIA 120 has been downloaded to computing device 104, DIA 120 may enroll a user of computing device 104 by first requesting that the user should provide some type of biometric authentication (i.e., fingerprint, facial recognition) input and/or as well as a user created Personal Identification Number (PIN) to verify and authenticate that the proper authorized user is using DIA 120. This information is stored locally in a memory of computing device 104 allocated for DIA 120, and user authentication is achieved locally with DIA 120 comparing the biometric data of the user (e.g., received from a camera of computing device 104) to the biometric data stored locally in computing device 104. If the data matches, then the user is provided access to DIA 120. If not, DIA 120 informs the user that he/she is not authorized to use DIA 120.

After user validation enrollment, DIA 120 instructs the validated authorized user to secure a primary RN secure key (RNSK) for subsequent transaction communication that will always be secured by one-time pad RN symmetric keying, where the RNSK is always updated at every communication as will be further described below. Once the RNSK is obtained, another level of security is achieved by DIA 120 sending facial recognition data to database 106 using the RNSK to secure the communication channel. Once key-secured, DIA 120 becomes operative as a secure access portal (SAP).

One-time pad random number symmetric key systems are generally regarded as the most secure encryption system ever invented. One-time pad random key systems that are utilize done time provide perfect secrecy and are secure attacks using any number of computing resources. Perfect secrecy (or one-time pad random number symmetric keying systems) is conditional by the following requirements: 1) it must be truly random; 2) it can only be used once; 3) it must be kept perfectly secret; and 4) it must have the same bit length as the message that it is encrypting.

The one-time pad symmetric keying system is called that because two identical pads of pages with RNs written on them are securely delivered, one to each of the two parties who wish to communicate securely. User "A" encrypts a message that they want to send to User "B" with the top sheet of the RNs and sends it wirelessly to User "B" who then decrypts the message with the identical RN from the top sheet of his pad. Both parties rip off that first page and destroy it which now reveals page 2, and so on. Such an approach provides perfect simplicity and perfect security, unless the RN is used again, which is a well-known downfall of this type of encryption.

So why isn't this perfect security system widely used today? First, it requires perfect random number or character generation, which is very hard to do. Over the years a number of techniques for generating random numbers have been introduced, but most of them are best described as "pseudo random number generators." Pseudo-random numbers are generated by computers. They are not truly random because when a computer is functioning correctly, nothing it does is random. Computers are deterministic devices—a computer's behavior is entirely predictable by design. So to create something unpredictable, computers use mathematical algorithms to produce numbers that are defined as "random enough." Recently, it has been demonstrated that using quantum phenomenon can achieve true randomness.

Secondly, it is very difficult and often impractical to deliver the one-time pad keys to each user securely. A common approach has been to send keys to the users encrypted with the keys previously sent, which could provide perfect security if the keys were perfectly secure, which has been the downfall. Another approach is to utilize a public-private key exchange protocol for parties to obtain a first key on which to send subsequent keys for the one-time pad symmetric keying, but it has the vulnerability of being broken and hacked into to obtain the first, and therefore all subsequent keys. This vulnerability has prevented obtaining the perfect security of one-time pad random number symmetric keying.

The embodiments described herein are directed to techniques for providing the first (or primary or symmetric) key in a perfectly secure fashion, ensuring the perfect secrecy of subsequent keys and obtaining the promise of the perfect security of one-time pad symmetric keying. Quantum random number generator 116 may be configured to generate pairs of globally-unique random numbers or values and maintain the pairs in database 106. Each globally-unique random number or value in the pair may comprise a 256-bit random number or value. As shown in FIG. 1, database 106 may store, for example, in a table, three pairs of globally-unique random values (pair 122A and 122B, pair 124A and 124B, and pair 126A and 126B). It is noted that database 106 may store any number of pairs (e.g., billions or trillions of pairs). It is further noted that each globally-unique random value may comprise any number of bits and that 256-bits is used herein for purely exemplary purposes. It is further noted that while the embodiments described herein disclose that the globally-unique values are random values, the embodiments described herein are not so limited. That is, each of the globally-unique values described herein may be non-random values (e.g., values determined in a deterministic manner).

The best way to securely deliver secure keys is not to do it wirelessly, over the air, as any eavesdropper could nab it and know all the subsequent keys. The embodiments described herein a method and approach for physical delivery. Each pair of globally-unique random values may be distributed securely via a physically-implemented machine-readable format included into a variety of tamper evident packages or devices. Examples of physically-implemented machine readable formats include, but are not limited to, data encoded in one or more quick response (QR) codes, data stored via near field communication (NFC)/radio frequency identification (RFID) tags, and data stored via Universal Serial Bus (USB) memory sticks. An end user may obtain or purchase such packages or devices (comprising a pair of globally-unique random values) from a retail store, a business, a financial institution (e.g., bank), etc. As described herein, an obtained pair is utilized to obtain a symmetric key using DIA 120. The key pairs are used to ensure maximum security. After a symmetric key is obtained, the user would also destroy or discard the packages or device once opened. The packages or device may be distributed in baskets, bins, or even shelves within retail stores or any other distribution channels that can be imagined. These processes would avoid any "man in the middle attack" between the key pairs and the end user. Unauthorized access by a third party needs to be avoided to ensure key integrity (thereby preventing a third party from reading the key pairs and knowing the intended user of it). As shown in FIG. 1, pair 122A and 122B may be included in a first package or device, pair 124A and 124B may be included in a second package or device, and pair 126A and 126B may be included in a third package or device.

As described above, DIA 120 downloaded onto computing device 104 is assigned its own unique random value (e.g., a 256-bit random number) by computing system 102. The random value assigned to DIA 120 is referred herein as an application random number (ARN) 128. Computing system 102 may maintain ARN 128 for each instance of DIA 120 in, for example, a table of database 106. ARN 128 becomes the user surrogate for database interactions instead of user private information. After download, DIA 120 may enroll the user as an entity authorized to use DIA 120 through an authentication process, such as with a personal identification number (PIN), security questions, and/or biometric input like for example, facial and fingerprint recognition. After authentication, via one or more user interface screens (e.g., graphical user interface (GUI) screen), instructs the user to obtain its first random number (RN) symmetric key (SK) through the process described below.

After a user has obtained their pair of globally-unique random values (e.g., from a retail store, a financial institution, etc.), the user may utilize DIA 120 to obtain a symmetric key. DIA 120 may be configured to walk the user through steps (e.g., via GUI screen(s)) that assist the user to load in their pair. One example is the user will be first instructed to read one globally-unique random value of their pair via the machine-readable format in which it is physically implemented. After reading in the first globally-unique random value of their pair, DIA 120 may send the globally-unique random value of their pair "in the clear" (i.e., without any encryption) to computing system 102, along with ARN 128 of DIA 120, via a message 130. Message 130 may be received by network interface 112, which provides message 130 to key manager 114. For instance, suppose message 130 comprises RNbj 122B (of pair 122A and 122B). Key manager 114 may then associate the other globally-unique random value in the pair (i.e., RNaj 122A) with ARN 128 and designate the other globally-unique random value in the pair (i.e., RNaj 122A) as a first secure key. For example, as shown in FIG. 1, key manager 114 may query database 106 to determine the other globally-unique random value in the pair and associates ARN 128 with the other globally-unique random value (i.e., RNaj 122A) and designates the other globally-unique random value as a first secure key. Key manager 114 may then provide a command 132 to DIA 120 that causes DIA 120 to instruct the user to read the other globally-unique random value of their pair. Command 132 may be provided to network interface 112, which provides command 132 to DIA 120 via network 118. Command 132 causes DIA 120 to instruct the user (e.g., via GUI screen(s)) to read the other globally-unique random value of their pair via the machine-readable format in which it is physically implemented. The other globally-unique random value that is read may be stored in a key register 138 associated with DIA 120 and may be designated by DIA 120 as the first secure key. Key register 138 may comprise a location in memory of computing device 104 that was allocated for DIA 120. After reading in the other globally-unique random value, DIA 120 may instruct the user (e.g., GUI screen(s)) to dispose or destroy the pair so that it destroys its integrity to prevent them from being ever read again. It is noted that computing device 104 may be scanned for viruses before reading in the pair to ensure its integrity before being activated as an SAP.

Figure 3:
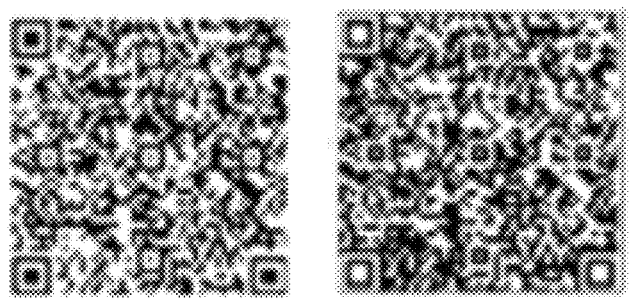
FIG. 3 depicts a quick response code and an inverted quick response code in accordance with example embodiments.
Figure 2:
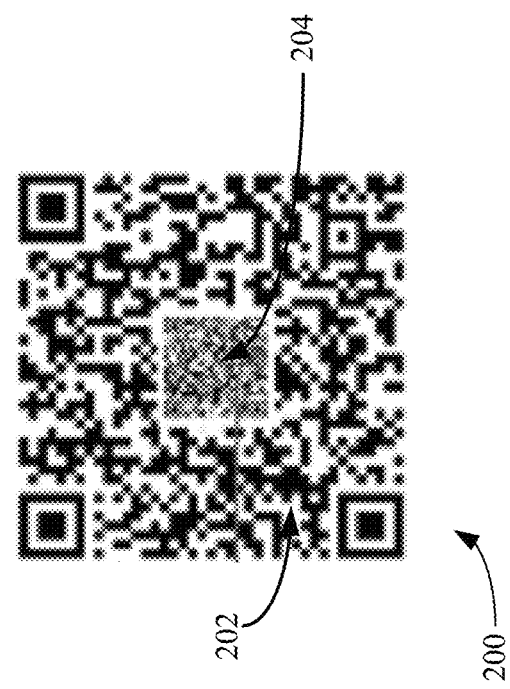
FIG. 2 depicts a nested quick response code in accordance with an example embodiment.

The pair could be read into DIA 120 using various techniques, which are now described with reference to FIGS. 2-4. In accordance with an embodiment, the pair may be stored via a nested QR code 200, as shown in FIG. 2. As shown in FIG. 2, nested QR code 200 comprises a first QR code 202 and a second QR code 204, which is embedded (or included) within first QR code 202. A first globally-unique random value of a pair may be encoded in first QR code 202, and a second globally-unique random value of the pair may be encoded in second QR code 202. To read the first globally-unique random value, DIA 120 may activate a camera included in computing device 102, which first captures QR code 202. Captured QR code 202 is then provided to DIA 120, which decodes QR code 202 to obtain the first globally-unique random value. When the user is instructed to provide the second globally-unique random value, DIA 120 may again activate the camera, which captures second QR code 204. Captured QR code 204 is then provided to DIA 120, which decodes QR code 204 to obtain the second globally-unique random value. It is noted that in certain embodiments, both QR codes 202 and 204 may be captured together and provided together to DIA 120. DIA 120 may decode both QR codes 202 and 204 to obtain the first and second globally-unique random values before receiving command 132. DIA 120 may provide the first globally-unique random value to computing system 104 after obtaining it via QR code 202 and may provide the second globally-unique random value to computing system 104 after obtaining it via QR code 202 and responsive to receiving command 132. It is noted that DIA 120 may be configured to first capture and decode QR code 204 and then capture and decode QR code 202.

In accordance with another embodiment, the pair may be stored via a QR code 300A and an inverted (e.g., a color-inverted) version 300B thereof. For example, as shown in FIG. 3, a first globally-unique random value of the pair may be encoded in QR code 300A. To read the first globally-unique random value, DIA 120 may activate a camera included in computing device 102, which captures QR code 300A. Captured QR code 300A is then provided to DIA 120, which decodes QR code 300A to obtain the first globally-unique random value. When the user is instructed to provide the second globally-unique random value, DIA 120 may generate an inverted version of QR code 300A (shown as QR code 300B) in which the colors of QR code 300A are inverted, as shown in FIG. 3B. DIA 120 then decode inverted QR code 300B and obtains the second globally-unique random value therefrom. DIA 120 may decode both QR codes 300A and 300B to obtain the first and second globally-unique random values before receiving command 132. DIA 120 may provide the first globally-unique random value to computing system 104 after obtaining it via QR code 300A and may store the second globally-unique random value as a secure key after obtaining it via QR code 300B and responsive to receiving command 132. It is noted that DIA 120 may be configured to first capture and decode QR code 300B and then capture and decode QR code 300A.

In accordance with a further embodiment, the pair may be stored via one or more NFC-based tag devices and/or a combination of an NFC-based tag device and a QR code. For example, as shown in FIG. 4A, a first globally-unique random value may be stored in a first tag device 400A, and a second globally-unique random value may be stored in a second tag device 400B. To read the first globally-unique random value, DIA 120 may activate an antenna included in computing device 102, which, when placed in close proximity to tag device 400A, reads the first globally-unique random value stored therein. The read first globally-unique random value is then provided to DIA 120. When the user is instructed to provide the second globally-unique random value, DIA 120 may activate the antenna, which, when placed in close proximity to tag device 400B, reads the second globally-unique random value stored therein.

In accordance with yet another embodiment, a first globally-unique random value of the pair may be stored via a tag device 400C, and a second globally-unique random value of the pair may be stored via QR code 402 included on tag device 400C. To read the first globally-unique random value, DIA 120 may activate an antenna included in computing device 102, which, when placed in close proximity to tag device 400A, reads the first globally-unique random value stored therein. The read first globally-unique random value is then provided to DIA 120. When the user is instructed to provide the second globally-unique random value, DIA 120 may activate a camera included in computing device 104, which captures QR code 402. Captured QR code 402 is then provided to DIA 120, which decodes QR code 402 to obtain the second globally-unique random value. It is noted that DIA 120 may be configured to first capture QR code 402 to obtain a first globally-unique random value and then read tag device 400C second to obtain a second globally-unique random value.

In still a further embodiment, the pair may be stored via a disposable USB device, such as a dongle. The USB device would be available in plastic packaging that would need to be cut open to remove. In accordance with such an embodiment, DIA 120 is configured to read the first and second globally-unique random value from the USB device, which would be inserted in a USB port of computing device 104. After the pair is read, the user would remove the USB device and discard or destroy it. Alternatively, the USB device may comprise logic that automatically deletes the first and second globally-unique random value after they have been read by DIA 120.

In yet a further embodiment, one or more globally-unique random values may be stored on a smart card (also referred to as a contact card). For example, FIG. 4B depicts a block diagram of a smart card 400D in accordance with an example embodiment. As shown in FIG. 4B, smart card 400D comprises a processor 404, one or more memories (e.g., an electrically erasable programmable read-only memory (EEPROM) 406, a read-only memory (ROM) 408, and a random access memory (RAM) 410), a cipher 412, an input/output (I/O) system 414, and an integrated circuit or chip 420. Smart chip 420 may be communicatively coupled to processor 404 and I/O system 414. Processor 404 may be communicatively coupled to EEPROM 406, ROM 408, RAM 410, and cypher 412 via a data bus 416 and an address bus 418. EEPROM 406 may be programmed with a card vendor key and/or one or more globally-unique random values that maybe designated as a secure key and/or a buffer key, as described below. ROM 408 may be programmed with a card identifier (e.g., a 256-bit customer card ID), a fixed distributed key, a fixed card random number (CRN), and/or one or more globally-unique random values that maybe designated as a secure key and/or a buffer key, as described below. Chip 420 serves as an interface by which a card reader may retrieve data stored via EEPROM 406, ROM 408, and/or RAM 410. Cipher 412 may comprise an encryption algorithm configured to secure the data stored on smart chard 400D.

It is noted that globally-unique random values may also be stored via other storage devices, including, but not limited to, a Subscriber Identity Module (SIM) card, a Secure Digital (SD) card, a micro SD card, a compact flash (CF) card, etc.

After reading in the second globally-unique random value via DIA 120, DIA 120 may provide a message 134 to computing system 104 informing computing system 104 that the second globally-unique random value has been stored in key register 138 of DIA 120 as a secure key. Message 134 may be received by network interface 112, which provides message 134 to QRNG 116. Symmetric key engine 108 may then be configured to flush out (i.e., remove) the secure key from key register 138 of DIA 120. For instance, QRNG 116 may then generate anew globally-unique random value 136 which is to be used as a new secure key. Globally-unique random value 136 is provided to key manager 114. Key manager 114 may be configured to encrypt globally-unique random value 126 based on the current secure key (SK1) (e.g., the second globally-unique random value read in via DIA 120 and stored in key register 138). For instance, key manager 114 may perform an N-bit rotation (where N is any positive integer) on SK1 and encrypt globally-unique random value 126 based on the bit-rotated SK1. In accordance with an embodiment, secure key manager 114 utilizes an exclusive OR (XOR)-based encryption scheme, where a bitwise XOR operation is performed on globally-unique random value 136 and the bit-rotated SK1. It is noted that other encryption schemes may be utilized to encrypt the new secure key. Key manager 114 may generate a message 140 that comprises the encrypted, new secure key and provides message 140 to network interface 112. Network interface 112 provides message 140 to DIA 120 via network 118.

DIA 120 obtains the encrypted, new secure key from message 140 and decodes it to obtain the new secure key. For instance, DIA 120 may utilize an XOR-based decryption scheme, where a bitwise XOR operation is performed on the encrypted new secure key and the first secure key (stored in key register 138), which is also bit rotated by the same number of bits N. For instance, DIA 120 may bit rotate the first secure by the same number of bits N and then perform the bitwise XOR operation as described above to obtain the decrypted new secure key. It is noted that other decryption schemes may be utilized to decrypt the encrypted, new secure key. DIA 120 stores the decrypted new secure key in key register 138 (e.g., DIA 120 replaces the old secure key (SK1) with the new secure key (SK2)), thereby flushing the second secure key from computing device 102. The foregoing process may be repeated any number of times (e.g., two or more times), where, in each iteration, the latest secure key provided to DIA 120 is encrypted using a bit-rotated version of the secure key that was sent prior to the latest secure key.

For instance, suppose, in the initial iteration, the SK1 stored in key register 138 is equal to "10110011" and further suppose that QRNG 116 generates a new globally-unique random value "10110010" to be used as a new secure key SK2. To encrypt SK2, key manager 114 performs a 1-bit right rotation on SK1 to obtain "11011001." In an embodiment in which XOR-based encryption is used, a bitwise XOR operation is performed on SK2 and bit-rotated SK1. The resulting encrypted value would be "01101011". This encrypted value would be provided to DIA 120. DIA 120 would decrypt the encrypted secure key based on a 1-bit right rotated version of SK1 (i.e., "11011001"). In an embodiment in which an XOR-based decryption is utilized, the resulting decrypted value would be "10110010," which is the new secure key SK2 generated by QRNG 116 pre-encryption. DIA 120 would store this new secure key in key register 138.

In a next iteration, QRNG 116 generates a new globally-unique random value "10101010" to be used as a new secure key SK3. To encrypt SK3, key manager 114 performs a 1-bit right rotation on SK2 to obtain "01011001." In an embodiment in which XOR-based encryption is used, a bitwise XOR operation is performed on SK3 and bit-rotated SK2. The resulting encrypted value would be "11110011". This encrypted value would be provided to DIA 120. DIA 120 would decrypt the encrypted secure key based on a 1-bit right rotated version of SK2 (i.e., "01011001"). In an embodiment in which an XOR-based decryption is utilized, the resulting decrypted value would be "10101010," which is the new secure key SK3 generated by QRNG 116 pre-encryption. DIA 120 would store this new secure key in key register 138.

This process would continue for any number of iterations. This way, if no one else had access to the starting globally-unique random value pair, then subsequent keys are secure even if an eavesdropper was listening in from the beginning. The final key stored in key register 138 of DIA 120 is used as a symmetric or primary key, which may be utilized in any number of applications. Examples of such applications are described in the Subsections below.

Figure 5:
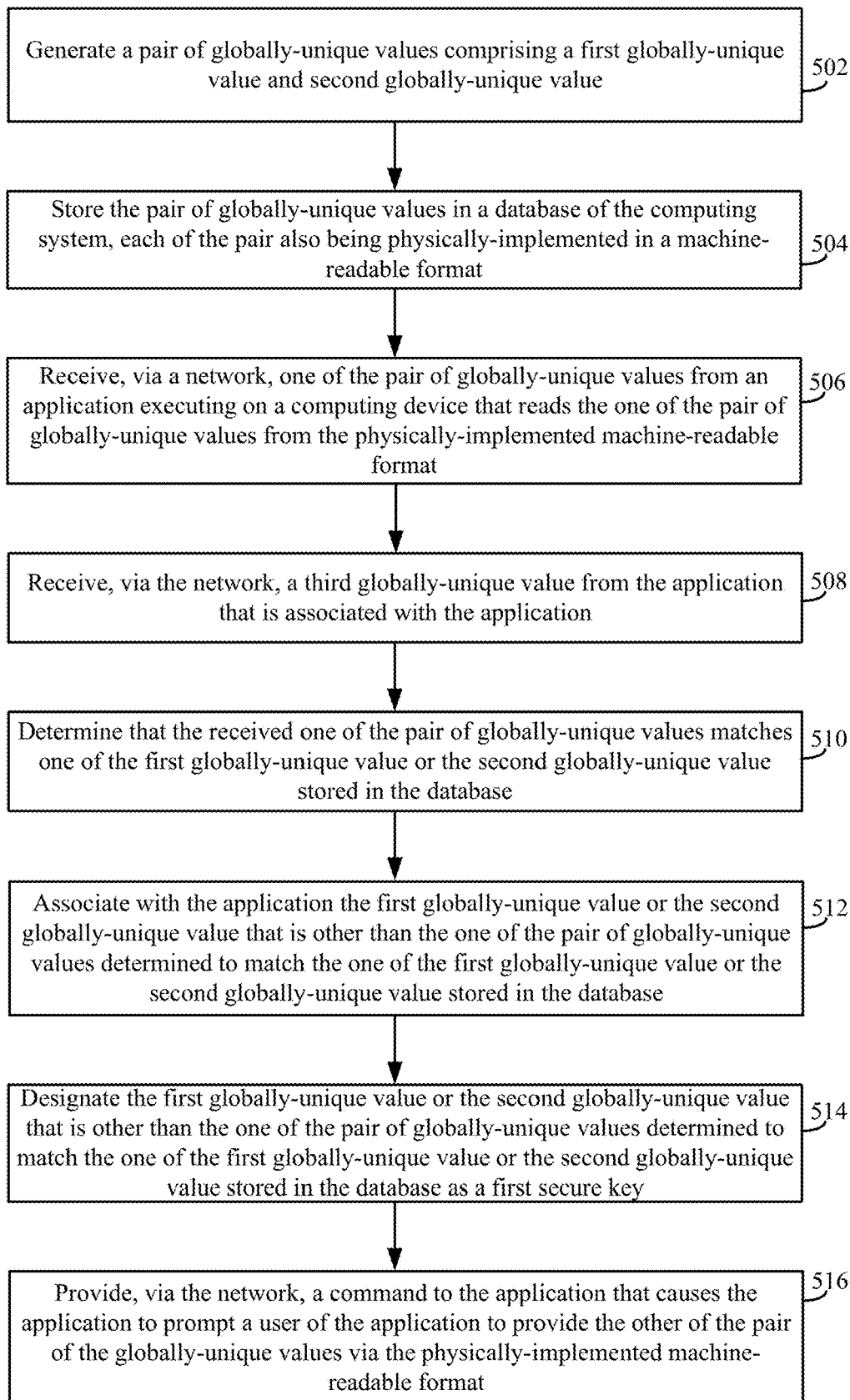
FIG. 5 shows a flowchart of a method for providing a secure key to a computing device in accordance with an example embodiment.

Accordingly, a secure key may be provided to a computing device in many ways. For example, FIG. 5 shows a flowchart 500 of a method for providing a secure key to a computing device in accordance with an example embodiment. In an embodiment, flowchart 500 may be implemented by system 100, as shown in FIG. 1. Accordingly, flowchart 500 will be described with continued reference to FIG. 1. Other structural and operational embodiments will be apparent to persons skilled in the relevant art(s) based on the discussion regarding flowchart 500 and system 100 of FIG. 1.

Flowchart 500 begins with step 502. In step 502, a pair of globally-unique values is generated. The pair comprises a first globally-unique value and a second globally-unique value. For example, with reference to FIG. 1, QRNG 116 generates a pair of globally-unique values (e.g., RNaj 122A and RNbj 122B).

In step 504, the pair of globally-unique values are stored in a database of the computing system, each of the pair also being physically-implemented in a machine-readable format. For example, with reference to FIG. 1, QRNG 116 may store the pair of globally-unique values in database 106. As shown in FIG. 2-4, the pair of globally-unique values may be physically-implemented in a machine-readable format via QR codes 202 and 204, QR codes 300A and 300B, tag devices 400A and 400B, tag device 400C and QR code 402, etc.

In step 506, one of the pair of globally-unique values is received, via a network, from an application executing on a computing device that reads the one of the pair of globally-unique values from the physically-implemented machine-readable format. For example, with reference to FIG. 1, one of the pair of globally-unique values is received via message 130 from DIA 128 of computing device 104. DIA 128 reads one of the pair of globally-unique values from the physically-implemented machine-readable format (e.g., RNaj 122*a*).

In step 508, a third globally-unique value is received, via the network, from the application that is associated with the application. For example, with reference to FIG. 1, a third globally-unique value ARN 128 associated with DIA 120 is received from DIA 120 via a message (e.g., message 130).

In step 510, a determination is made that the received one of the pair of globally-unique values matches one of the first globally-unique value or the second globally-unique value stored in the database. For example, with reference to FIG. 1, key manager 114 determines that the received one of the pair of globally-unique values matches one of the first globally-unique value or the second globally-unique value stored in database 106. For example, the received one of the pair matches RNaj 122A.

In step 512, responsive to determining that the one of the pair of the globally-unique values matches one of the first globally-unique value or the second globally-unique value, the first globally-unique value or the second globally-unique value that is other than one of the pair of globally-unique values determined to match the one of the first globally-unique value or the second globally-unique value stored in the database. For example, with reference to FIG. 1, key manager 114 may update database 106 to form an association between ARN 128 of DIA 120 and the first globally-unique value or the second globally-unique value that is other than one of the pair of globally-unique values determined to match the one of the first globally-unique value or the second globally-unique value stored in the database (e.g., RNbj 122B is associated with ARN 128 in database 106).

In step 514, responsive to determining that the one of the pair of the globally-unique values matches one of the first globally-unique value or the second globally-unique value, the first globally-unique value or the second globally-unique value that is other than the one of the pair of globally-unique values determined to match the one of the first globally-unique value or the second globally-unique value stored in the database is designated as a first secure key. For example, with reference to FIG. 1, key manager 114 designates RNbj 122B as the first secure key.

In accordance with one or more embodiments, the third globally-unique value is associated in the database with the first secure key. For example, with reference to FIG. 1, key manager 114 may associate ARN 128, with the first secure key. In an example in which the first secure key is RNaj 122A, key manager 114 may send a command to database 106 that causes a row of a table comprising ARN 128 to be linked with a column of a row of a table that stores RNaj 122A. Similarly, in an example in which the first secure key is RNbj 122B, key analyzer 114 may send a command to database 106 that causes a row of a table comprising ARN 128 to be linked with a column of a row of a table that stores RNbj 122B.

In accordance with one or more embodiments, the first globally-unique value, the second globally-unique value, and the third globally-unique value are each randomly-generated values. For example, with reference to FIG. 1, the first globally-unique value, the second globally-unique value, and the third globally-unique value are randomly-generated.

In accordance with one or more embodiments, each of the randomly-generated values are generated by a quantum random number generator. For example, with reference to FIG. 1, each of the randomly-generated values are generated by QRNG 116.

In step 516, responsive to determining that the one of the pair of the globally-unique values matches one of the first globally-unique value or the second globally-unique value, a command is provided, via the network, to the application that causes the application to prompt a user of the application to provide the other of the pair of the globally-unique values via the physically-implemented machine-readable format, the other of the pair of the globally-unique values being designated by the application as the first secure key and being stored it in a memory location of the computing device. For example, with reference to FIG. 1, key manager 114 provides command 132 to network interface 112. Network interface 112 provides command 134 to DIA 120 via network 118. Command 132 causes DIA 120 to prompt a user of DIA 120 to provide the other of the pair of the globally-unique values (e.g., RNbj 122B) via the physically-implemented machine-readable format, the other of the pair of the globally-unique values being designated by DIA 120 as the first secure key and being stored it in a memory location (e.g., key register 138) of computing device 104.

Figure 6:
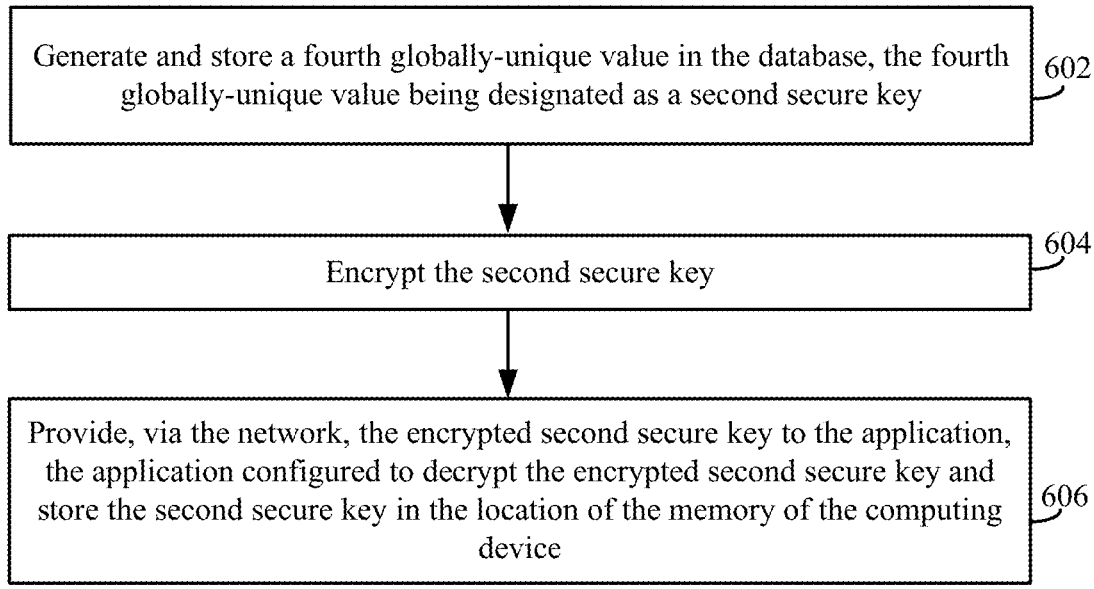
FIG. 6 shows a flowchart of a method for flushing a memory location of a computing device in accordance with an example embodiment.
Figure 7:
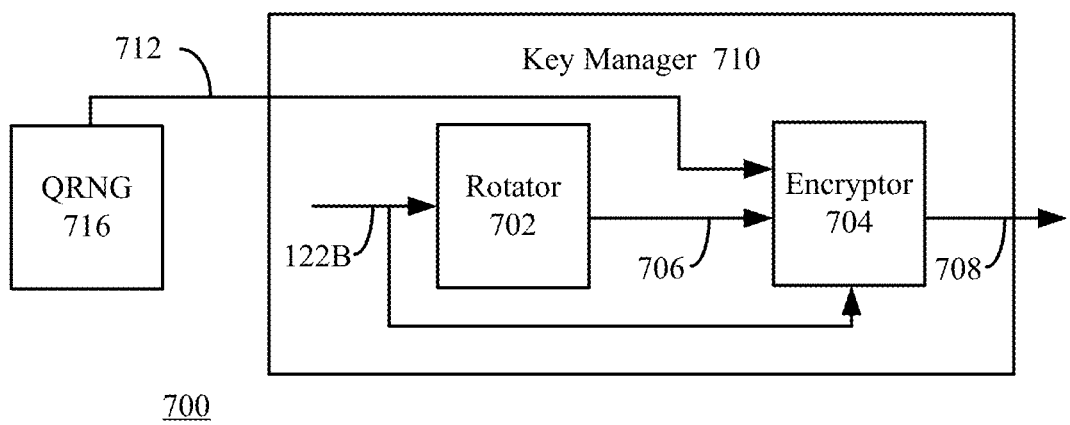
FIG. 7 depicts a block diagram of a system that comprises a quantum random number generator and a key manager in accordance with an example embodiment.

In accordance with one or more embodiments, a flushing operation is performed to clear key register 138 of DIA 120. For example, FIG. 6 shows a flowchart 600 of a method for flushing a memory location of a computing device in accordance with an example embodiment. In an embodiment, flowchart 600 may be implemented by a system 700, as shown in FIG. 7. Accordingly, flowchart 600 will be described with reference to FIG. 7. FIG. 7 depicts a block diagram of system 700 that comprises a QRNG 716 and key manager 714 in accordance with an example embodiment. QRNG 716 and key manager 714 are examples of QRNG 116 and key manager 114, as described above with reference to FIG. 1. As shown in FIG. 7, secure key generator 700 comprises a rotator 702 and an encryptor 704. Other structural and operational embodiments will be apparent to persons skilled in the relevant art(s) based on the discussion regarding flowchart 600 and system 700 of FIG. 7.

Flowchart 600 begins with step 602. In step 602, a fourth globally-unique value is generated and stored in the database. The fourth globally-unique value is designed as a second secure key. For example, with reference to FIG. 7, QRNG 716 generates a fourth globally-unique value 712, which is provided to key manager 710. Key manager 710 may designate fourth globally-unique value 712 as a second secure key and store it a database (e.g., database 106).

In accordance with one or more embodiments, the fourth globally-unique value is generated by a quantum random number generator. For example, with reference to FIG. 7, QRNG 716 generates a fourth globally-unique value 712.

In step 604, the second secure key is encrypted. For example, with reference to FIG. 7, encryptor 704 encrypts the second secure key (e.g., fourth globally-unique value 712).

In accordance with one or more embodiments, to encrypt the second secure key, a bit sequence of the first secure key is rotated by an N number of bits, where N is a positive integer. For example, with reference to FIG. 7, in an example in which the first secure key RNbj 122B, as shown in FIG. 1, rotator 702 may rotate the bit sequence of RNbj 122B by an N number of bits to generate a bit-rotated first secure key 706. Bit-rotated first secure key 706 is provided to encryptor 704. Thereafter, a bit-wise XOR operation is performed on the second secure key and the first secure key rotated by the N number of bits to generate the encrypted second secure key. For example, with reference to FIG. 7, encryptor 704 performs a bit-wise XOR operation on second secure key 712 and bit-rotated first secure key 706 to generate an encrypted second secure key 708.

In step 606, the encrypted second secure key is provided to the application via the network. The application is configured decrypt the encrypted second secure key and store the second secure key in the location of the memory of the computing device. For example, with reference to FIG. 1, key manager 114 may provide message 140 that includes encrypted second secure key 708 to DIA 120 via network 118. DIA 120 is configured to decrypt encrypted second secure key 708 and store second secure key 712 in a location of a memory (e.g., key register 138) of computing device 104, thereby replacing the first secure key that was stored therein.

Figure 8:
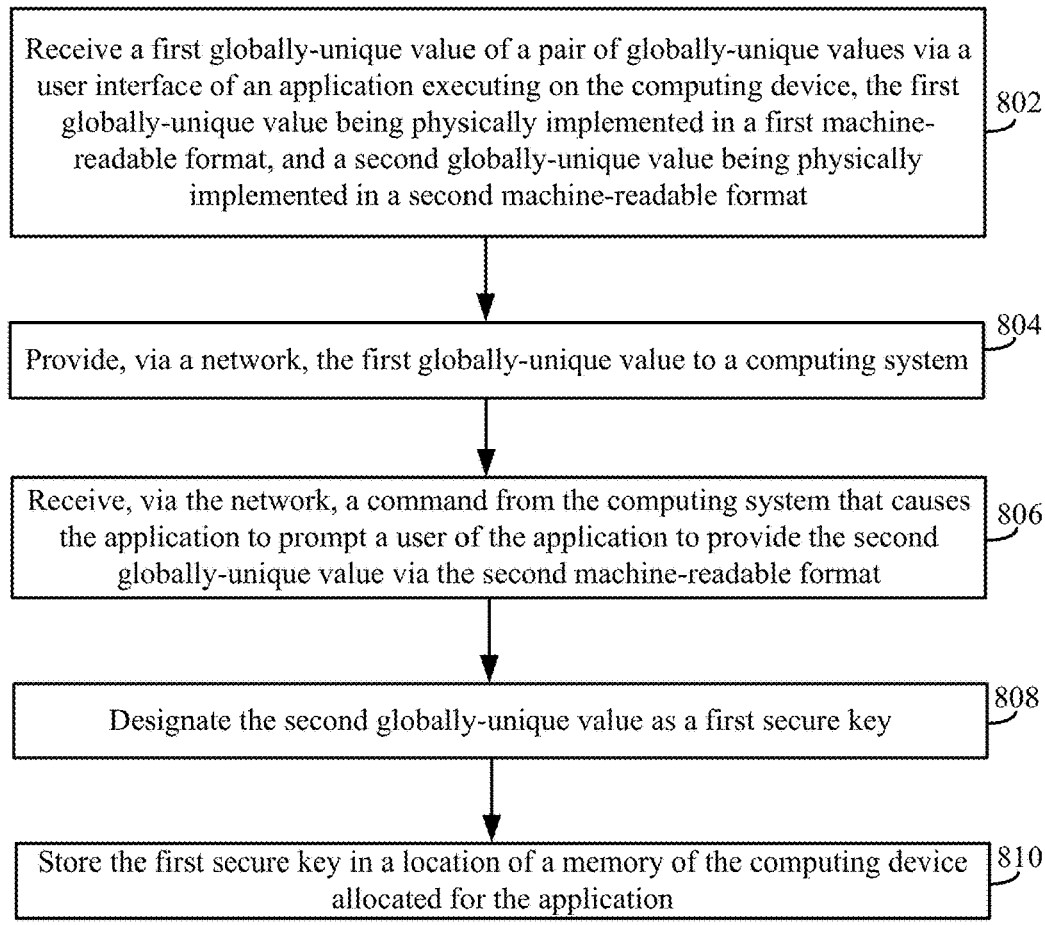
FIG. 8 shows a flowchart of a method for receiving a secure key by a computing device in accordance with an example embodiment.
Figure 9:
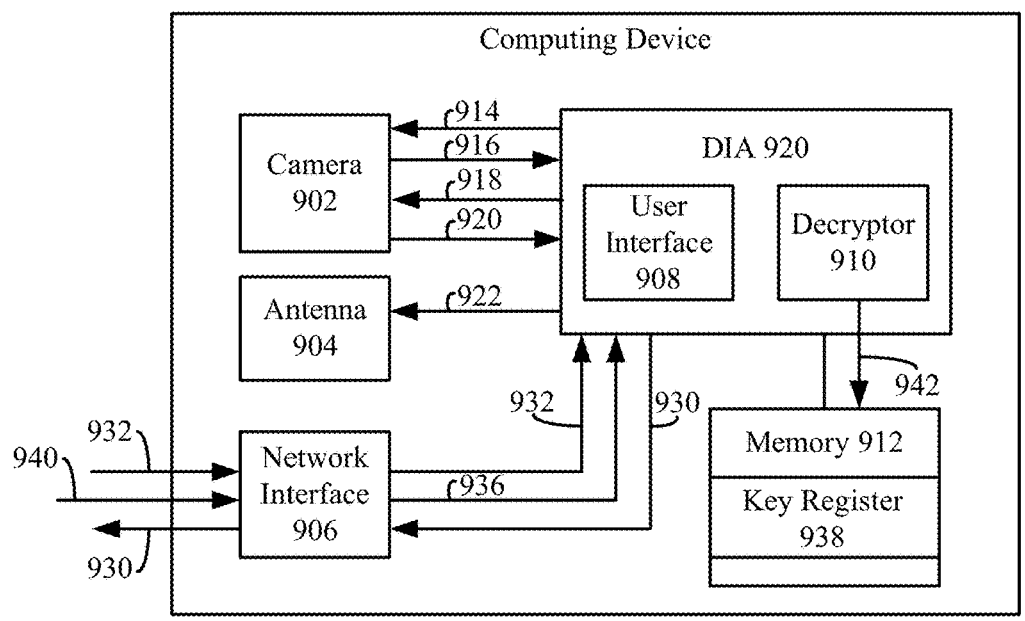
FIG. 9 depicts a block diagram of a computing device in accordance with an example embodiment.

FIG. 8 shows a flowchart 800 of a method for receiving a secure key by a computing device in accordance with an example embodiment. In an embodiment, flowchart 800 may be implemented by a computing device 900, as shown in FIG. 9. Accordingly, flowchart 800 will be described with reference to FIG. 9. FIG. 9 depicts a block diagram of computing device 900 in accordance with an example embodiment. Computing device 900 is an example of computing device 104, as described above with reference to FIG. 1. As shown in FIG. 9, a DIA 920, a camera 902, an antenna 904, a network interface 906, and a memory 912. Network interface 906 enables network-based communications with each other components over a network. Examples of such a network interface 906, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. DIA 920 comprises a user interface 908 and a decryptor 910. DIA 920 is an example of DIA 120, as described above with reference to FIG. 1. Other structural and operational embodiments will be apparent to persons skilled in the relevant art(s) based on the discussion regarding flowchart 800 and computing device 900 of FIG. 9.

Flowchart 800 begins with step 802. In step 802, a first globally-unique value of a pair of globally-unique values is received via a user interface of an application executing on the computing device. The first globally-unique value is physically implemented in a first machine-readable format, and a second globally-unique value being physically implemented in a second machine-readable format. For example, with reference to FIG. 9, a first globally-unique value of a pair of first globally-unique values is received via a user interface 908 of DIA 920. For instance, user interface 908 may comprise one or more GUI screens that solicit the user to input the first globally-unique value of the pair.

In step 804, the first globally-unique value is provided to a computing system via a network. For example, with reference to FIG. 9, DIA 920 may generate a message 930 that includes the first globally-unique value (e.g., RNaj 122A, as shown in FIG. 1). Message 930 may be provided to network interface 906, which provides message 930 via a network (e.g., network 118, as shown in FIG. 1). Message 930 is an example of message 130, as described above with reference to FIG. 1.

In step 806, a command from the computing system is received via the network that causes the application to prompt a user of the application to provide the second globally-unique value via the second machine-readable format. For example, with reference to FIG. 9, network interface 906 may receive a command 932 from the computing system that causes DIA 920 to prompt a user of DIA 120 to provide the second globally-unique value (e.g., RNbj 122B, as shown in FIG. 1) via the second machine-readable format. Command 932 is an example of command 132, as described above with reference to FIG. 1. A user may be prompted via GUI screen(s) that are presented via user interface 908.

In step 808, the second globally-unique value is designated a first secure key. For example, with reference to FIG. 9, DIA 920 may designate the second globally-unique value (e.g., RNbj 122B, as shown in FIG. 1) as the first secure key.

In step 810, the first secure key is stored in a location of a memory of the computing device allocated for the application. For example, the first secure key is stored in a location of memory 912 (e.g., key register 938) of computing device 904. Key register 938 is an example of key register 138, as described above with reference to FIG. 1.

In accordance with one or more embodiments, the first machine-readable format is a first quick response code, and the second machine-readable format is a second quick response code. For example, with reference to FIG. 2, the first machine-readable format is QR code 202, and the second machine-readable format is QR code 204. In another example, with reference to FIG. 3, the first machine-readable format is QR code 300A, and the second machine-readable format is QR code 300B.

In accordance with one or more embodiments, receiving the first globally-unique value via the user interface comprises capturing the first quick response code via the application, and decoding the first quick response code to obtain the first globally-unique value. For example, with reference to FIG. 9, user interface 908 of DIA 920 may instruct the user to capture the first QR code and provide a command 914 to camera 902, which causes camera 902 to be activated. Camera 902 captures the first QR code and provides the captured QR code (shown as QR code 916) to DIA 920. DIA 920 decodes captured QR code 916 and obtains the first globally-unique value. In accordance with one or more embodiments, receiving the second globally-unique value via the user interface comprises capturing the second quick response code via the application, and decoding the second quick response code to obtain the second globally-unique value. For example, with reference to FIG. 9, user interface 908 of DIA 920 may instruct the user to capture the second QR code and provide a command 918 to camera 902, which causes camera 902 to be activated. Camera 902 captures the second QR code and provides the captured QR code (shown as QR code 920) to DIA 920. DIA 920 decodes captured QR code 920 and obtains the second globally-unique value.

In accordance with one or more embodiments, the second quick response code is embedded within the first quick response code. For example, with reference to FIG. 2, second QR code 204 is embedded within first QR code 202.

In accordance with one or more embodiments, receiving the first globally-unique value via the user interface comprises capturing the first quick response code via the application, and decoding the first quick response code to obtain the first secure key, and capturing the second globally-unique value via the user interface comprises generating an inverted version of the first quick response code, the inverted version being the second quick response code, and decoding the inverted version of the first quick response code to obtain the second globally-unique value. For example, with reference to FIG. 9, user interface 908 of DIA 920 may instruct the user to capture the first QR code and provide a command 914 to camera 902, which causes camera 902 to be activated. Camera 902 captures the QR code and provides the captured QR code (shown as QR code 916) to DIA 920. DIA 920 decodes captured QR code 916 and obtains the first globally-unique value. To capture the second QR code, DIA 920 may generate an inverted version of QR code 916. DIA 920 decodes the inverted version of QR code 916 and obtains the second globally-unique value.

In accordance with one or more embodiments, the first machine-readable format comprises first data stored via a first near-field communication-based tag device, and the second machine-readable format comprises second data stored via a second near-field communication-based tag device (e.g., tag device 400A or 400B).

In accordance with one or more embodiments, receiving the first globally-unique value comprises reading the first near-field communication-based tag device to obtain the first globally-unique value, and receiving the second globally-unique value via the user interface comprises reading the second near-field communication-based tag device to obtain the second globally-unique value. For example, with reference to FIG. 9, user interface 908 of DIA 920 may instruct the user to provide the first globally-unique value and provide a command 922 to antenna 904, which causes antenna 904 to be activated. Antenna 904 is configured to read a first NFC-based tag device to obtain the first globally-unique value therefrom. User interface 908 of DIA 920 may subsequently instruct the user to provide the second globally-unique value and provide command 922 to antenna 904, which causes antenna 904 to be activated. Antenna 904 reads a second NFC-based tag device to obtain the second globally-unique value therefrom.

Figure 10:
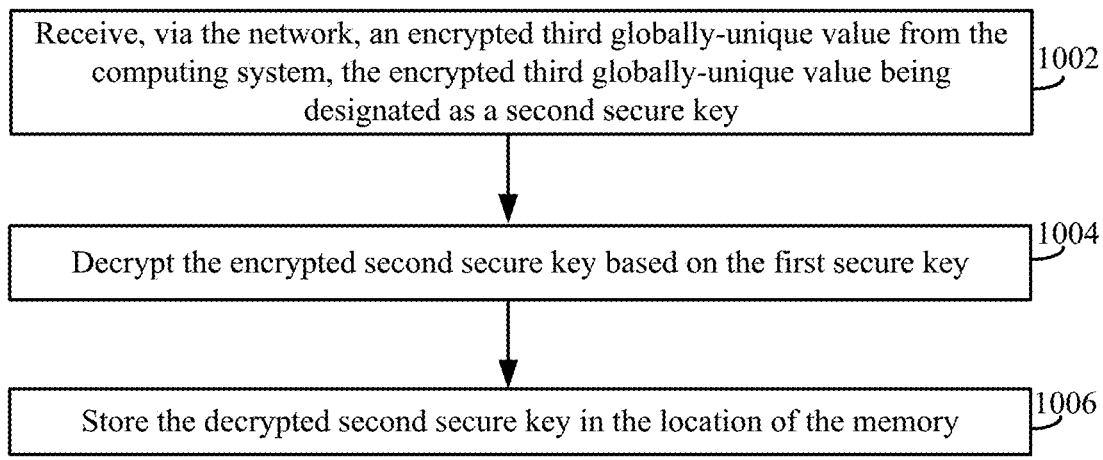
FIG. 10 shows a flowchart of a method for flushing a memory location of a computing device in accordance with an example embodiment.

In accordance with one or more embodiments, a flushing operation is performed to clear key register 938 of DIA 920 in which the secure key is stored. For example, FIG. 10 shows a flowchart 1000 of a method for flushing a memory location of a computing device in accordance with an example embodiment. In an embodiment, flowchart 1000 may be implemented by DIA 920, as shown in FIG. 9. Accordingly, flowchart 1000 will be described with continued reference to FIG. 10. Other structural and operational embodiments will be apparent to persons skilled in the relevant art(s) based on the discussion regarding flowchart 1000 and DIA 920 of FIG. 9.

Flowchart 1000 begins with step 1002. In step 1002, an encrypted third globally-unique value is received from the computing system via the network. The encrypted third globally-unique value is designated as a second secure key. For example, with reference to FIG. 9, network interface 906 may receive a message 940 from the computing system (e.g., computing system 102, as shown in FIG. 1). Message 940 may include the encrypted third globally-unique value. Message 940 is an example of message 140, as shown in FIG. 1. Message 940 is provided to DIA 920.

In step 1004, the encrypted second secure key is decrypted based on the first secure key. For example, with reference to FIG. 9, decryptor 910 decrypts the encrypted second secure key included in message 936. Decryptor 910 may decrypt the encrypted second secure key based on the first secure key (e.g., RNbj 122B) stored in key register 940 utilizing an XOR-based decryption scheme as described above. For instance, decryptor 910 may rotate the first secure key by one bit and perform a bit-wise XOR operation on the encrypted second secure key and the bit-rotated first secure key to obtain the decrypted second secure key.

In step 1006, the decrypted second secure key is stored in the location of the memory. For example, with reference to FIG. 9, DIA 920 may store the decrypted second secure key (shown as decrypted second secure key 942) in the location in memory 912 in which RNbj 122B was stored (e.g., key register 938), thereby flushing RNbj 122B out of memory 912.

B. Secure Communications

Figure 11:
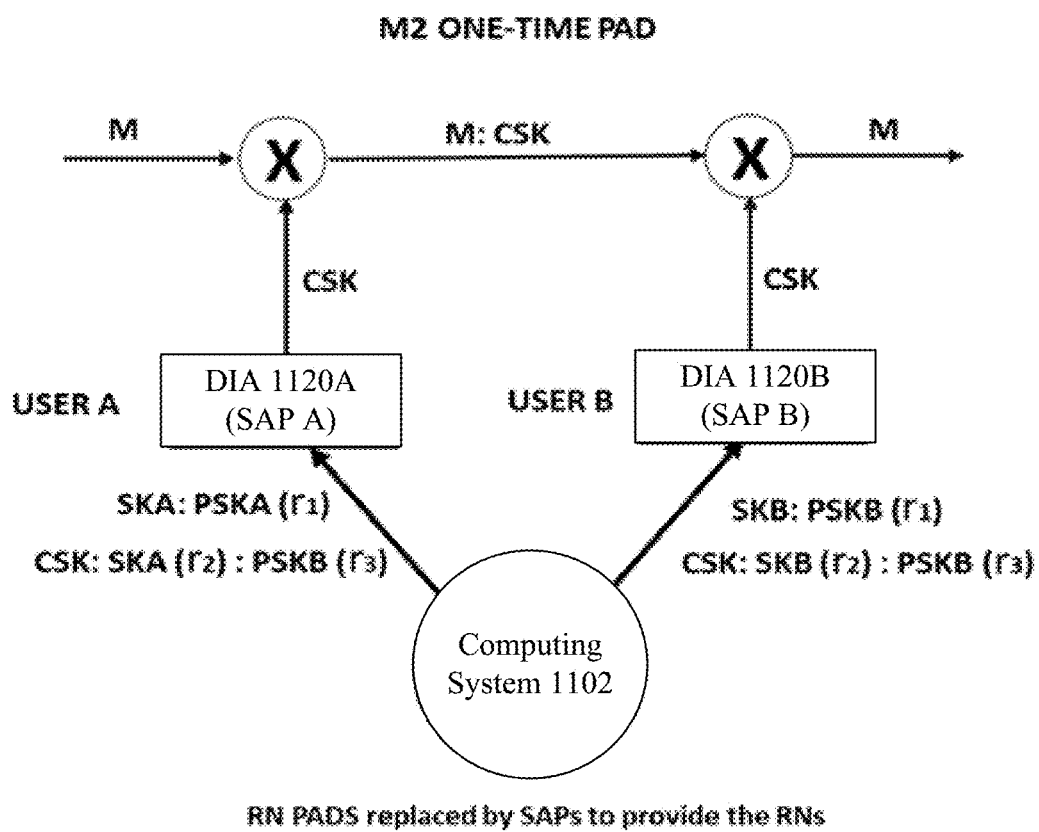
FIG. 11 depicts a block diagram of a one-time random number symmetric keying system in accordance with an embodiment.

FIG. 11 depicts a block diagram of one-time random number symmetric keying system 1100 in accordance with an embodiment. As shown in FIG. 11, system 1100 comprises a computing system 1102, a first DIA 1120A, and a second DIA 1120B. Computing system 1102 is an example of computing system 102, and first and second DIAs 1120A are 1120B are examples of DIA 120. Each of first and second DIAs 1120A and 1120B may execute on a respective computing device (e.g., computing device 104, as shown in FIG. 1.) In the example shown in FIG. 11, a first user utilizing DIA 1120A desires to send a secure message to a second user utilizing DIA 1120B. As shown in FIG. 11, one-time random number pads, as described above with reference to the "One-time pad symmetric RN keying system" described above are replaced by Secure Access Portals (SAPs) implemented via respective instances of DIAs 1120A and 1120B. In FIG. 11, the symmetric key used for secure communication between two users is designated as the Communication Symmetric Key (CSK). It meets all the criteria for perfect security. The CSK utilized by DIAs 1120A and 1120B is shown in FIG. 11 to be doubly encrypted as CSK:SKA(r2): PSKA(r3) and CSK:SKB(r2):PSKB(r3), respectively to prevent the common "known message" attack explained as follows. SKA(r2) represents the latest secure or symmetric key provided to DIA 1120A by computing system 1102 that has been bit rotated two times, PSKA(r3) represents the previous secure or symmetric key provided to DIA 1120A (before providing the latest secure or symmetric key) by computing system 102 that has been bit rotated three times, SKB(r2) represents the latest secure or symmetric key provided to DIA 1120B by computing system 1102 that has been bit rotated two times, and PSKB(r3) represents the previous secure or symmetric key provided to DIA 1120B (before providing the latest secure or symmetric key) by computing system 102 that has been bit rotated three times.

The encrypted message is designated as N=M:CSK (i.e., message M is encrypted via CSK). If the message, M, is known and N is observed by an eavesdropper, then CSK will be known. Designating Q=CSK:SK(r2):PSK(r3), if CSK is known and Q is observed by an eavesdropper, then SK(r2): PSK(r3) will be known but cannot be devolved to discover either SK(r2) or PSK(r3), thereby protecting both. Therefore, the classical "known message" attack is useless in obtaining SKs preserving "perfect secrecy." For any unknown message, the only attack is by brute force which would take the age of the universe to accomplish. The encrypted message can be sent securely over or through any media such as 1) hard-wired, 2) RF wireless of any type, 3) optically through air, liquid, or media such as fiber optics, and 4) sound propagation through air, liquid or solid material.

The enablement of one-time pad RN symmetric keying using SAPs as the one-time pads to provide the symmetric keys is referred to as Quantum Number Encryption, QNE, referring to the fact that the SKs are true random numbers created by quantum random number generators, QRNGs, using quantum physics and are kept perfectly secret by the unique first key delivery methodology described above in Subsection A.

Figure 12A:
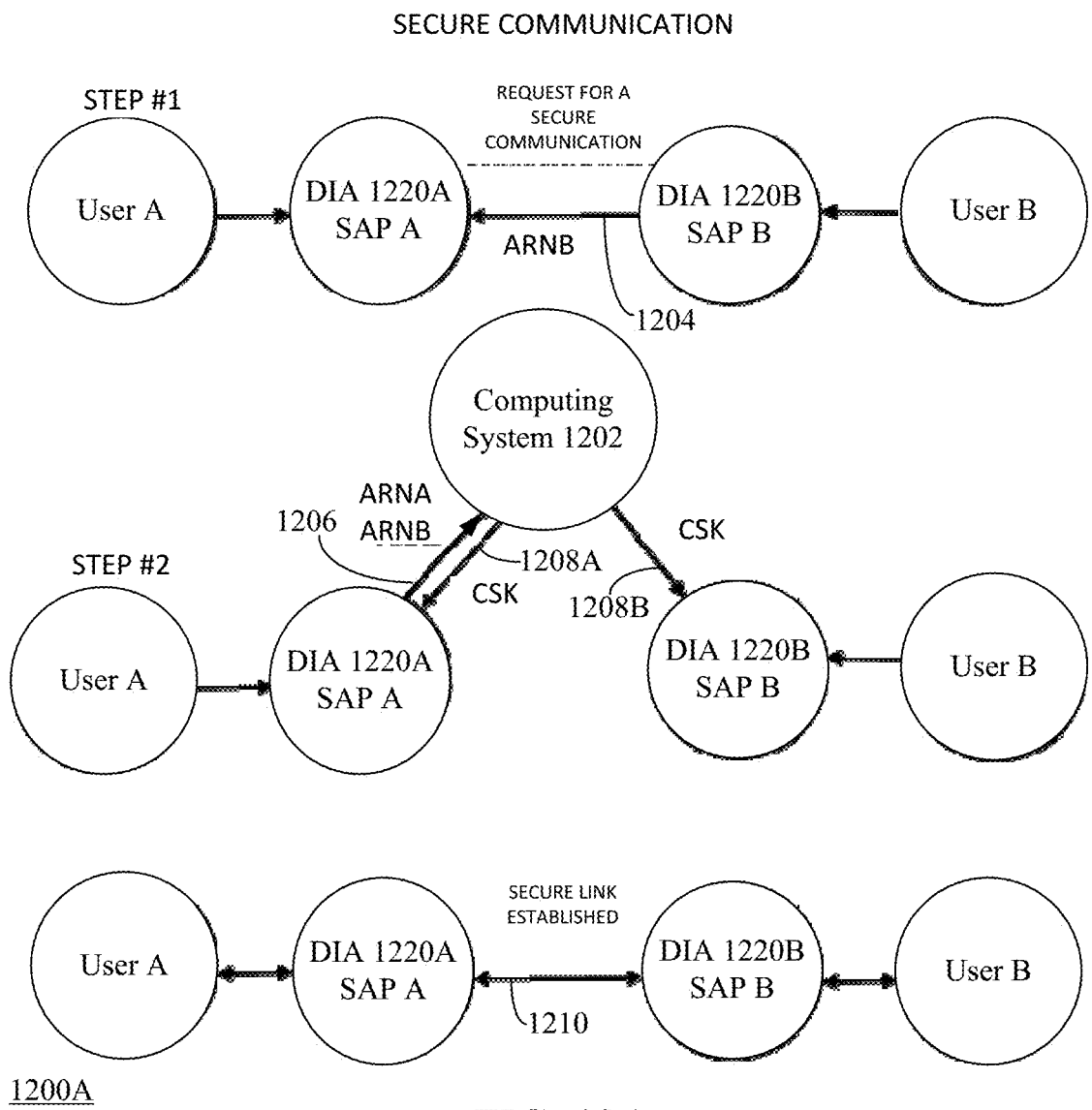
FIG. 12A-12B depict block diagrams of systems for secure communications in accordance with example embodiments.

For applications that require SAP security, such as for secure communication and financial tracking, the user desiring the transaction initiates the communication. FIG. 12A depicts a block diagram of a system 1200A for secure communications in accordance with an example embodiment. As shown in FIG. 12A, system 1200A comprises a computing system 1202, a DIA 1220A, and a DIA 1220B. Computing system 1202 is an example of computing system 102, and DIAs 1220A and 1220B are examples of DIA 120, as respectively described above with reference to FIG. 1. With reference to FIG. 12A, suppose user "B" (which utilizes SAP B of DIA 1220B being associated with application random number B (ARNB)) initiates a secure communication with User "A" (which utilizes SAP A of DIA 1220A being associated with application random number A (ARNA)). SAP B of DIA 1220B may send to SAP A of DIA 1220A a message (e.g., a text message, or some other type of message known in the relevant art(s)) from User "B" to User "A" requesting a secure communication and to respond with "YES" to accept. On receiving a "YES" back, SAP B of DIA 1220B sends its ARNB to SAP A via a message 1204. SAP A of DIA 1220A then sends to computing system 1202 its ARNA, as well as ARNB via one or more messages 1206. Based on the types, permissions, and restrictions maintained by computing system 1204, this simple random number data stream, sent in the clear, may act as an implied instruction to establish the secure communication between the SAPs A and B. For instance, computing system 1202, responsive to receiving message(s) 1206, may provide CSKs to SAPs A and B via respective messages 1208A and 1208B as described above for encrypted secure communication. The CSKs provided to SAPs A and B are the same CSK. A secure link 1210 is then established between DIAs 1220A and 1220B, as described above with reference to FIG. 11.

Figure 12B:
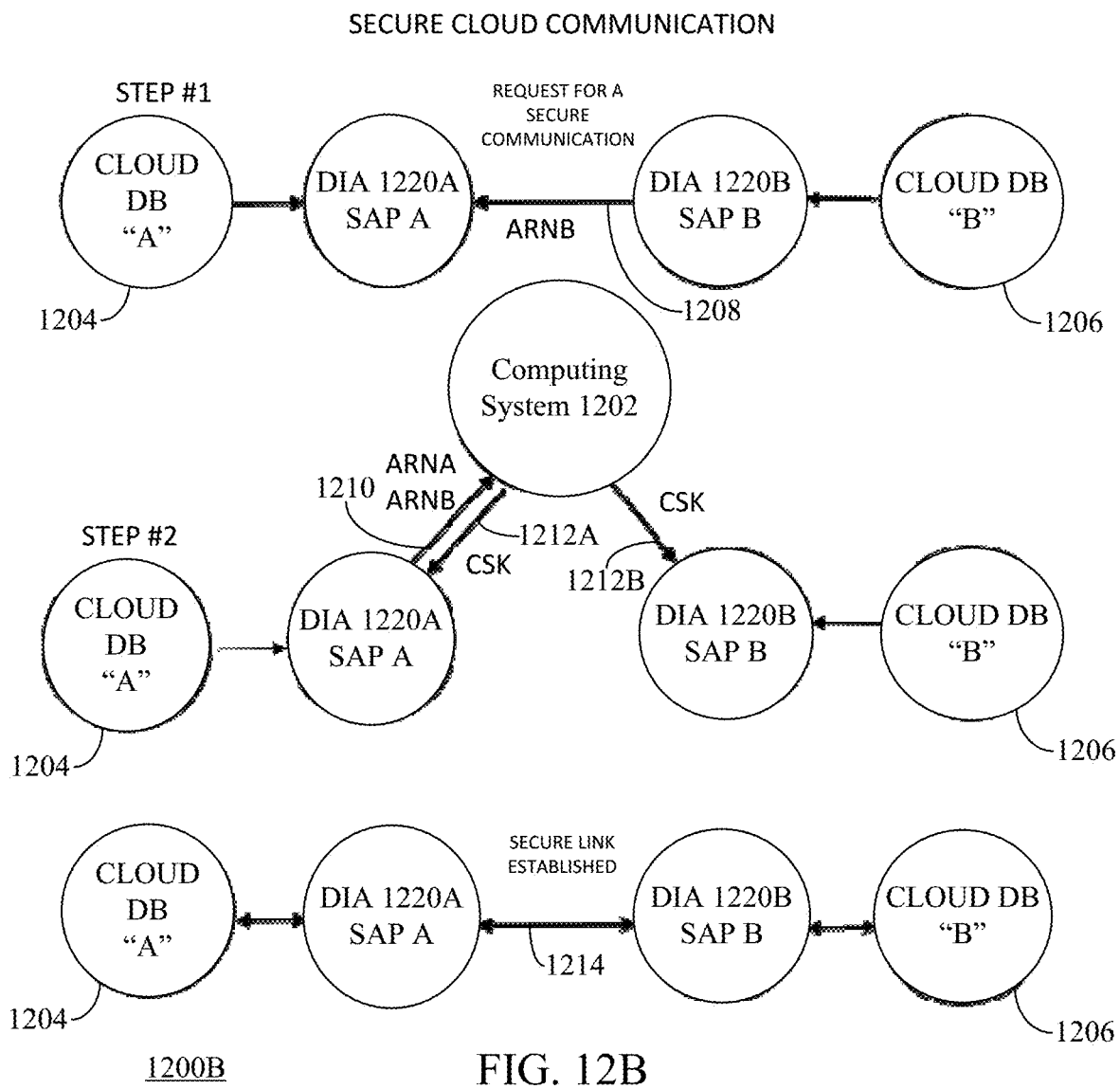

For other types of applications that require SAP security, such as for cloud-related secure data communication for data retrieval and/or data mining, the user desiring the transaction initiates it. FIG. 12B depicts a block diagram of a system 1200B for cloud-related secure data communications in accordance with an example embodiment. As shown in FIG. 12B, system 1200B comprises a computing system 1202, DIA 1220A, DIA 1120B, a first cloud-based database 1204, and a second cloud-based database 1206. In the example shown in FIG. 12B, suppose first cloud-based database 1204 is communicatively coupled with SAP A of DIA 122A (having ARNA) and initiates a secure communication with second cloud-based database 1206, which is communicatively coupled to SAP B of DIA 1220B. SAP B may send to SAP A requesting a secure communication and to respond with "YES" to accept. On receiving a "YES" back, SAP B sends its ARNB to SAP A via a message 1208. SAP A then sends to computing system 1202 its ARNA, along with ARNB, via message(s) 1210. This will work for as many database secure communications as desired or required to receive every bit of data required for the communication. Based on the types, permissions, and restrictions maintained by computing system 1202, this simple random number data stream, sent in the clear, may act as an implied instruction to establish the secure communication between the SAPs A and B. For instance, computing system 1202, responsive to receiving message(s) 1210, may provide CSKs to SAPs A and B via respective messages 1212A and 1212B, as described above. The CSKs provided to SAPs A and B is the same CSK. A secure link 1214 is then established between DIAs 1220A and 1220B, as described above with reference to FIG. 11.

Computing device 1202 may first verify the identities of SAP A and SAP B by sending to each communication instructions (by utilizing the ARNs associated therewith) and a SK as described above followed by a message encrypted as described above with reference to FIG. 11. The message to User "B" may indicate whether it is acceptable to establish secure link 1214 with user "A" and to respond with either a YES or NO. The message to User "A" may indicate whether it is acceptable to establish secure link 1214 with User "B" and to respond with either YES or NO. A new SK is then sent to each of SAP A and SAP B, and both use their new SKs to encrypt their message back to the computing system 1202.

The foregoing accomplishes two things. The first is that only valid SAPs would have the correct current keys to respond to the dialogue. An aspiring impostor would be out of the loop. The second deals with if User "A" wanted to engage User "B" in a secure call that User "B" didn't initiate, and User "A" knew User "B's" ARNB by recording it from previous transactions. Perhaps someone successfully hijacked User "A's" phone to have User "B" reveal classified information. So, User "A" without User "B's" knowledge sends ARNA followed by ARNB to the computing device 1202. Now User "B" will see the message indicating whether it is OK to establish a secure link to User "A", and respond with either a YES or NO." User "B", not having initiated the call, will indicate "NO", flagging the system for follow-up.

After receiving a "YES" from both User "A" and User "B", computing device 1202 may send a new SK to both SAP A and SAP B and then select or create a new random number as the CSK, and send it encrypted with the current SAP keys as described above to both SAP A and SAP B. SAPs A and B will decrypt to extract the CSK and use it as the one-time pad symmetric key for the message sent from User "A" to User "B". The message does not go through computing system 1202, but directly between the SAPs A and B. After the message is sent, a message indicating whether secure communications are to continue between SAP A and SAP B may be provided to both of SAP A and SAP B. Both parties should respond with "YES" for anew CSK to be sent to continue the secure communication channel. Alternatively, the messaging will continue automatically with new key delivery until the session is then complete.

Note that the security protocol described above authenticates SAPs A and B, obsoleting the need for passwords and/or certificates. Also, it can be used in "whitelisting" where a whitelist is the list of the people, countries or other entities that are granted access to certain authorized systems or protocols. When a whitelist is used, all entities are denied access, except those included within the whitelist. The whitelist could be stored in memory in the computing devices (e.g., computing device 104) that execute DIAs 1220A and 1220B so that when a secure communication request is received from an entity not on the whitelist, the request is denied or they are blacklisted, which would be a list of people, countries, or entities to be avoided or distrusted as not being acceptable to the whitelist.

C. Additional Applications Utilizing True Random Numbers

Most experts and researchers today state there are about eight main cyber security vulnerabilities within supply chains and information security: privacy, the theft of valuable information and product, the counterfeiting of goods and the illegal reinsertion into supply chains, unauthorized cloud access and their mismanagement, the tampering of both software and hardware products, the insertion of insecure second, third and even fourth-party wireless network software and hardware vendors, IoT compromises through plug and play software patches, and piracy.

Because of the COVID-19 epidemic, the experts and researchers are worried past numbers of cyber-attacks are going to double each year. The 2021 security industry predictions crisscross over both supply chain and information security venues, and it will have huge security impacts to every corporation as many corporations have begun moving many of their work force from some level of secure office walls to employees' personal homes. With home computing, nearly every employees' personal computers, smart devices like mobile devices or smartphones, all are vulnerable to a venue of new attacks through each of these insecure home networks. These new hackers will have an easier time attacking these home offices as cyber criminals will now take advantage of these third-party unpatched home network systems and all their architecture weaknesses they present. It is known now that external and internal passwords have also become a great security failure and will be even more vulnerable through home computing and their unprotected networks. The following subsections describe embodiments in which true random numbers may be utilized.

1. Data Access

The embodiments described herein address access control to restricted data by reason of security clearance or need to know. It assumes that an individual is in an organization or company who needs to have access to data that they have permission or authorization to have access to.

An authorized individual in authority can grant permission to an authorized individual to download the specific restricted data on to an authorized device (computer, tablet, smart phone, etc.) or authorized user's device with a secure database (SDB) interface application (e.g., DIA 120), with the necessary restrictions relevant to the authorized user's access permissions (clearance level, etc.). Upon the download, the DIA would enroll the user with the above as well as with biometric authentication, a Personal Identification Number (PIN), and/or personal questions that would validate that the authorized user is using the SAP of the DIA. The computing system (e.g., computing system 102) may comprise an application RN (ARN) folder (e.g., in database 106) that contains the specific authorized data access permissions and restrictions as well as the user's authentication information. Next, the DIA would instruct the authorized user to obtain the first secure key as described above to enable them to become a key-secured SAP.

Figure 13:
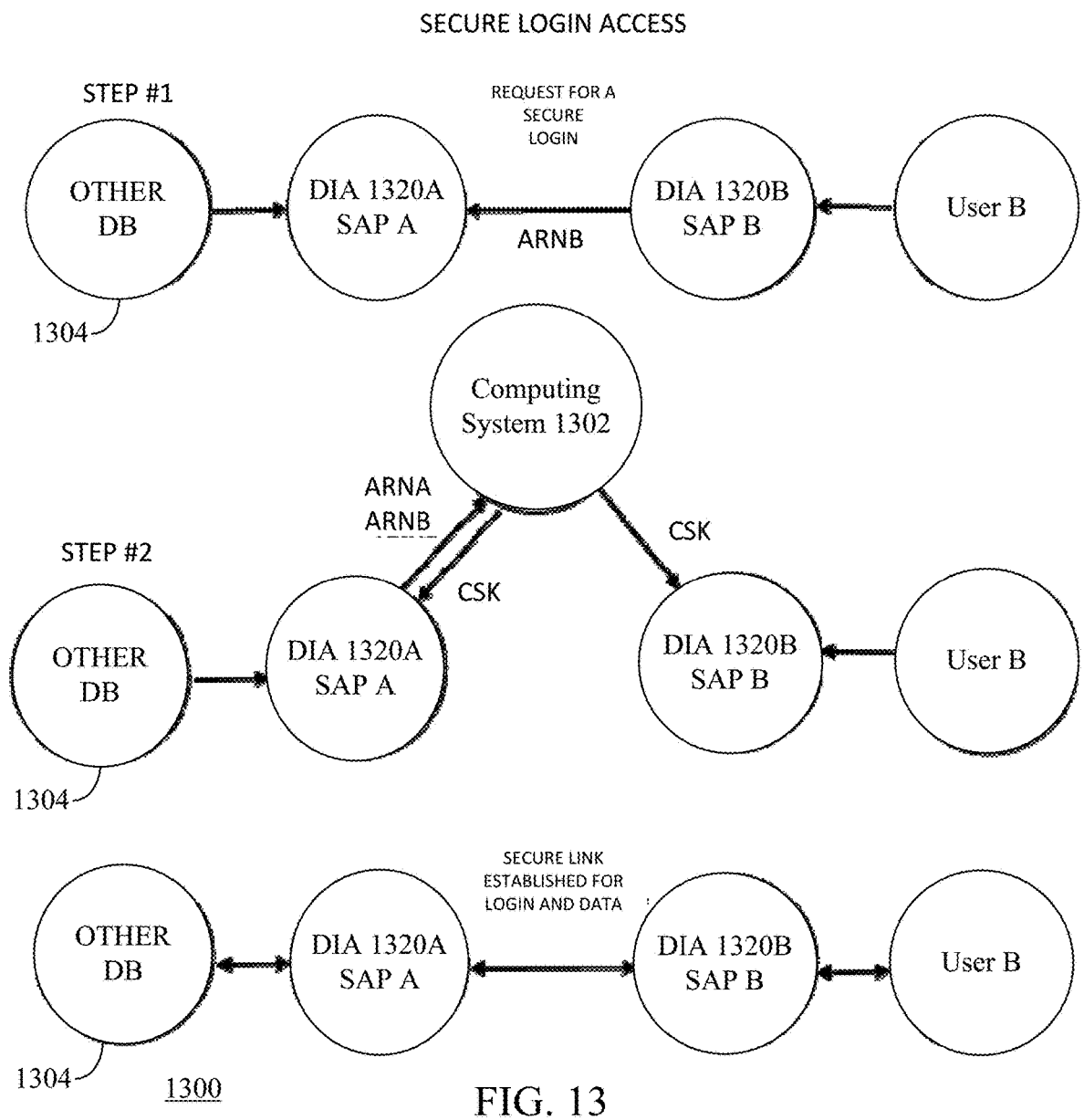
FIG. 13 depicts a block diagram of a system accessing data in a database in accordance with an example embodiment.

The communication to the computing system (e.g., computing system 1202) is initiated by an authorized user's SAP (i.e., SAP B of DIA 1220B) sending its ARN (i.e., ARNB) to computing system 1202 via a message. Computing system 1202 responds by sending a new Secure Key (SK) to the SAP encoded by the PSK (previously-sent Secure Key) in the ARN folder corresponding to ARNB by the process defined above. SAP B then decodes with the PSK (the SK previously received from computing system 1202) as described above and responds by sending its ARN and a message encrypted with the new key, as described above, requesting access to database files associated with computing system 1202. The database (e.g., database 106) either grants or denies access to the data based on the authorized user's access permissions and restrictions that are within the ARN folder. No passwords or certificates are required. SAP B is authenticated by computing system 1202 by the newly-generated key exchange, whereby if SAP B was not authenticated it would not have the PSK to decode the new SK and would be locked out of any further communication. No intruder would have a way into the database, and only authenticated users would have access according to their access permissions and restrictions. This approach can be expanded by access, such as for login, to other databases that are interfaced with their SAPs as shown in FIG. 13. For example, FIG. 13 depicts a block diagram of a system 1300 accessing data in a database in accordance with an example embodiment. As shown in FIG. 13, system 1300 comprises a computing system 1302, DIA 1320A, DIA 1320B, and a database 1304. Computing system 1302 is an example of computing system 1202, and DIAs 1220A and 1220B are examples of DIA 1220, as described above with reference to FIG. 12. Here, the approach is identical to that for secure communication, but now the secure communication is with a database instead of another person.

2. Block Chain Using Quantum Number Encryption for Secure Asset Tracking Transactions (SATT)

Figure 14:
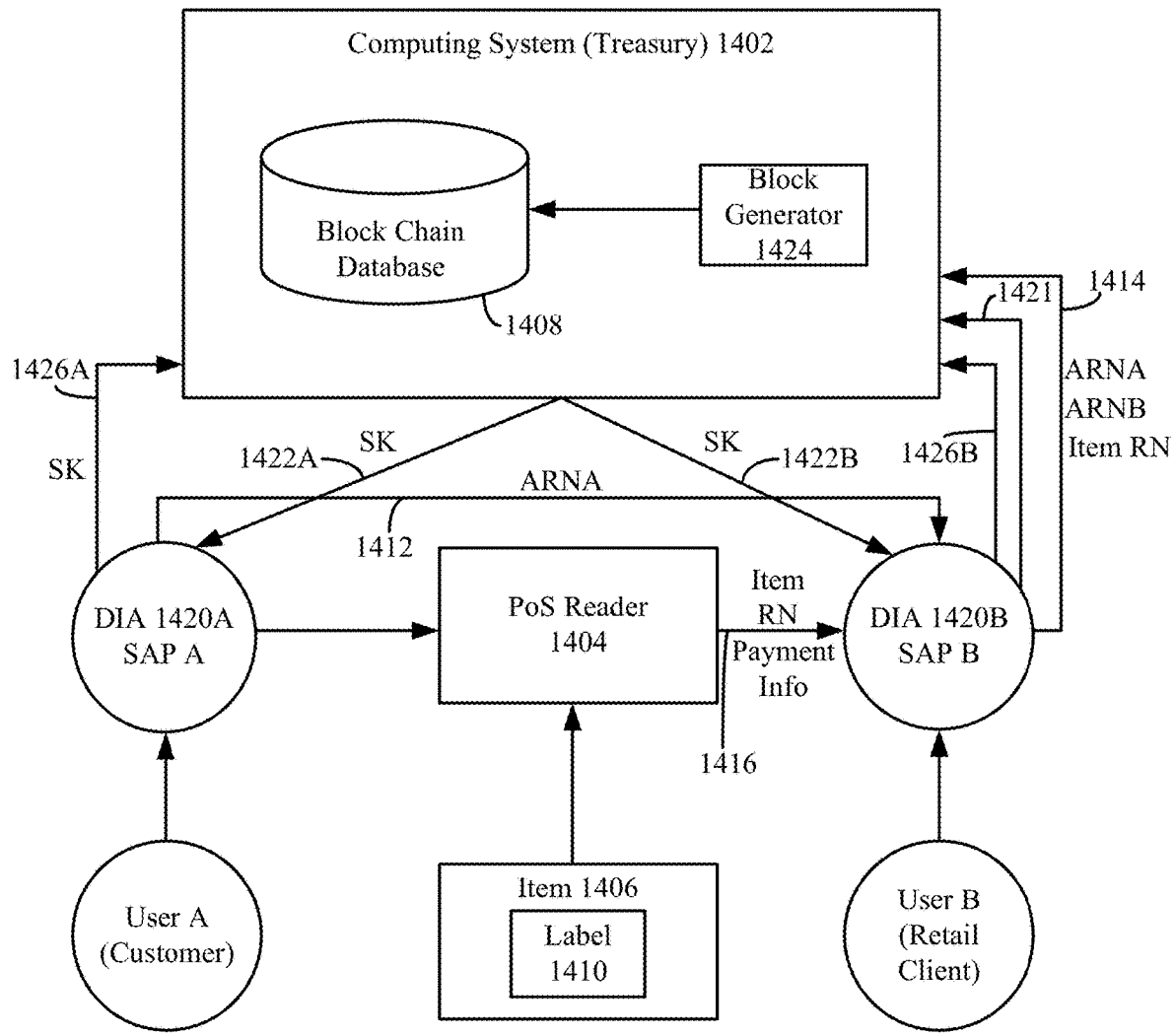
FIG. 14 depicts a block diagram of a system for tracking a purchase transaction using quantum number encryption in accordance with an example embodiment.

FIG. 14 depicts a block diagram of a system 1400 for tracking a purchase transaction using quantum number encryption in accordance with an example embodiment. As shown in FIG. 14, system 1400 includes a computing system 1402, a point-of-sale (PoS) reader 1404, a DIA 1420A, and a DIA 1420B. Computing system 1402 is an example of computing system 102, and DIAs 1420A and 1420B are examples of DIA 120, as respectively described above with reference to FIG. 1.

In the example shown in FIG. 14, SAP B of DIA 1420B is utilized by a retail client working at their specific check-out or Point-Of Sale, (POS) station inside a retail store. SAP A of DIA 1420A is utilized by a customer who desires to purchase an item 1406 offered for sale at the retail store, such as a new computer. This particular retail store is also a participant in the SATT Network (SATTN). SATTN comprises computing system 1402, which maintains a secure block chain database 1408. Computing system 1402 and/or database 1408 may also referred to as a "Treasury" for reasons described below. Computing system 1402 is configured to create and then maintain every asset transaction and asset ownership block of a block chain in database 1408 that are identified by the random numbers, which were provided by the database 1408 the random number secure database (e.g., database 106, as shown in FIG. 1). The key management and distribution system would be supplied by either computing system 1402 or the client's treasury database. Both SAP A and SAP B may interface through either a QR code, Near Field Communication High Frequency (13.56 MHz) or an Ultra High Frequency (860-960 MHz) or within any of the existing Radio Frequency Identification (RFID) bands Point of Sale (PoS) devices for which user "B" would be able to use their own SAB-enabled device which could be their quick response code (QRC), NFC, or RFID-enabled smart phones (e.g., computing device 102, as shown in FIG. 1).

Authorized finance and banking institutions and services would also be part of SATTN for all interfaces through each of the SAPs, including Automated Teller Machines (ATMs). It is also assumed that every entity within the store would have some type of random number label or tag of some format on or in it, such as a QRC label, or NFC/RFID label, and that specific store has in its product inventory database (PDB) the association look-up table of each of those random numbers for each of their entities or products with current information and status as well as being tied to their PoS system for auto resupply and auditing. Alternatively, when the random numbers are read by a prospective customer it automatically would be forwarded to the product manufacturer's RN database (MDB) for any additional desired product information. It is also assumed that SATTN is used to track the product through the complete supply chain or life cycle of that product.

As with the above examples with QNE, the person wanting a transaction always initiates it. User "A", the customer, places item 1406 at check-out so that its label (e.g., a tag) 1410 is read by PoS reader 1404. The customer then pulls up their purchase options screen using SAP A of DIA 1420A, selects their desired payment system such as Bank "A" and places their computing device on which DIA 1420A executes over the check-out PoS reader 1404. PoS reader 1404 may provide one or more messages 1418 to SAP B that include the random number associated with label 1410 and the payment information selected by the user. Note that during this process, SAP A could also be authenticating or enrolling the user with biometrics, if required for higher levels of purchase power, security, or security questions or a PIN ID or number. SAP A sends its ARNA to SAP B via a message 1412. SAP B then sends its ARNB, as well as the ARNA and the random number associated with label 1410 to computing system 1402 via one or more messages 1414. SAP B may also provide an encrypted message 1421 using its current QNE key set with a message that identifies item 1406, the price of item 1406, and the payment information. Treasury 1402 may use the random number associated with label 1410 to retrieve any specific product information regarding that particular computer as well as warranty information, etc.

Treasury 1402 may use ARNB to locate the key set that is associated with the ARNB to decrypt message 1421 and stores message within a data structure, such as an instruction file or register. Treasury 1402 may then use the contact information associated with that ARNB to create and send a new SK encrypted with PSK(r1), as described above, via a message 1422B, followed by a message encrypted using the new SK. The encrypted message may indicate that it is acceptable to proceed with the purchase of item 1406.

Treasury 1402 may use ARNA to locate the key set associated with that ARNA and to locate and validate it within the ARNA folder with an authorized connection to Bank "A". Treasury 1402 uses the contact information associated with ARNA to create and send out a new SK encrypted with PSK(r1), as described above, via a message 1422A, followed by a message encrypted using the new SK. The encrypted message may indicate whether it is OK to proceed with the purchase of item 1406 with selected payment information.

This simple, straightforward exchange using QNE accomplishes multiple authentications, including the item 1406, SAP A, and SAP B. If the user of SAP A is not there purchasing that computer but out hiking somewhere in the desert and suddenly receives this message on their smart phone, they would automatically hit the "NO" screen button or "Yes" if they authorized a different person on the card. Either way it will either raise the fraud flag in treasury 1402 or give notice to the card owner about the specific purchase price as well as location. If the store check-out attendant gets an OK message and sees it is not item 1410 but some other item sitting on the counter, they might want to hit the "NO" button and call the authorized card user or e-mail security. But if User "A" or authorized card user is really standing there at the counter with item 1406, then both will hit authorize the transaction (e.g., by pressing a "YES" screen button). There is no way to enter the system without the right key set credentials. This process locks out the bad guys and prevents fraud.

Both SAPs A and B respond by sending their ARNS followed by the response encrypted with QNE with the current, updated, key sets via respective message(s) 1426A and 1426B. Assuming that both responses authorize the transaction, treasury 1402 would first send new SKs to the SAPs A and B and a block generator 1424 of treasury 1402 then uses the ARNs and the product RN to create a New Transaction Block (NTB) and New Ownership Blocks (NOB) for SAP A and SAP B, referencing previous or Old Ownership Blocks (OOB) of the SAPs. The new blocks are stored in block chain database 1408. The New Transaction Block will be labeled by a New Transaction Block random number (NTB/RN) (e.g., generated by QRNG 116, as shown in FIG. 1), and will also be labeled by the Old Ownership Block RNs, (OOB/RNs) for both SAP A and SAP B. The New Ownership Blocks will be labeled by the New Ownership Block RNs (NOB/RNs) (e.g., generated by QRNG 116, as shown in FIG. 1) and the Transaction Block Random Number (TB/RN) that created them. In this way a "Chain-Of-Blocks" is formed for any given SAP: TB1-OB1-TB2-OB2-TB3-OB3-etc.

The New Transaction Block will contain all of the financial details of the transaction. It will also access the SAP ARN folders for the required financial institution details associated with each to form the cash transaction from User "A's" Bank "A" account to the store's account. It will access the Old Ownership Block (OOB) to extract the required information to update with the New Ownership Block (NOB). It will then access the item folder of item 1406 using the random number associated with the item's label 1410 to form the asset transaction of item 1410 from that particular store to User "A". The new store OB will show a cash plus-up of the purchase price and an asset deduction of item 1406 from the store's inventory. The NOB(A) will show an asset addition of item 1406 with a deduction of the purchase price from the Bank "A's" account. The item's random number file will reflect the inventory status of being sold, with the pointer added to the files of the NOB(A)/RN and NOB(B)/RN. The NOB/RNs will be placed in the ARN folders for each SAP.

While many transactions occur within treasury 1402, from the user's perspective it is as simple as putting their purchase on the counter, selecting their payment method, hitting YES to OK that transaction, and then walking out with their new purchase.

User "A" can view his new ownership block anytime by initiating a request, whereby SAP A sends its ARNA to treasury 1402 followed by an encrypted request to view the new Ownership Block(s). Treasury 1402 uses the ARNA to retrieve the current key set associated with the ARNA to decrypt the message, and sends a new SK to SAP A, followed by a message encrypted with the new SK indicating whether it is OK to view the current ownership file. This message exchange with new SKs authenticates SAPA. If they get this message without sending a viewing request, they will hit "NO" which flags the system or bank as a fraudulent activity attempt. On hitting "YES" treasury 1402 retrieves the NOB(A)/RN from ARNA folder and opens the NOB(A) file folder to retrieve viewing information, which it sends encrypted to SAP A. This authentication process allows only the SAP with the proper key set credentials to view the files. This process locks out anyone else.

3. Secure Nesting, Aggregation or Grouping for a Complete Secure Manifest

A supply chain transaction may be defined as the following: that there is not one business that acts alone when providing their services or products to their customers. Most often they have manufacturers, suppliers, and distributors. Each one of those components also each have integral parts of their own networks. Each step used along the way of any product or service development from its design, manufacturing, to its eventual delivery are all included within the definition process of the supply chain transaction. So by definition, any part of a supply chain transaction could be vulnerable of being hacked and/or compromised and will result in the unintended exposure of information private to individuals or corporations.

An improved security application for various types of wireless technologies and their supply chain applications can be achieved by the incorporation of Real-Random Number Nested or Aggregated Touch Access Portals (TAPs), such as QRC TAPs, Laser or other types of programmed NFC TAPs, or any other types of Radio Frequency RFID TAPs, or even high definition images that are put on or into any entity, and associated with each other via database software association via groups or subgroups. This way, any individual entity, package(s), box(es), case(s), pallet(s), container(s), truck(s), truck company(s), truck location(s), individual truck status are each associated with just one simple Real RNID "TAP" which could provide every bit of information from one individual entity to smaller or larger groupings of products with each of their associated with real RNID TAPs. For example, a "Real RNID" TAP could be placed on it or inside of it all within a database providing any desired information such as: any trucking company(s), any specific truck(s), the actual real-time location of any specific truck(s), any specific or group of containers ID on any specific truck(s), any specific pallet ID on any specific container(s), any specific box ID on any specific pallet(s), any case ID inside any specific box(es), any package ID in any specific case(s), any entities ID within any specific package(s), etc.

Figure 15:
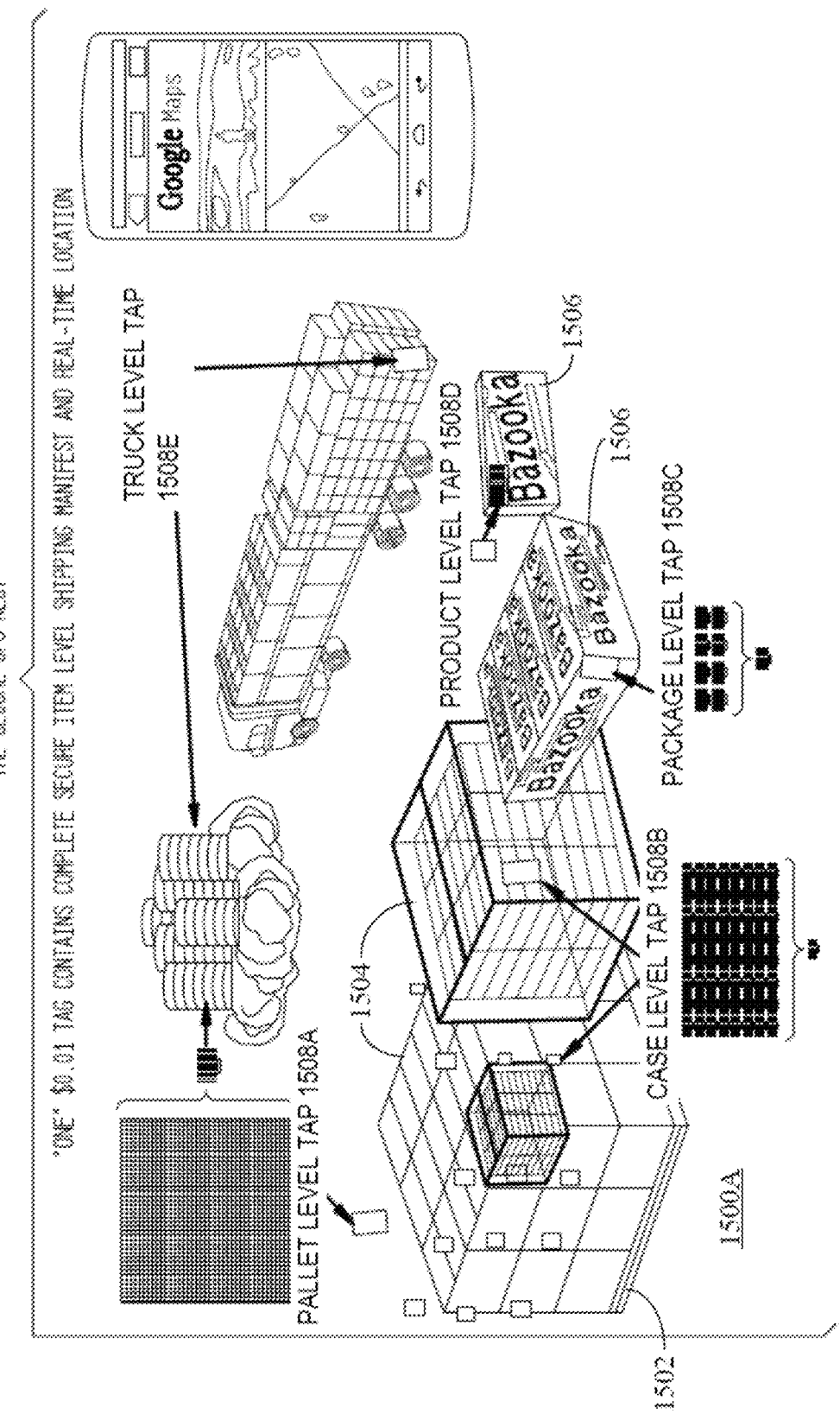
FIGS. 15A-15B depict diagrams and hierarchical structures of touch access point-related items and information in accordance with example embodiments.

These above-mentioned TAPs would contain a specific number of bits (e.g., a 256-bit random number) that would be linked to database or multiple databases with other information for each of the other units (e.g., scanned when the units were assembled into the case, or before collection). A pallet of such cases (say, 12 cases) can be provided with a higher-level TAPs that contains or points to information stored in database(s) for each of those TAPs for the cases. Thus, information for each case could be retrieved by scanning the single TAP for that pallet, and information for each of the units in any of the cases can be obtained once the code for the case is scanned or known from reading the pallet TAP. The hierarchical structure of the TAP-related information is shown in FIGS. 15A-15B in accordance with example embodiments. As shown in FIGS. 15A and 15B, a pallet 1502 contains multiple cartons or cases 1504, each of which contains multiple product packages 1506. Each product package 1506 has either or variations of the QRC, NFC, or RFID TAPs 1508A, as does each case and the pallet itself (shown as TAPs 1508B and 1508C, respectively). The case TAP 1508B provides information about each of the enclosed packages 1506, and the pallet TAP 1508A provides information about each of the case TAPs 1508B.

In general, these TAPs 1508A-1508E can be used to track products grouped in various hierarchies: (1) individual items or single packages 1510 containing multiple items for consumer purchase; (2) cartons or cases 1508 of multiple items; (3) pallets 1502 of multiple cartons or cases 1504; and (4) loads (e.g., truckloads, shiploads, or railcar loads) of multiple pallets 1502. The products at each of these levels may be assigned a TAP (e.g., TAPs 1508A-1508E) that is associated with information pertaining to at least one adjacent hierarchical level. For example, a TAP on a pallet 1502 may be associated within a database with a TAP on each carton 1504, on the pallet 1502, or may be associated with data pertaining to a different TAP from the truckload.

This hierarchical grouping can be referred to as "Nesting" and is also known as "Aggregation" or even Grouping, as shown in FIG. 15B. The embodiments described herein introduce such nesting as an important feature in supply chain logistics security where the SAP described above is used to read the RNID from a TAP attached to any item within a "Nest" and that RNID will be associated in the database with all the items within that "Nest". If at any location in the supply chain product transportation path if any or some of the items go missing from the "Nest" that indicates theft or diversion of product from the legitimate supply chain and would immediately issue an alert flag for reporting and resolution.

The database(s) described in FIG. 15B may utilize a whitelist of items that are granted access to certain systems or protocols. When a whitelist is used, every entity is denied access, except those which are included in the database whitelists. A network or security administrator may configure their RNID firewall with a whitelist that only allows specific IP addresses with authorized RNIDs to access their network(s).

4. One-Time Pad Synchronized Keying with Local Key Generation

Figure 16:
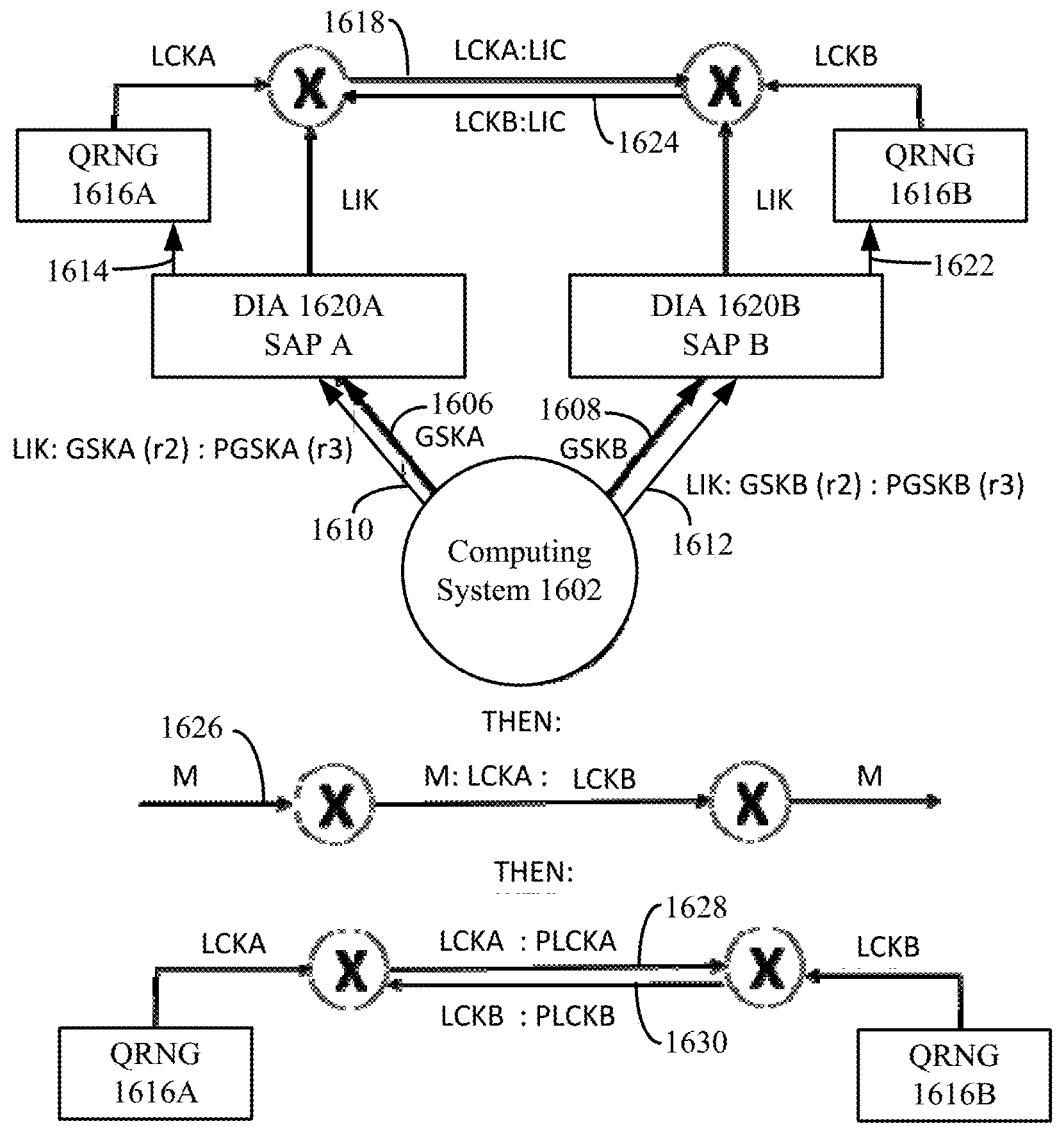
FIG. 16 depicts a block diagram of a system configured for local key generation in accordance with an example embodiment.

In accordance with an embodiment, QRNG 116 (as shown in FIG. 1) may be implemented on computing device 104 (as shown in FIG. 1). For instance, QRNG 116 may be implemented as an integrated circuit that generates true random numbers with quantum physics on computing device 104. This provides the capability for local key generation on computing device. This capability provides for encrypted communication between two computing devices if they are first synchronized in a secure manner. The embodiments described herein provide an approach for accomplishing this by utilizing the key delivery capability of the SAPs as shown in FIG. 16. FIG. 16 depicts a block diagram of a system 1600 configured for local key generation in accordance with an example embodiment. As shown in FIG. 16, system 1600 comprises a computing system 1602, a DIA 1620A, a DIA 1620B, a QRNG 1616A, and a QRNG 1616B. Computing system 1602 is an example of computing system 102, as shown in FIG. 1. DIAs 1620A and 1620B are examples of DIA 120, as shown and FIG. 1, and may be executed on respective computing devices (e.g., computing device 103). QRNGs 1616A and 1616B are examples of QRNG 116, as shown in FIG. 1. QRNG 1616A is included in the computing device that executes DIA 1620A, and QRNG 1616B is included in the computing device that executes DIA 1620B. Computing system 1602 is configured to provide a global synchronization (secure) key, GSK, for initial key synchronization, QRNG 1616A provides a local key for DIA 1620A, and QRNG 1616B provides a local key for DIA 1620B, thereby enabling secure messaging. The approach is described as follows.

If computing device (e.g., a smart phone) "A" wishes to securely communicate with computing device "B", SAP A of DIA 1620A executing on computing device "A" sends to SAP B of DIA 1620B executing on computing device "B" its ARNA with the communication request. SAP B sends to computing system 1620 its ARNB along with ARNA with the communication request. Computing system 1620 then creates a new random number secure key called the GSKA, and sends, via a message 1606, it to SAP A encrypted with the previous RN key called the PGSKA(r1) rotated by an N number of bits (e.g., 1 bit) via a message 1606. SAP A decrypts it with its PGSKA to obtain GSKA. Computing system 1602 does likewise with SAP B to send it a new GSKB via a message 1608. Computing system 1602 creates a new RN local initial key, LIK, and sends it, via a message 1610, to SAP A double encrypted with GSKA(r2):PGSKA(r3) and to SAPB, via a message 1612, double encrypted with GSKB(r2):PGSKB(r3). Computing system 1602 then sends a new GSK, both encrypted with the previous PGSK(r1) with r1 bit rotation. SAP A then provides a request 1614 for a random number from QRNG 1616A, which is designated as the local communication key, LCKA. DIA 1620A provides, via a message 1618, the LCKA (encrypted with the LIK) to SAP B of DIA 1620B. SAP B decrypts the encrypted LCKA with its LIK to retrieve LCKA. The SAP B provides a request 1622 to QRNG 1616B for a random number, which is designated as LCKB. DIA 1620B provides, via a message 1624, the LCKB (encrypted with the LIK) to SAP A of DIA 1620A. SAP A decrypts the encrypted LCKB with its LIK to retrieve LCKB. The message M 1626 that computing device "A" wishes to send to computing device "B" is double encrypted with both LCKA and LCKB: Secure message N=M:LCKA:LCKB.

The reason for this double encryption is to protect the LCKA and LCKB from a known message attack which could retrieve LCKA:LCKB but which cannot be deconvolved to retrieve either the LCKA or the LCKB other than with a brute force attack which would take the age of the universe to do. The SAP B receives secure message N and decrypts with M=N:LCKA:LCKB. The SAP A of DIA 1620A then provides a request for another random number from QRNG 1616A for a new LCKA, and sends it, via message 1628, to SAP B encrypted with the previous LCKA. SAP B decrypts the encrypted LCKA with the previous LCKA to retrieve the new LCKA. SAP B then provides a request for another random number from QRNG 1616B for a new LCKB and sends it, via a message 1630, to SAP A encrypted with the previous LCKB. SAPA decrypts with previous LCKB to retrieve new LCKB. New secure messages are thereby created and sent back and forth with the above process until the session ends. There are many other examples that can be envisioned that use other means for providing local quantum random numbers, such as hardware connected to computing or other smart devices.

5. Secure Voting

There has never been greater need for a $21^{st}$ century voting system that is secure, accurate, and trusted and can be implemented across every state and principality voting venue. The embodiments described herein provides such a system. It works in conjunction with every single US state's voter registry and voting system database.

The existing US voting requirements for every state within the USA are generally the same. The voter must: 1) be a US citizen; 2) be alive at the time of voting; 3) live in the state that which he/she is currently voting; 4) not be a felon that is in prison; 5) be 18 years of age or older; and 6) possess a minimum level of mental competency (varies between states but can be tailored to each state). The embodiments described herein can include all of the following features by simple database aggregation and link analysis software.

For example, the embodiments described herein may create digital encrypted voter ID's, which are each authenticated to ensure only legal votes are submitted by each state's requirements by simply using each existing US and state's authorized databases aggregation and link analysis software.

The following criteria may be utilized to authorize a vote: 1) SSAN, which proves a person is a US citizen and of age; 2) state and US death certificates, which prove a person is not dead at the time of election; 3) local utility records, which prove state residency requirements; 4) Medicare records, which proves mental disability requirements; 5) federal prison records, which provides a person is not a felon or still in prison; 6) a digital voter ID that every authorized citizen would receive and be utilized to vote annually if the person so desires; 7) encryption to ensure vote security and integrity so that votes cannot be changed; 8) autonomous vote tracking to ensure no votes can be fraudulently added; 9) vote validation, where a voter can confirm that the vote counted was the one submitted; and 10) time-zone vote tabulation, where each vote in a given time zone is tabulated only after each voting location in the time zone is closed.

The system is built on the random number security system described above, which includes 1) the creation and the use of true random numbers from a QRNG that in themselves carry no information, and thus are inherently secure; 2) a voting application that is downloading with its own unique ARN that is used to interface with databases; and 3) a quantum number encryption (QNE) system based on the most secure encryption approach ever created (i.e., one-time random symmetric keying).

Figure 17:
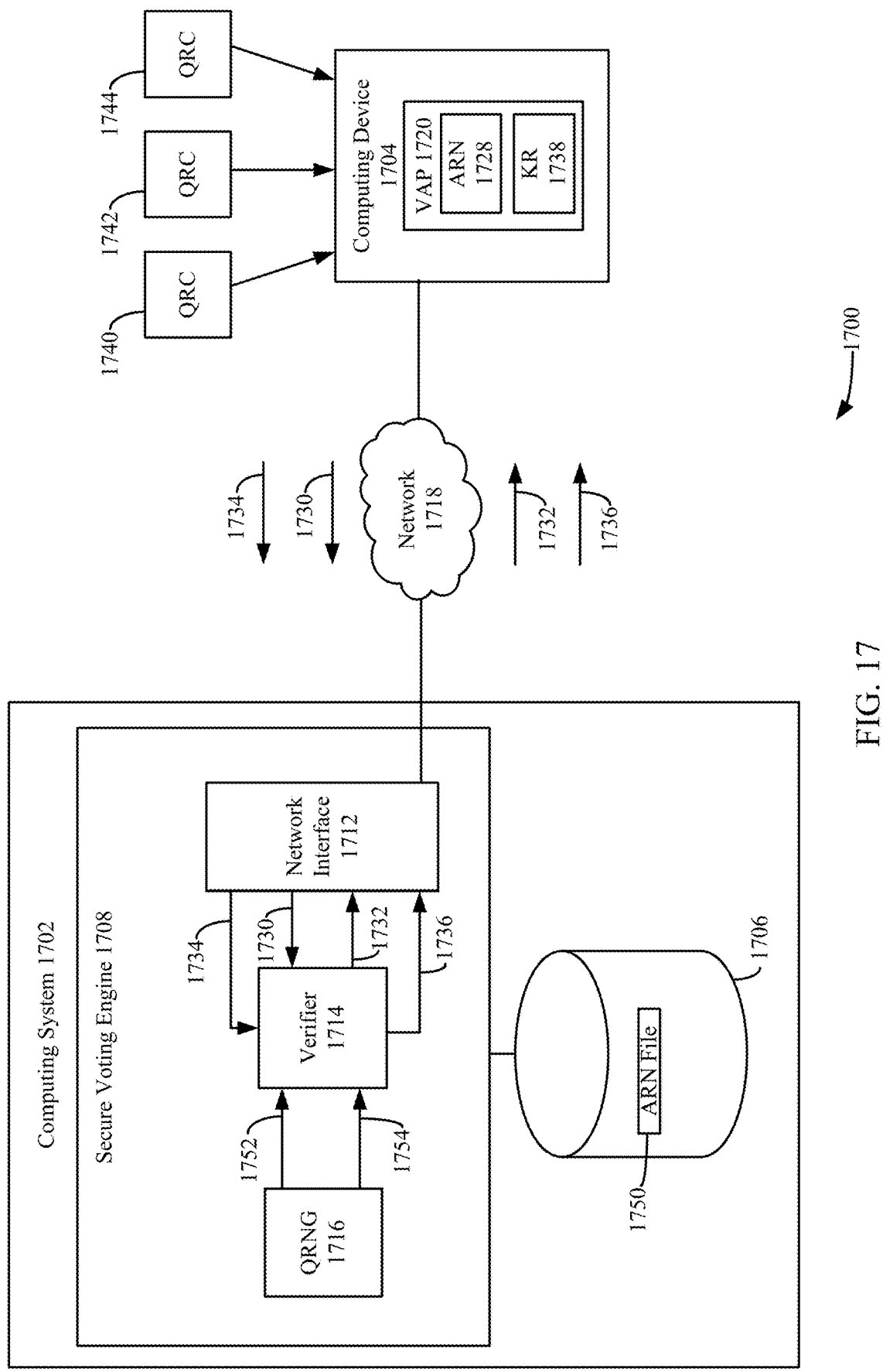
FIG. 17 depicts a system for secure voting in accordance with an example embodiment.

For example, FIG. 17 depicts a system 1700 for secure voting in accordance with an example embodiment. As shown in FIG. 17, system 1700 includes a computing system 1702 and a computing device 1704, which are examples of computing system 102 and computing device 104, as respectively described above with reference to FIG. 1. Computing system 102 and computing device 104 are communicatively coupled via a network 1718, which is an example of network 118, as described above with reference to FIG. 1. Computing device 1704 comprises a voting application (VAP) 1720, which executes thereon. Computing system 1702 comprises a secure voting engine 1708 and an electronic voter database (EVDB) 1706. Secure voting engine 1708 comprises a QRNG 1716, a verifier 1714, and a network interface 1712. QRNG 1716 and network interface 1712 are examples of QRNG 116 and network interface 112, as respectively described above with reference to FIG. 1.

If a voter desires to vote electronically with computing device 1704 (e.g., a smartphone), they will log onto the state of residence voter registration website (e.g., using a browser application executing thereon) where they will check the appropriate box for the request and update any information that has changed, such as street address, phone number, email address, preferred method of contact, etc. They will need to check that have read voter information which includes a reminder for fraud penalties.

A few days later they will receive in the mail a letter addressed to the voter with the following content and instructions: A first Quick Response Code (QRC) 1740 with a URL encoded therein for downloading the voting application (VAP) or instructions to go to a download site to download the VAP, a second QRC 1742 with the ARN of the VAP encoded therein, a third QRC 1744 which comprises the first symmetric (or secure) key (SK1) for the VAP.

Upon download, VAP 1720 instructs the user to read second QRC 1742, which has ARN 1728 of VAP 1720 encoded therein. After ARN 1728 is obtained, VAP 1720 provides GUI screen(s) that enable the user as an authorized voter by asking for date of birth, SSN, driver's license (if applicable by the state) and signature. VAP 1720 may then instruct the user to read third QRC 1744, which includes SK1 for VAP 1720, which is stored in a key register 1738 of VAP 1720. Key register 1738 is an example of key register 138, as described above with reference to FIG. 1. VAP 1720 may then encrypt the user enrollment information with SK1 and send it, via a message 1730 to computing system 1702, along with its unencrypted ARN 1728. Network interface 1712 receives message 1730 and provides message 1730 to verifier 1714. EVDB 1706 comprises an ARN record or file 1750 for the voter that stores the appropriate authentication data and SK1, which is generated by QRNG 1716. ARN 1728 of the incoming encrypted message 1730 is used to open ARN file 1750 in EVDB 1706 to retrieve SK1 included therein, which will be used to decrypt message 1730 and to verify the authentication contents of message 1730 with that in ARN file 1750. A data match causes verifier 1714 to provide a message 1732 to VAP 1720 via network interface 1712 and network 1718. Message 1732 includes a new SK2 1752 generated by QRNG 1716 that is encrypted with SK1, which VAP 1720 uses to decrypt the new SK2 1752 and store it in its key register 1738. For example, SK2 1752 may replace SK1 in key register 1738. Secure voting engine 1708 may also store SK2 1752 in ARN file 1750. Computing system 1702 may then send to VAP 1720 instructions for the user to wait for a notification that the ballot is ready for voting.

When the voter receives a notification (e.g., a push notification) by the selected notification means that the ballot is ready for voting, the user can select the input means, including voice or touch screen via VAP 1720. When the vote is completed, the user enters the vote via a user-interface element of VAP 1720 (e.g., a "submit" or "submit ballot" button. VAP 1720 then converts the ballot to an QRC image. The QRC image, along with the time/date stamp of when the ballot was cast, and/or the GPS (Global Positioning System) geolocation coordinates of computing device 1702 are encrypted by VAP 1720 using with SK2 1752. The encrypted data, along with the unencrypted ARN 1728, is to computing system 1702 via one or more messages 1734. VAP 1720 retains in its memory the ballot along with the time/date stamp and GPS geolocation coordinates.

Network interface 1712 receives message(s) 1734 and provides message(s) 1734 to verifier 1714. Verifier 1714 uses ARN 1728 to open the user's ARN file 1750 to retrieve SK2 1752 stored therein to decrypt the ballot QRC, the time/date, and GPS geolocation coordinates included in message(s) 1734. QRNG 1716 may generate a new secure key (SK3 1754), and verifier 1714 may encrypt SK3 1754 with SK2 1752 and send the new SK3 1754 to the VAP 1720 via a message 1736. VAP 1720 uses SK2 1752 to decrypt and retrieve the new SK3 1754 and stores it in its key register 1738 (e.g., SK3 1754 replaces SK2 1752 in key register 1738). Secure voting engine 1708 may also store SK3 1754 in ARN file 1750.

The decrypted file for the ballot QRC image, time/date and GPS geolocation coordinates are filed in a submitted vote folder labeled with SK3 1754 (e.g., in EVDB 1706) and accessible only via SK3 1754 and contains the ballot QRC image, time/date, and GPS geolocation coordinates. These folders will not be associated with ARN 1728 or any other information that could be tracked to a particular voter.

At any time, a voter can access their submitted vote SK3 folder by sending only their SK3 1754 to computing system 1702, which opens up the folder to view the ballot QRC image, time/date, and GPS geolocation coordinate.

VAP 1720 reads the QRC image to retrieve the ballot and compares to the one it has stored on computing device 1704 to confirm that the vote submitted is the same as the vote sent. Further confirmation is with a match to the time/date and GPS geolocation coordinates.

Computing system 1702 encrypts the ballot QRC, SK3 1754, time/date, and GPS geolocation coordinates and sends it to another database communicatively coupled thereto (e.g., Vote Counting Data Base (VCDB)) via a message, which decrypts the message, reads the QRC ballot image to retrieve and count the vote. The decrypted SK3 1754 is encoded into a QRC image where it and the ballot QRC then goes into a "print" file for hardcopy printout where they are printed together.

The decrypted file for the ballot QRC image, time/date and GPS geolocation coordinates are filed in counted vote folders labeled with SK3 1754 and accessible only through SK3 1754 and contain the ballot QRC image, time/date, and GPS geolocation coordinates.

At any time, a voter can access their counted vote SK3 folder by sending only their SK3 1754 to the VCDB which opens up the folder to view the ballot QRC image, time/date, and GPS geolocation coordinate.

VAP 1720 reads the QRC image to retrieve the ballot and compares to the one it has stored on computing device 1704 to confirm that the vote counted is the same as the vote sent. Further confirmation is with a match to the time/date and GPS geolocation coordinates.

If a hand count is invoked or fraud is claimed requiring printing out the QRC ballot/SK3 1754, the SK3 1754 can access its ballot file in the VCDB to compare the printout ballot with the one submitted. The SK3 1754 could also access its ballot file in EVDB 1706 to ensure a match.

If for some reason fraud is suspected and a voter wants to see their printed ballot, they could have their VAP 1720 submit their SK3 1754 to another database (e.g., fraud detection database" (FDDB)). which is then sent to the VCDB which prints the QRC/SK3 QRC image associated with SK3 1754 and then scans and sends it to the FDDB SK3 file, which the voter can access with their SK3 1754 through their VAP 1720. In this way the voter can confirm with no doubt the integrity of their vote.

The SKs are created and sent for use from a random number database (RNDB) (e.g., database 106, a shown in FIG. 1) that tracks their use only in the sense that they indeed were created by the RNDB. This process closes out any opportunity to add fake votes to the VCDB as fake SK3s would have to be created which the RNDB would flag as numbers not created by the RNDB.

The only way an electronic voting system will be trusted is if an individual voter can verify its integrity. The system described above achieves this capability where the hard copy ballot can be compared to the one stored on their computing device. Hand count of the printed ballots compared to the electronic count will validate the integrity of the system from beginning to end. The system described herein should then hopefully restore faith in a vital bedrock of our democracy, the voting system.

In accordance with an example embodiment, the voting system described herein may be utilized with paper ballets. Internet connectivity has resulted in hacking allowing tampering of the votes. The only truly secure approach is to have no internet connectivity. Inside job hacking of the voting system has also led to vote tampering, so the system needs to be invulnerable to vote changes from hacking attacks. Today, no rigorous system is in place to protect the security of stored ballots, and even with tamper evident seals skilled intruders can do damage. So, a truly secure voting system needs to be able to protect the integrity of stored ballots.

Figure 18:
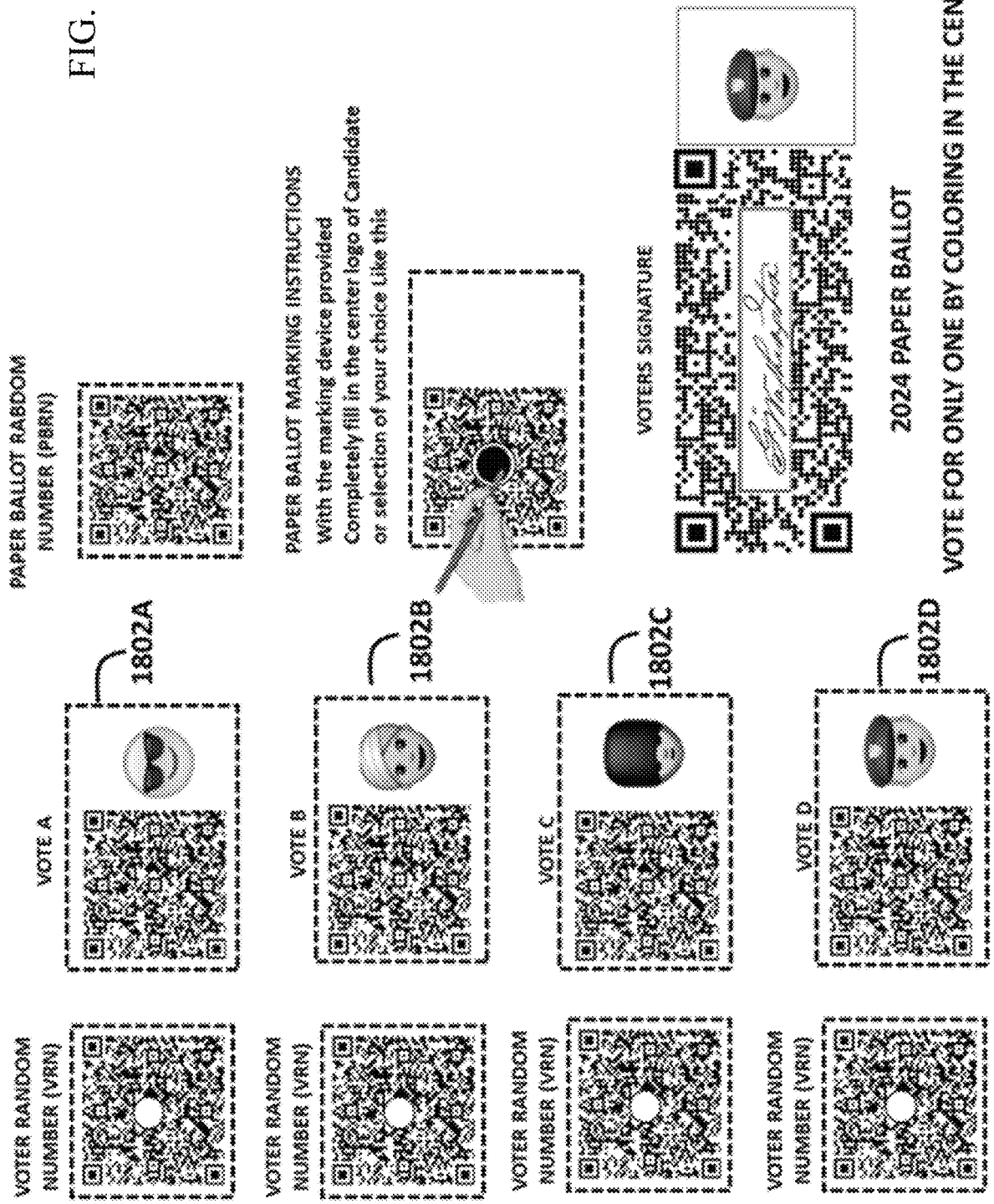
FIG. 18 depicts secure ballots in accordance with example embodiments.

In accordance with the embodiments described herein, paper ballots are printed where each one is unique such that: 1) a unique random number (RN) QRC is printed somewhere on the ballet and is referred to as the Ballet RN, BRN; 2) each vote choice will be a unique RN QRC with a fill-in circle in the middle, where the circle is filled in to select a vote choice, whereby by filling in the circle makes the QRC readable (this QRC is referred to as the Vote RN, VRN). The VRN will have the choice name and perhaps also a picture adjacent to it. The selected VRNs are referred to as SVRNs; 3) before or after a ballot is marked by a voter at a voting booth, or at home for mail-in voting, the voter can take a picture of the BRN QRC with a downloaded smartphone voter app (e.g., VAP 1720, as shown in FIG. 17) to retrieve the BRN for later verification of their vote; 4) mail-in ballots would be in envelopes with a tracking QRC, and a voter authentication sheet with a QRC that encircles a signature block. Examples of such ballots are shown in FIG. 18, which depicts example QR code-based paper ballots 1802A-1802D in accordance with an example embodiment.

Referring again to FIG. 17, RNs are generated and provided by QRNG 1716 and may be stored in USB memory sticks. Using the USB memory sticks, the RNs may be read into a RNDB of the state voting counting system, which is described below. Each vote choice, or candidate, has a RN associated with it, the Candidate RN, CRN. Each CRN will be associated with the candidate's name. Each VRN will be associated in the RNDB with a CRN to identify it to the vote choice it represents.

The pre-vote RNDB will have the VRNs associated with CRNs which are associated with candidate names, which will be provided to vote count centers on USB memory sticks.

At a voting center, the marked ballot is read by a scanning device or ballot reader that comprises a QRC reader, which reads the BRN and the marked VRN QRCs to retrieve the selected VRNs, SVRNs, and "nests" them in a created BRN folder in a Data Collection File, DCF. For mail-in ballots, the ballots are read in as they are received or in batches. After all ballots are read in, the DCF is downloaded onto a USB memory stick to transport to the Vote Counting Center (VCC). To anyone viewing the DCF it will be just a list of RNs which in themselves contain no information so can't be tampered with or altered in any way that isn't immediately discoverable by the RNDB. It is, therefore, inherently secure. As there will be many voting centers across a state, the RN identifier for the vote center, the VCRN, will also be attached to the DCF file.

Because of the inherent security of the DCF it is feasible to consider sending the DCF by a secure internet connect from a stand-alone computer to the VCC. It may be desirable and optional for the ballot reader to include a "mask scan" for the marked areas to count the number of votes for each candidate and ballot question. This vote count would be kept local to the voting center and would be used only to compare to the VCC vote count results for that voting center. The respective results should be identical and substantial differences would launch an investigation as to why leading perhaps to a manual ballot count.

An additional step is required to authenticate the voter signature QRC which would require access to that database, either by a stand-alone computer with internet access to it, or to the files downloaded onto a memory stick.

The scanned ballots accumulate into a box "stacker" and when they reach a pre-determined batch size, the box is transported to an off-load point and a new box is moved into stacking position. When the box is transported, it is automatically or manually sealed and a tamper evident label is affixed, and a pre-printed QRC on one side of the box is read by a QRC reader, which retrieves the box Storage unique alpha-numeric ID, the SID, which is also printed on the box for human reading. The BRNs in the batch are nested with the SID in a Ballot Storage File, BSF. When all the ballots are scanned and boxed, the boxes are stored in a secure facility with the printed SID outward for fast identification by a human. The BSF is downloaded onto a memory stick.

At the VCC, the memory stick DCF from each vote center is uploaded into the RNDB hosted on a computer that will do the vote tally. Now the post-vote RNDB will have the pre-vote RNDB data plus the BRN folders with the selected SVRNS. This computer does not have internet connectivity so can't be hacked or tampered with from outside attackers.

Vote counting is executed by a program that goes one at a time to each BRN folder, and to each SVRN in the folder one a time, matching it with that VRN in the RNDB with the associated CRN, which in turn is matched to the candidate associated with that CRN, and logging that candidate into a Vote Result File, VRF, which could be file folder for each candidate labeled by the CRN and the SVRNs for that CRN listed in it, with a total listing count. The total listing count is the number of votes a candidate got and can be displayed and printed out. During this process, any RN discrepancy is flagged where there is not a match in the RNDB with those in the BRN folders. Those BRNs with discrepancies are downloaded onto memory sticks by voting center VCRN. The voting center representative will take their discrepancy memory stick file, DF, back to the voting center for resolution. Any discrepancies will be the result of QRC reading errors when the ballots were scanned in.

Vote tampering at this point would have to be an inside job by someone who is authorized to log on and go into the files. But what could they tamper with that wouldn't be obviously discoverable? They could try to change the CRN of a candidate to that of the opponent so that all the votes would go to one person, but that is immediately obvious. They could try to access each VRN to change a fraction of those to associate with the CRN of the opposing candidate. This would work but is an approach that can be defeated by having the VRNs in the RNDB discoverable only by knowing the VRN to begin with. So, the attacker would have start with the BRN folder and go through the SVRNs one by one to match with their VRNs in the RNDB and change only those CRNs that are relevant to the target candidate. This would be an extremely tedious task to do manually, so a program would have to be written to execute automatically. This attack could be defeated by having the computer to be a "special purpose" one which executes only the "hard wired" program but is not programmable to do anything else.

The only remaining attack would be on the VRF itself, to hack into the file and move SVRNs from one CRN folder to another. However, this attempt would also be instantaneously discoverable by having every time the folder is opened or reviewed doing a self-consistency check by comparing the SVRNs in a CRN folder to those in the RNDB to see if the CRN they are associated with matches that with the CRN folder they are in. If not, an alert flag is set for a tamper attempt. The computer access log-in file would identify the person attempting the attack. Another way to defeat this attack as to have the VRF written to a USB memory stick that is then removed where it can't be tampered with. When it is inserted at any time in the future, the self-consistency check is executed to verify that it has not been tampered with.

Another file the vote counting computer will create is the Voter Access File, the VAF, by accessing each BRN folder in the DCF, and going through each SVRN in the folder to match it with its VRN in the RNDB to retrieve the candidate's name and creating BRN folders in the VAF with the selected candidate names listed in the folder. The VAF is downloaded onto a memory stick, which is inserted into a separate computer that is connected to the Internet. If a voter wishes to confirm their vote was counted, they use their downloaded voter app (e.g., VAP 1720) with the retrieved BRN from their ballot to log onto this VAF computer. VAP 1720 then sends the BRN to the VAF file which uses the BRN to access the BRN folder that matches the supplied BRN and retrieves the names of the selected candidates and sends those to the voter. If there is a discrepancy the voter can use their app to send the BRN to a fraud reporting website, where a person will insert the BSF memory stick into that computer to retrieve the SID of the box the ballot that matches the BRN is stored in. The computer will display the BRN QRC on the computer display screen or print it out, and the person will take a picture of that with their smartphone with an app downloaded for the purpose of ballot retrieval. The computer will access the VAF to retrieve and print out the vote choices for that BRN. The person will go to the storage facility and retrieve the identified box and take it to a separate room or area, opens it, scans the BRN QRC of every ballot in the box with their smartphone and when the one that matches the BRN of interest the app will present a display or audible alert that the correct ballot has been located. The person removes the ballot and visually checks that the vote choices match with those on the printout for the BRN. If it matches, the ballot is scanned with a scanner in the area or room to create an image file that is sent to a BRN examination file on the person's computer. The image file will be sent to the voter. The ballot will be returned to the box it was removed from, a new tamper evident label attached, which is signed and dated by the person along with the case resolution number assigned to the person. The box is then returned to the storage area.

If the ballot choices don't match those of the printout for that BRN, the person will take the ballot back to their workspace for resolution. The box the ballet was removed from is re-closed, and the person affixes a temporary tamper evident label on it and signs their name on it with the date and the case resolution number that was assigned to the person. The person will then take the ballot to their workspace and examine it for evidence of tampering, marking errors, or printing errors such as streaks through the QRC that could confuse the reader. However, such errors should have resulted in RNs not in the RNDB and should have been caught in the vote counting process described above. However, in the remote chance that such errors were not caught and if there is no evidence of tampering ballots compromised by marking or printer errors will be re-created if required. This exact process of examining ballots by voter alerts is also used to examine the ballots in the DF.

If the examined ballots show no sign of compromise that would result in a miss-read, then a system fault is suspected, and ballots will be pulled at random from storage to see if the physical marking vote choices match those from the VAF. If some of those don't match and are not physically compromised, a full forensic investigation for either system error or fraud is launched, and a hand count of the ballots is initiated.

Compromised ballots where the voter intent is clear can be recreated but by authorized staff at the voting center. The compromised ballots will be sent to the voting center where they will be counted and stored. New ballots are printed by the vote counting computer using RNs from the RNDB that are not already allocated but with special "nested" BRNs that have the original BRN QRC embedded in the new BRN for traceability of the replacement ballot back to the original. These ballots are marked by a staff person with an observer to ensure the new ballot reproduces the intent of the original. They are then scanned in by an on-site standalone reader and the results downloaded to a memory stick, which then is inserted into the vote counting computer to include those results in a final count.

Ballots that show evidence of tampering will be mail-in, as there is no opportunity to tamper a ballot from a voting booth to the reader. Mail-in ballet BRNs could be associated in the RNDB as being assigned to mail-in ballots for immediate indication of being mail-in. Tampering the ballot is difficult, requiring a marked in area of the QRC to be covered over to allow marking in another QRC and would be obviously evident. It may be that the voter changed their mind and tried to change their vote markings and only a few of those should be seen as a person should normally remember their vote and wouldn't report the vote as fraudulent when reviewing the VAF result. However, a substantial number of mail-in ballots that show evidence of tampering that have been flagged by voters on reviewing the VAF as possibly fraudulent would launch a major investigation resulting in random pulling mail-in BRN ballots from storage for inspection. If wide-spread tampering were found, where it could have occurred and by whom would be investigated for identifying and prosecuting the guilty parties.

6. Securing Bluetooth Networks

To create a secure Internet interface to a network between any legacy Bluetooth device or system, the first step is to turn off the wireless link then connect it through any hardwired Ethernet port (or equivalent) by plugging it into an existing Secure Access Portal (SAP) device, such as any TAPS key-secured NFC Smart Phone, Tablet, etc. running a DIA app. Alternatively, one of the TAP-enabled Bluetooth devices in the network can become a SAP by the methods explained above, with the use of key cards or a smart phone SAP.

The SAP then becomes the Internet access port to the Bluetooth network, which is now an RNSS TAP Network. Access and authentication into a TAP network are only by authorized users whose DIA has the current secure communication key, downloaded onto their key-secured smart phones or tablets, etc. The SAP allows all decryption of any incoming data strings, commands, messages, etc., so any incoming stream that is not encrypted with that current key will be unintelligible to the SAP and rejected as being not legitimate input. The foregoing embodiment is described in further detail below with reference to FIG. 19.

Figure 19:
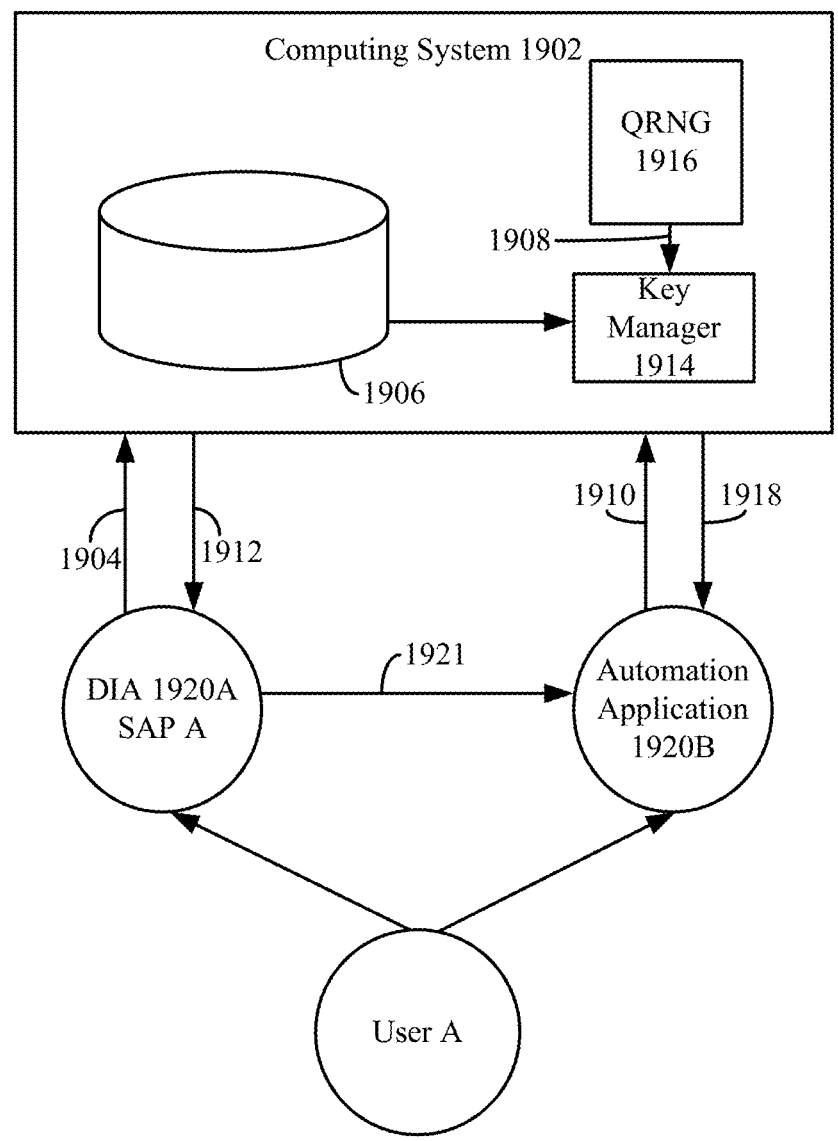
FIG. 19 depicts a block diagram of a system for securing a Bluetooth network in accordance with an example embodiment.

FIG. 19 depicts a block diagram of a system 1900 for securing a Bluetooth network in accordance with an example embodiment. As shown in FIG. 19, system 1900 comprises a computing system 1902, a DIA 1920A, and an automation application 1920B. Computing device 1902 and DIA 1920A are examples of computing device 102 and DIA 120, as respectively described above with reference to FIG. 1. Computing device 1902 comprises a key manager 1914, a QRNG 1916, and secure database 1906. Key manager 1914, QRNG 1916 and secure database 1906 are examples of key manager 114, QRNG 116 and database 106, as respectively described above with reference to FIG. 1. DIA 1920A and automation application 1920B are configured to be executed on a computing device (e.g., computing device 104, as described above with reference to FIG. 1). DIA 1920A and automation application 1920B may be incorporated together in a single application.

On being plugged into a centralized security manager, SAP A of DIA 1920A sends its ARNID (i.e., ARNA) to computing system 1902 via a message 1904. Responsive to receiving message 1904, key manager 1914 retrieves the last RNID (secure) key associated with ARNA from database 1906. QRNG 1916 generates a new globally-unique random value, which is designated as a new secure key 1908. Key manager 1914 may store new secure key 1908 in database 1906 in association with the ARNA. Key manager 1914 encrypts new secure key 1908 with the current RNID key retrieved from database 1906, and sends it the SAP A via a message 1912. DIA 1920A replaces the last secure key stored in its key register with new secure key 1908.

By way of example, a Bluetooth TAP network is User A's home automation and security system, and only him and his wife are authorized users and can only access it through their smart phones, tablets etc. with an automation application (e.g., automation application 1920B) executing on their respective devices. Their automation applications and DIAs have previously been enrolled with their biometric data for user verification. Each of their devices contains the ARNIDS of the respective DIAs and automation applications.

User A and wife are returning from a winter getaway vacation, and upon landing User A instructs his automation application 1920B (which has its own ARNID) to turn up the temperature in the house to 68 degrees and turn the lights on to "welcome home", which are the outside lights, the garage lights, and entry foyer lights. Automation application 1920B sends an "access SAP" request 1910 to computing system 1902. Request 1910 may include the ARNID of automation application 1920B and the ARNA, which may be provided to automation application 1920B by DIA 1920A. Responsive to receiving request 1910, key manager 1914 may retrieve the current SAP RNID key (the secure key associated with DIA 1920A) and sends a message 1918 to automation application 1920B, which includes the secure key retrieved from database 1906 (which is encrypted using the RNID key (or secure key) associated with automation application 1920B). Automation application 1920B (or TAP thereof) decrypts it to obtain the SAP RNID key. Then automation application 1920B encrypts the command string that specifies the user's instructions for controlling the temperature, lights, etc., using the SAP RNID key and sends it to the SAP A of DIA 1920A via a message 1921. DIA 1920A decrypts the command string and executes the command string. DIA 1920A then sends its ARNA to computing system 1902 and key manager 1914 the current RNID key associated with ARNA and uses that to encrypt the next RNID key (generated by QRNG 1916) and sends it back to the SAP A of DIA 1920A.

Anyone eavesdropping on this communication channel would see only a random bit stream with no way to break into it. Anyone other than the authorized users attempting to access SAP A would be denied access because their input stream would be decrypted as gibberish.

The level of security provided by the approach of the embodiments described herein is unsurpassed by those previous. For example, a key security vulnerability with current bit coin approaches is that they are public systems, which invites hackers to try to break into the system, which they have successfully done, stealing tens of millions worth of bit coins. The approach described herein avoids this problem by a having a centralized database, which can be highly secured both electronically and physically. Also, the only entity accessing computing system 1902 is DIA 1920A; no person or computing device without DIA 1920A can access it. The only exception is the public web site for requesting the download of the application.

Figure 21:
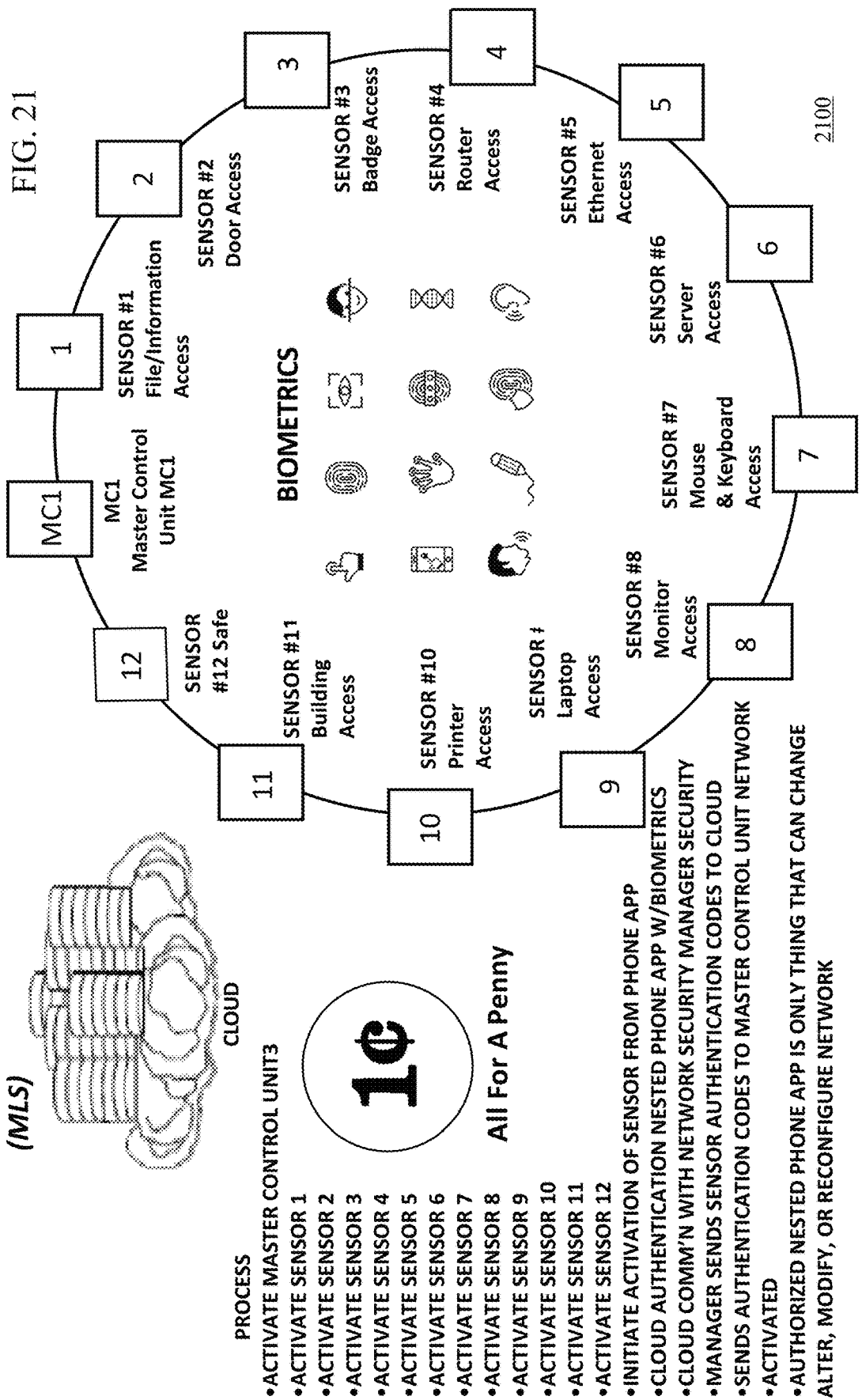
FIG. 21 shows a block diagram of an example secured local area network in accordance with example embodiment.

It is noted that while the embodiments described herein are directed to securing Bluetooth networks, other types of networks may also be secured utilizing the embodiments described herein, such as, but not limited to a local area network (LAN), or a wide area network (WAN). For example, FIG. 20 shows a block diagram 2000 of an example secured Bluetooth network, according to an example embodiment. FIG. 21 shows a block diagram 2100 of an example secured LAN, according to an example embodiment.

Figure 22:
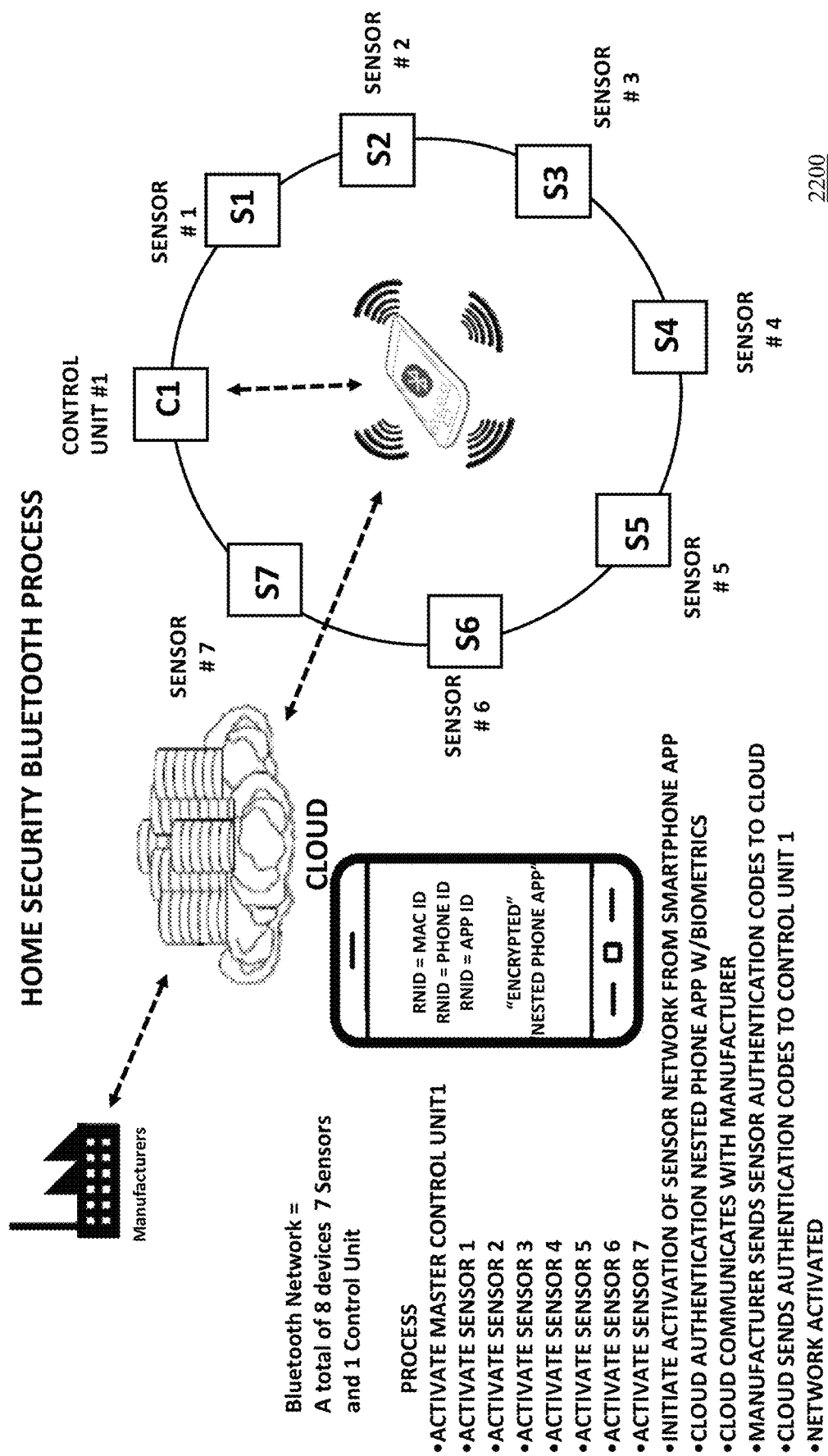
FIG. 22 shows a block diagram of a network formed with devices that each comprise a radio frequency identification/near-field communication tag in accordance with an example embodiment.
Figure 23:
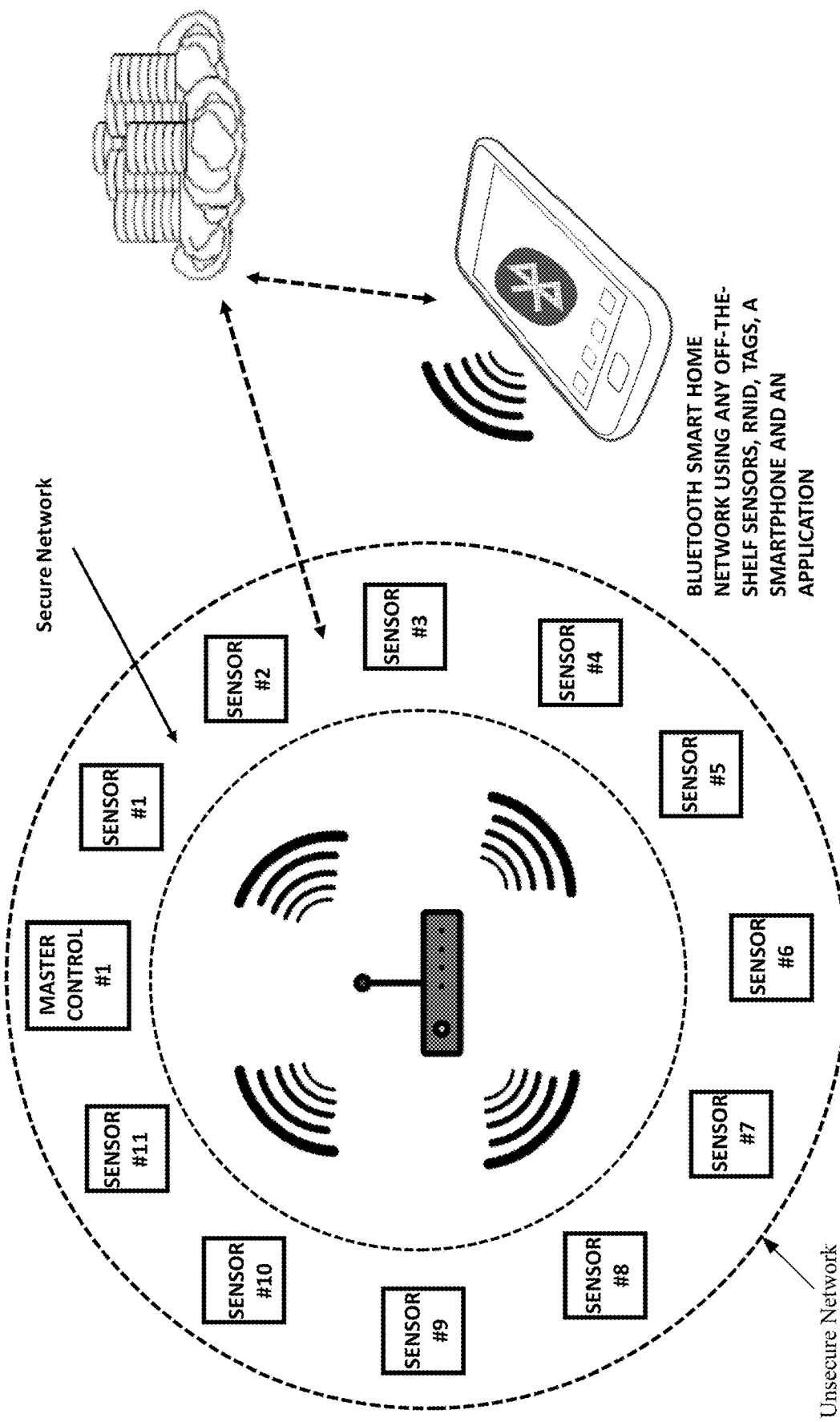
FIG. 23 shows a block diagram of a smartphone coupled to a plurality of devices via a secured network and an unsecured network in accordance with an example embodiment.

Methods, systems and apparatuses for cloud-based reconfigurable wireless sensor network(s) using Near Field Communication (NFC) tags with random number IDs are disclosed herein. The random number IDs of RFID/NFC tags attached or imbedded to every type of sensor manufacturer are used to create the network. For example, FIG. 22 shows a block diagram 2200 of a network formed with devices that each comprise a RFID/NFC tag, according to an example embodiment. By simply tapping the smartphone to any sensor tag (i.e., tag device) (e.g., touching the sensor tag with the smartphone, interacting with an interface element (e.g., a button) of the smartphone that causes a communication between the smartphone and the sensor tag, etc.), its unique ID is authenticated within the cloud and then to the sensor's manufacturer. For example, FIG. 23 shows a block diagram 2300 of a smartphone that is placed in proximity to a plurality of devices to obtain the random number IDs therefrom, which causes the ID of the smartphone to be authenticated, according to an example embodiment. Pertinent technical information for all sensors and IDs are then assimilated into the new sensor network. A physical sensor control unit which also can be the interface to the cloud through its own unique ID through the cloud can interface with the individual sensor's downloads and authenticates the final network. At any time, any network can be reconfigured with a simple tap of an authorized smartphone reader. Once a network is configured, then any control unit module (e.g., master device) within the network can then be authorized to interface to any smart device (i.e., washers, dryers, refrigerators, HVAC systems, utilities, security systems, smart home systems, cars, medical devices, etc.). Each and every device is completely secure within the network using simply a smartphone and tag with a random ID Read Only Memory (ROM) RFID/NFC/tag(s). These three things form the personalized/unique reconfigurable sensor network. The individual secure authentication interface and reconfigurability between any individual sensor, sensor to sensor or sensor to sensors are completely handled through the cloud and then communicated to the control unit as to what action or reaction is required. Any change to the secure network can be completed by the original authorized smartphone that setup the network.

In accordance with an embodiment, a plurality of RFID/NFC sensor/tag(s) are configured or imbedded into items to be interrogated via their unique ID(s) and NFC enabled smartphones (i.e., "Authorized Readers"). Furthermore, the readers communicate with one or more cloud networks which can be configured or reconfigured. Each of the readers include a unique MAC ID number which identifies that particular reader within a reader network during communications. Each reader includes a network interface module and an optimization module to receive and process statistical, state, and other data obtained from other readers in the network. Embodiments disclosed herein include a primary/secondary reader network configuration, as well as a distributed elements reader network configuration. A set of operational rules for the environment is indicated, and tag interrogations are optimized according to the rules. Smartphones may communicate via an application according to a Listen Before Talk (LBT) protocol, which would avoid undesirable interference. Individual smartphones are capable of dynamically establishing and joining a network and leaving the network in a self-configured and semiautonomous or autonomous manner.

7. Securing Remote-Controlled Device Networks

The following is an example of how one can secure any remote-controlled device or devices within a network or networks. By accomplishing this one can prevent any unauthorized entity into a controlled wireless access point, for example but not limited to vehicles, all types of doors (e.g., garage doors, home doors, etc.).

The Remote-Controlled Device (RCD) is programmed and controlled by a Secure Access Portal Device, (SAPD), with an RF interface. The Remote-Controlled Device (RCD) is programmed with short range NFC or Bluetooth by the SAPD. SAPD provides to the RCD's Random Number Secure Codes (RNSC) for all operations in l through j, where j is any positive integer (SCOj). SAPD provides the RCD's RN first secure key, SK1. To operate the RCD, the SAPD sends with an RF signal the SCOj encoded with SK1 followed by SK2 encoded with SK1. The RCD then decrypts with SK1 to retrieve SCOj for execution (open car door, garage door, house door, etc.) and to retrieve SK2, and replaces SK1 with SK2. RCD sets to receive next operation command.

To operate the RCD, the SAPD sends SCOj encoded with SK2 followed by SK3 encrypted with SK2. RCD then decrypts with SK2 in order to retrieve SCOj for execution and SK3 which replaces SK2. This is repeated with SK4 and so on, SK1. A listening device attack can only record the SCOj encrypted with Ski, SCOj: Ski, followed by Ski+1 encrypted with SK1, Ski+1: SK1, which will look like a meaningless string of random numbers. If the listening device tries later to send the recorded SCOj: Ski followed by Ski+1: SK1, the key will have been updated and the encrypted string won't decode to SCOj and RCD will ignore the result. The RCD waits for the next properly decoded command to execute and update the next key.

D. Delivering Random Number Keys Securely for One-Time Pad Symmetric Key Encryption Embodiments described herein are configured for the provision of secure keys to an application. For instance, a first globally-unique value of a plurality of globally-unique values is received via a user interface of the application. The first globally-unique value and an application identifier of the application is provided to a computing system via a network. The computing system is configured to determine a second globally-unique value and a third globally-unique value associated with the first globally-unique value based on the application identifier. The second globally-unique value is then received via the user interface. The second globally-unique value is designated as a first secure key. The first secure key is stored in a first location of a memory of the computing device allocated for the application. A third globally-unique value is received via the user interface. The third globally-unique value is designated as a buffer key. Subsequent globally-unique values may be received via the user interface used to create delivery keys.

The embodiments described herein solve a major problem the industry has had with secure key delivery preventing wide-spread use of the most secure encryption scheme ever invented, one-time random number pad symmetric keying that could stop most of cybercrime. The embodiments described herein are uniquely secure and survive well known cryptologic attack strategies such as for "known message" and "man-in-middle." It is also future proofed against quantum computing attack, which most cybersecurity encryption methodologies in use today are extremely susceptible to creating what is being referred to as the "Y2K" problem of cybersecurity.

Claude Shannon proved in 1948 that one-time pad random number (RN) symmetric key encryption (OTPSKE) provides "perfect security" only if. 1) The RNs are truly random; 2) The RN Symmetric Key (SK) is kept perfectly secret; 3) The SK is used only once; and 4) The SK is the same length as the message (M).

It is the consensus that OTPSKE is the most secure encryption scheme ever invented, and was widely used by the government and military during World Wars One and Two. Armed couriers physically delivered pads of random numbers that operators would use to encrypt messages tearing one page of random numbers after another on the pad. Moving this approach beyond physical delivery of the RN Pads to delivering the symmetric keys, SKs, "over the air" has proven challenging particularly with criteria #2 above. No one has been able to deliver them in a way that keeps them perfectly secret. The embodiments described herein present a uniquely novel method for the secure delivery of SKs that does keep them perfectly secret.

1. New Key Distribution

For example, the embodiments described herein describe an approach for the secure delivery of first SKs, which then enable the subsequent delivery of future SKs. Such embodiments are now described below.

Figure 24:
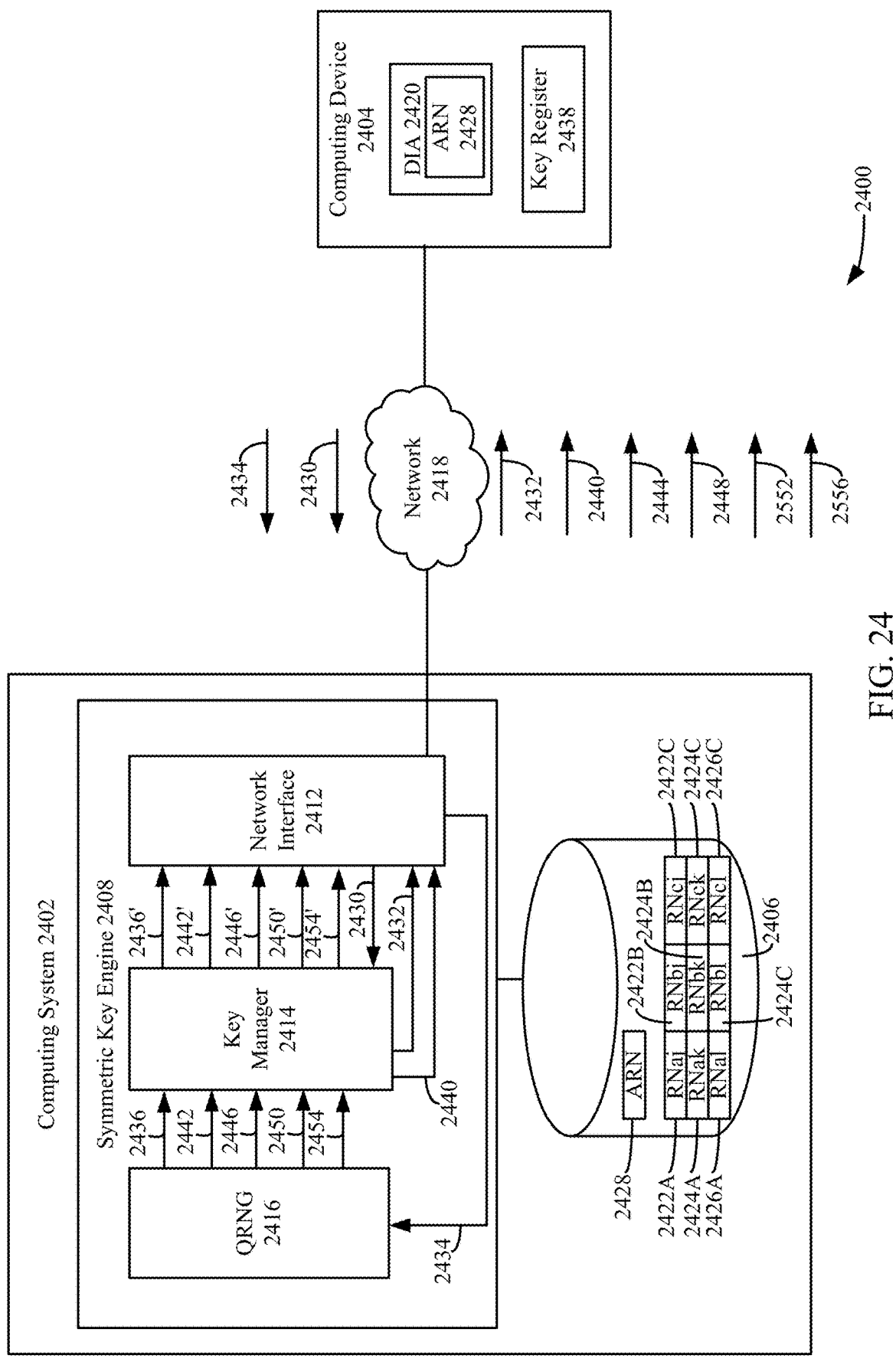
FIG. 24 shows a block diagram of a system configured to provide a secure key to a computing device.

For example, FIG. 24 shows a block diagram of a system 2400 configured to provide a secure key to a computing device, according to another example embodiment. As shown in FIG. 24, system 2400 includes a computing system 2402 and a computing device 2404, which are examples of computing system 102 and computing device 104, as respectively described above with reference to FIG. 1. Each of computing system 2402 and computing device 2404 may be communicatively coupled to each other via a network 2418, which is an example of network 118, as described above with reference to FIG. 1.

As also shown in FIG. 24, computing system 2402 comprises a symmetric key engine 2408 and maintains a database 2406. Symmetric key engine 2408 comprises a quantum random number generator 2416, a network interface 2412, and a key analyzer 2414, which are examples of quantum random number generator 116, network interface 112, and key analyzer 114, as respectively described above with reference to FIG. 1. It is noted that database 2406 may be external to and/or communicatively coupled to computing system 2402 via network 2418.

QRNG 2416 is configured to generate globally-unique number or values (e.g., random number or values) or identifiers (RNIDs). QRNG 2416 may be configured to generate a true multi-bit (e.g., 256-bit) unique random number value based on quantum physics (e.g., by utilizing photo polarization techniques, radioactive decay detection-based techniques, etc.). Individual globally-unique RNIDs may be assigned to any entity that is of interest to be accounted for, including both tangible items (e.g., any physical object, including, but not limited to, land, vehicles (and any component thereof), equipment (and any component thereof), inventory, etc.)) and intangible items (e.g., software applications, non-fungible tokens, licenses, trademarks, etc.). Each generated RNID is globally-unique in that no RNID is used twice globally—that is each tangible and intangible item (regardless of its location globally) is assigned an RNID that is different.

As further shown in FIG. 24, computing device 2404 may comprise a database interface application (DIA) 2420, which is an example of DIA 120, as described above with reference to FIG. 1. DIA 2420 may be downloaded from computing system 2402. A globally-unique number or value (e.g., generated by QRNG 2416) may be assigned to each instance of DIA 2420 that is installed on any given computing device and/or associated with any given user of such computing devices. The RNIDs assigned to each instance of DIA 2420 may be maintained in database 2406. It is noted that database 2406 may maintain any number of RNIDs that have been assigned to any given tangible or intangible object or entity. Any of the RNIDs maintained by database 2406 may be assigned to any specific person, process data, or thing (either tangible or intangible). In addition, any of RNIDs maintained by database may be associated with another database.

To prevent any eavesdropping and/or unauthorized use by any malicious party, DIA 2420 uses a one-time pad symmetric RN key system for secure communications with authorized user authentication. After DIA 2420 has been downloaded to computing device 2404, DIA 2420 may enroll a user of computing device 2404 by first requesting that the user should provide some type of biometric authentication (i.e., fingerprint, facial recognition) input and/or as well as a user created Personal Identification Number (PIN) to verify and authenticate that the proper authorized user is using DIA 2420. This information is stored locally in a memory of computing device 2404 allocated for DIA 2420, and user authentication is achieved locally with DIA 2420 comparing the biometric data of the user (e.g., received from a camera of computing device 2404) to the biometric data stored locally in computing device 2404. If the data matches, then the user is provided access to DIA 2420. If not, DIA 2420 informs the user that he/she is not authorized to use DIA 2420.

After user validation enrollment, DIA 2420 instructs the validated authorized user to secure a primary RN secure key (RNSK) for subsequent transaction communication that will always be secured by one-time pad RN symmetric keying, where the RNSK is always updated at every communication as will be further described herein. Once the RNSK is obtained, another level of security is achieved by DIA 2420 sending facial recognition data to database 2406 using the RNSK to secure the communication channel. Once key-secured. DIA 2420 becomes operative as a secure access portal (SAP).

Quantum random number generator 2416 may be configured to generate a plurality (e.g., a trio) of globally-unique random numbers or values and maintain the plurality in database 2406. Each globally-unique random number or value in the plurality may comprise a 256-bit random number or value. As shown in FIG. 24, database 106 may store, for example, in a table, three trios of globally-unique random values (trio 2422A, 2422B and 2422C, trio 2424A, 2424B and 2424C, and trio 2426A, 2426B and 2426C). It is noted that database 106 may store any number of trios or pluralities (e.g., billions or trillions of trios or pluralities). It is further noted that each globally-unique random value may comprise any number of bits and that 256-bits is used herein for purely exemplary purposes. It is further noted that while the embodiments described herein disclose that the globally-unique values are random values, the embodiments described herein are not so limited. That is, each of the globally-unique values described herein may be non-random values (e.g., values determined in a deterministic manner).

The best way to securely deliver secure keys is not to do it wirelessly, over the air, as any eavesdropper could nab it and know all the subsequent keys. The embodiments described herein a method and approach for physical delivery. Each plurality (e.g., trio) of globally-unique random values may be distributed securely via a physically-implemented machine-readable format included into a variety of tamper evident packages or devices. Examples of physically-implemented machine readable formats include, but are not limited to, data encoded in one or more quick response (QR) codes (e.g., as described above with reference to FIGS. 2-3), data stored via near field communication (NFC)/radio frequency identification (RFID) tags (e.g., as described above with reference to FIG. 4A), data stored via Universal Serial Bus (USB) memory sticks, smart cards (e.g., smart card 400D, as shown in FIG. 4B), etc. An end user may obtain or purchase such packages or devices (comprising a pair of globally-unique random values) from a retail store, a business, a financial institution (e.g., bank), etc. As described herein, an obtained plurality (e.g., trio) is utilized to obtain a symmetric key using DIA 2420. The key trios may be used to ensure maximum security. After a symmetric key is obtained, the user would also destroy or discard the packages or device once opened. The packages or device may be distributed in baskets, bins, or even shelves within retail stores or any other distribution channels that can be imagined. These processes would avoid any "man in the middle attack" between the key pairs and the end user. Unauthorized access by a third party needs to be avoided to ensure key integrity (thereby preventing a third party from reading the key pairs and knowing the intended user of it). As shown in FIG. 24, trio 2422A, 2422B, and 2422C may be included in a first package or device, trio 2424A, 2424B, and 2424C may be included in a second package or device, and trio 2426A, 2426B, and 2426C may be included in a third package or device.

As described above, DIA 2420 downloaded onto computing device 104 is assigned its own unique random value (e.g., a 256-bit random number) by computing system 2402. The random value assigned to DIA 2420 is referred herein as an application random number (ARN) 2428. Computing system 2402 may maintain a respective ARN (e.g., ARN 2428) for each instance of DIA 2420 in, for example, a table of database 2406. ARN 2428 becomes the user surrogate for database interactions instead of user private information.

After download, DIA 2420 may enroll the user as an entity authorized to use DIA 2420 through an authentication process, such as with a personal identification number (PIN), security questions, and/or biometric input like for example, facial and fingerprint recognition. After authentication, via one or more user interface screens (e.g., GUI screen(s)), instructs the user to obtain its first random number (RN) symmetric key (SK) through the process described below.

After a user has obtained their set (e.g., a trio) of globally-unique random values (e.g., from a retail store, a financial institution, etc.), the user may utilize DIA 2420 to obtain a symmetric key. DIA 2420 may be configured to walk the user through steps (e.g., via GUI screen(s)) that assist the user to load in their set. One example is the user will be first instructed to read one globally-unique random value of their set via the machine-readable format in which it is physically implemented. After reading in the first globally-unique random value of their set, DIA 2420 may send the globally-unique random value of their set "in the clear" (i.e., without any encryption) to computing system 2402, along with ARN 2428 of DIA 2420, via a message 2430. Message 2430 may be received by network interface 2412, which provides message 2430 to key manager 2414. For instance, suppose message 2430 comprises RNaj 2422A (of trio 2422A, 2422B, and 2422C). Key manager 2414 may then associate the other globally-unique random values in the trio (i.e., RNbj 2422B and RNcj 2422C) with ARN 2428 and designate the second globally-unique random value in the trio (i.e., RNbj 2422B) as a first secure key, and the third globally-unique random value in the trio (i.e., RNcj 2422C) as a buffer key. As will be described below, the buffer key is intended to make "man-in-the-middle" (MIM) and known message attacks difficult if not impossible. For example, as shown in FIG. 24, key manager 2414 may query database 2406 to determine the other globally-unique random values in the set and associates ARN 2428 with the other globally-unique random values (i.e., RNbj 2422B and RNcj 2422C), designates the second globally-unique random value in the trio (i.e., RNbj 2422B) as a first secure key (SK0), and designates the third globally-unique random value in the trio (i.e., RNcj 2422C) as a buffer key. Key manager 2414 may then provide a command 2432 to DIA 2420 that causes DIA 2420 to instruct the user to read another globally-unique random value of their set. Command 2432 may be provided to network interface 2412, which provides command 2432 to DIA 2420 via network 2418. Command 2432 causes DIA 2420 to instruct the user (e.g., via GUI screen(s)) to read another globally-unique random value of their set via the machine-readable format in which it is physically implemented. The other globally-unique random value that is read may be stored in a key register 2438 associated with DIA 2420 and may be designated by DIA 2420 as the first secure key. Key register 2438 may comprise a location in memory of computing device 2404 that was allocated for DIA 2420. In this manner, both key manager 2414 and DIA 2420 now associate the same globally-unique random value (i.e., RNbj 2422B) as the first secure key without the first secure key ever being sent over the air.

After reading in the second globally-unique random value, DIA 2420 may instruct the user (e.g., via GUI screen(s)) to read third globally-unique random value of their set via the machine-readable format in which it is physically implemented. The third globally-unique random value that is read may be stored in key register 2438 associated with DIA 2420 and may be designated by DIA 2420 as the buffer key. In this manner, both key manager 2414 and DIA 2420 now associate the same globally-unique random value (i.e., RNcj 2422C) as the buffer key without the buffer key ever being sent over the air.

The set could be read into DIA 2420 using various techniques described herein, including, but not limited to, the embodiments described above with reference to FIGS. 2-4.

After reading in the third globally-unique random value via DIA 2420, DIA 2420 may provide a message 2434 to computing system 2404 informing computing system 2404 that the second globally-unique random value has been stored in key register 2438 of DIA 2420 as the first secure key and that the third globally-unique random value has been stored in key register 2438 as the buffer key. Message 2434 may be received by network interface 2412, which provides message 2434 to QRNG 2416.

Symmetric key engine 2408 may then be configured to flush out (i.e., remove) the first secure key from key register 2438 of DIA 2420. Both symmetric key engine 2408 and DIA 2420 may be configured to generate a first encoded key. To generate the first encoded key, symmetric key engine 2408 may perform a bit-wise XOR operation on the first secure key (i.e., RNbj 2422B) and the buffer key (i.e., RNcj 2422C). The resulting value is the first encoded key. Similarly, DIA 2420 may generate the first encoded key by performing a bit-wise XOR operation on the first secure key (i.e., RNbj 2422B) and the buffer key (i.e., RNcj 2422C). QRNG 2416 may then generate a new globally-unique random value 2436 which is to be used as a new secure key (SK1). Globally-unique random value 2436 is provided to key manager 2414. Key manager 2414 may be configured to encrypt globally-unique random value 2436 (SK1) with the first encoded key. For instance, key manager 2414 may perform a bit-wise XOR operation on globally-unique random value 2436 (SK1) and the first encoded key. Key manager 2414 sends the encrypted globally-unique random value 2436 (shown as encrypted globally-unique random value 2436') to network interface 2412, and network interface 2412 sends a message 2440 to DIA 2420 comprising encrypted globally-unique random value 2436' via network 2418. DIA 2420 may decrypt encrypted globally-unique random value 2436' to obtain decrypted globally-unique random value 2436. For instance, DIA 2420 may perform a bit-wise XOR operation on encrypted globally-unique random value 2436' and the first encoded key. The resulting value is globally-unique random value 2436. DIA 2420 stores globally-unique random value 2436 as the second secure key (SK1) in key register 2438. For instance, DIA 2420 stores globally-unique random value 2436 in the same location at which the first secure key (i.e., RNbj 2422B) was stored. This process may continue for any number of iterations.

For instance, both symmetric key engine 2408 and DIA 2420 may be configured to generate a second encoded key. To generate the second encoded key, symmetric key engine 2408 may perform a bit-wise XOR operation on the second secure key (i.e., SK1) and the buffer key (i.e., RNcj 2422C). The resulting value is the second encoded key. Similarly, DIA 2420 may generate the second encoded key by performing a bit-wise XOR operation on the second secure key (i.e., SK1) and the buffer key (i.e., RNcj 2422C). QRNG 2416 may then generate a new globally-unique random value 2442 which is to be used as a new secure key (SK2). Globally-unique random value 2442 is provided to key manager 2414. Key manager 2414 may be configured to encrypt globally-unique random value 2442 (SK2) with the second encoded key. For instance, key manager 2414 may perform a bit-wise XOR operation on globally-unique random value 2442 (SK2) and the second encoded key. Key manager 2414 sends the encrypted globally-unique random value 2442 (shown as encrypted globally-unique random value 2442') to network interface 2412, and network interface 2412 sends a message 2444 to DIA 2420 comprising encrypted globally-unique random value 2442' via network 2418. DIA 2420 may decrypt encrypted globally-unique random value 2442' to obtain decrypted globally-unique random value 2442. For instance, DIA 2420 may perform a bit-wise XOR operation on encrypted globally-unique random value 2442' and the second encoded key. The resulting value is globally-unique random value 2442. DIA 2420 stores globally-unique random value 2442 as the third secure key (SK2) in key register 2438. For instance, DIA 2420 stores globally-unique random value 2442 in the same location at which the second secure key (i.e., SK1) was stored.

Both symmetric key engine 2408 and DIA 2420 may then be configured to generate a third encoded key. To generate the third encoded key, symmetric key engine 2408 may perform a bit-wise XOR operation on the third secure key (i.e., SK2) and the buffer key (i.e., RNcj 2422C). The resulting value is the third encoded key. Similarly, DIA 2420 may generate the third encoded key by performing a bit-wise XOR operation on the third secure key (i.e., SK2) and the buffer key (i.e., RNcj 2422C). QRNG 2416 may then generate a new globally-unique random value 2446 which is to be used as a new secure key (SK3). Globally-unique random value 2446 is provided to key manager 2414. Key manager 2414 may be configured to encrypt globally-unique random value 2446 (SK3) with the third encoded key. For instance, key manager 2414 may perform a bit-wise XOR operation on globally-unique random value 2446 (SK3) and the third encoded key. Key manager 2414 sends the encrypted globally-unique random value 2446 (shown as encrypted globally-unique random value 2446') to network interface 2412, and network interface 2412 sends a message 2448 to DIA 2420 comprising encrypted globally-unique random value 2446' via network 2418. DIA 2420 may decrypt encrypted globally-unique random value 2446' to obtain decrypted globally-unique random value 2446. For instance, DIA 2420 may perform a bit-wise XOR operation on encrypted globally-unique random value 2446' and the third encoded key. The resulting value is globally-unique random value 2446. DIA 2420 stores globally-unique random value 2446 as the fourth secure key (SK3) in key register 2438. For instance, DIA 2420 stores globally-unique random value 2446 in the same location at which the third secure key (i.e., SK2) was stored.

After determining the fourth secure key (SK4), both symmetric key engine 2408 and DIA 2420 may bit shuffle the buffer key (i.e., RNcj 2422C) based on any of the bits of the fourth secure key (SK3) using any suitable one-way algorithm. The new bit-shuffled buffer key is considered to be the child of both the original buffer key and fourth secure key (SK3) as it is derived based therefrom.

Both symmetric key engine 2408 and DIA 2420 may then be configured to generate a fourth encoded key based on the buffer key (i.e., RNcj 2422C) and not the bit-shuffled buffer key, as the children keys are not allowed to mate with their parent keys. To generate the fourth encoded key, symmetric key engine 2408 may perform a bit-wise XOR operation on the fourth secure key (i.e., SK3) and the buffer key (i.e., RNcj 2422C). The resulting value is the fourth encoded key. Similarly, DIA 2420 may generate the fourth encoded key by performing a bit-wise XOR operation on the fourth secure key (i.e., SK3) and the buffer key (i.e., RNcj 2422C). QRNG 2416 may then generate a new globally-unique random value 2450 which is to be used as a new secure key (SK4). Globally-unique random value 2450 is provided to key manager 2414. Key manager 2414 may be configured to encrypt globally-unique random value 2450 (SK4) with the fourth encoded key. For instance, key manager 2414 may perform a bit-wise XOR operation on globally-unique random value 2450 (SK4) and the fourth encoded key. Key manager 2414 sends the encrypted globally-unique random value 2450 (shown as encrypted globally-unique random value 2450') to network interface 2412, and network interface 2412 sends a message 2552 to DIA 2420 comprising encrypted globally-unique random value 2450' via network 2418. DIA 2420 may decrypt encrypted globally-unique random value 2450' to obtain decrypted globally-unique random value 2450. For instance, DIA 2420 may perform a bit-wise XOR operation on encrypted globally-unique random value 2450' and the fourth encoded key. The resulting value is globally-unique random value 2450. DIA 2420 stores globally-unique random value 2450 as the fifth secure key (SK4) in key register 2438. For instance, DIA 2420 stores globally-unique random value 2450 in the same location at which the fourth secure key (i.e., SK3) was stored.

Next, both symmetric key engine 2408 and DIA 2420 may then be configured to generate a fifth encoded key based on the bit-shuffled buffer key. To generate the fifth encoded key, symmetric key engine 2408 may perform a bit-wise XOR operation on the fifth secure key (i.e., SK4) and the bit-shuffled buffer key. The resulting value is the fifth encoded key. Similarly, DIA 2420 may generate the fifth encoded key by performing a bit-wise XOR operation on the fifth secure key (i.e., SK4) and the bit-shuffled buffer key. QRNG 2416 may then generate a new globally-unique random value 2454 which is to be used as a new secure key (SK5). Globally-unique random value 2454 is provided to key manager 2414. Key manager 2414 may be configured to encrypt globally-unique random value 2454 (SK5) with the fifth encoded key. For instance, key manager 2414 may perform a bit-wise XOR operation on globally-unique random value 2454 (SK5) and the fifth encoded key. Key manager 2414 sends the encrypted globally-unique random value 2454 (shown as encrypted globally-unique random value 2454') to network interface 2412, and network interface 2412 sends a message 2556 to DIA 2420 comprising encrypted globally-unique random value 2454' via network 2418. DIA 2420 may decrypt encrypted globally-unique random value 2454' to obtain decrypted globally-unique random value 2454. For instance, DIA 2420 may perform a bit-wise XOR operation on encrypted globally-unique random value 2454' and the fifth encoded key. The resulting value is globally-unique random value 2454. DIA 2420 stores globally-unique random value 2454 as the sixth secure key (SK5) in key register 2438. For instance, DIA 2420 stores globally-unique random value 2454 in the same location at which the fifth secure key (i.e., SK4) was stored.

At this point the DIA 2420 becomes a Secure Access Portal (SAP) that functions as a One-Time-Pad (OTP) enabling symmetric key encryption with computing system 2402 providing new secure keys. The user can dispose the key, cards, sheets or tabs they used which is now unusable trash and has no "casual" black market street value. However, because knowing the first secure key and buffer key does has value to a full-blown MIM known message attack, a recommended precaution is making the key cards unreadable through ripping or shredding them. The key cards could be printed on water soluble stock so they could also simply be just flushed down the toilet.

The foregoing techniques thwart MIM attacks, as all a MIM would see is a string of numbers, $N_1$, $N_2$, $N_3$, etc. where:
1. $N_1=SK_1:SKB_0=SK_1:SK_0:BK_0, N_2=SK_2:SKB_1=SK_2:SK_1:BK_0$, $N_3=SK_3:SKB_3=SK_3:SK_2:BK_0$, $N_4=SK_4:SKB_4=SK_4:SK_3:BK1$, etc.

It is always assumed that a MIM attack is happening with all data streams known. It is also assumed that all algorithms and encryption schemes are public and known. Both the first secure key (SK0) and first buffer key (BK0) are not directly known as they were never sent over the air. With them unknown, subsequent keys cannot be deduced from the data stream above. A MIM would certainly start manipulating the data set looking for patterns to exploit. Such as doing an XOR on $N_1:N_2$, $N_2:N_3$, etc. Using $B_0:B_0=1$, $BK:BK=1$, and $SK_j:SK_j=1$ the result is 2. $N_1:N_2=SK_0:SK_2$, $N_2:N_3=SK_1:SK_3$, $N_3:N_4=SK_2:SK_4:BK_0:BK$, N4:N5=SK3:SK5, N5:N6=SK4:SK6

Even if one of the secure keys (SKs) became known, say SK2, without knowing BK0 and the bit-shuffled buffer key (BK), SK3 can't be discovered from either (1) or (2) above but SK0 is from (2). The only way that SK2 could become known is from a known message attack with full-blown MIM data stream tracking, so to keep SK0 undiscoverable a message stream would not be encrypted until sometime after SK6 (i.e., the seventh secure key). But one purpose of BK is to prevent SK discovery from known message attacks, which is accomplished in accordance with the embodiments described herein. Then there is no way to discover knowledge of SKs from either (1) or (2) unless SK0 and BK0 were known.

If BK was variable, then (2) could not be done, or it would not be useful. BK could be variable with a simple one-way bit shuffle with every other new SK to avoid parent-child mating as shown above. The use of the BK notation described herein assumes that such an algorithm can be applied if advantageous.

The only person who could know SK0 and BK0 is the user, say User A, when taking a picture of the QRCs on the key card and decoding them to retrieve the information. Knowing SK0 and BK0, they will know all the subsequent keys if they are also doing a MIM attack on the communication stream from their device recording every transaction with computing system 2402 and know the algorithms being employed by DIA 2420 and the computing system 2402, but that knowledge will be seen to be of little consequence. A major issue is would that knowledge as well as a MIM and known message attack on another SAP device enable acquiring SKs from that device? As described herein, the answer is no if there is no knowledge of the other BK, which could only be provided by the other user for whatever reason. Such insider betrayal unfortunately is common and the only way to prevent that is by denying knowledge of both SK0 and BK which is described later below.

An SK is always kept secret if it is used only to encrypt another random number key and the encryption scheme, such as an XOR-based scheme, presents either a bit 0 or 1 for every encrypted bit where either a bit 0 or 1 for both keys is possible for that encrypted bit. That is the function of BK is to provide that uncertainty. There is no way to determine which bit values to guess for the SKs every encrypted bit. A brute force attack is required of order N, O(N) for classical computers, where N is the size of the function domain, which here for 256-bit random numbers is $2^{256}=10^{77}$. Using Grover's algorithm running on quantum computers reduces the attack required to $O(N^{112})$ or $2^{128}=3.4*10^{38}$. To maintain equivalence to a classical computer attack requires doubling the key length, here to 512 bits.

Figure 25:
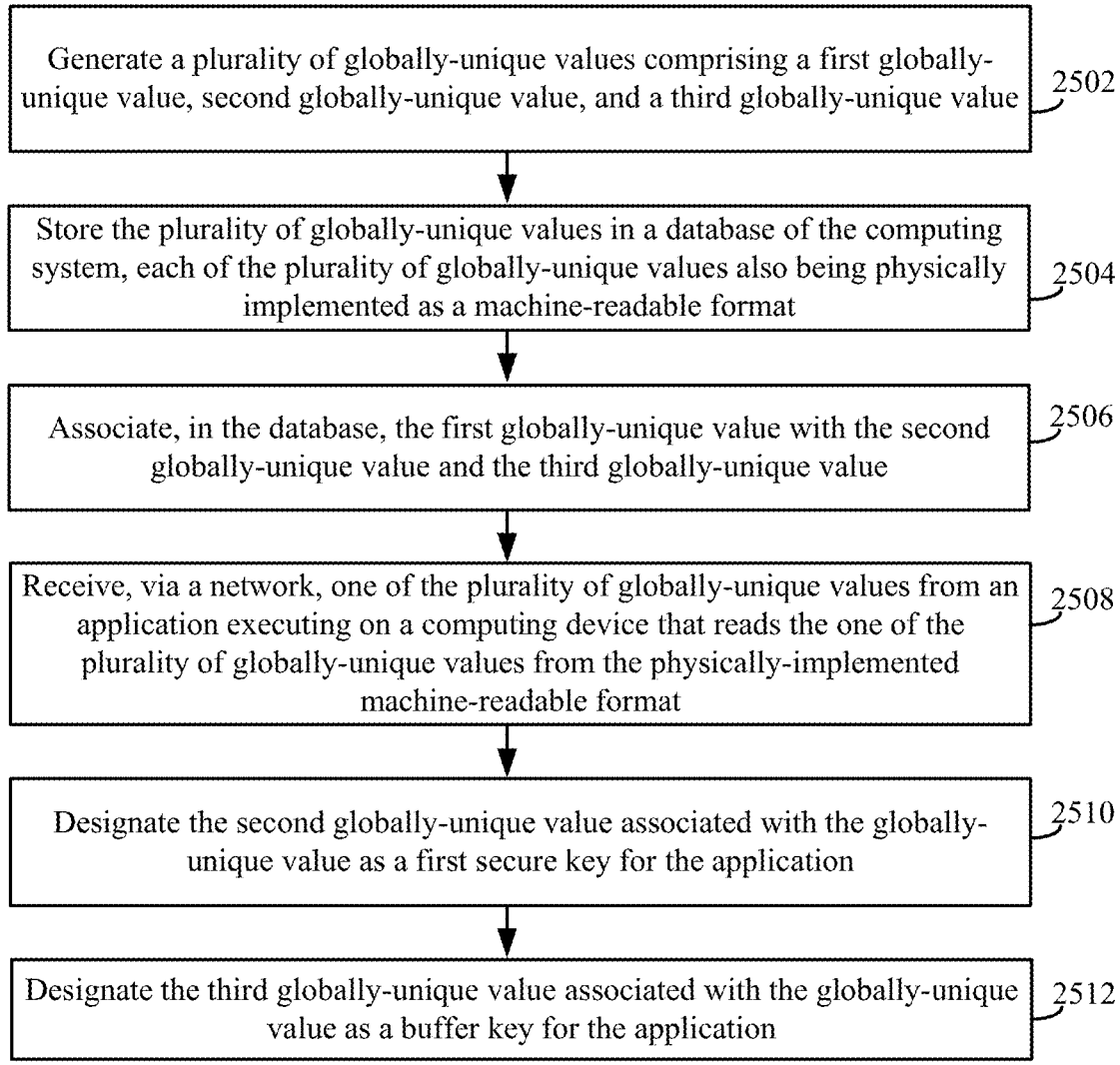
FIG. 25 shows a flowchart of a method for providing a secure key to a computing device in accordance with an example embodiment.

Accordingly, a secure key may be provided to a computing device in many ways. For example, FIG. 25 shows a flowchart 2500 of a method for providing a secure key to a computing device in accordance with an example embodiment. In an embodiment, flowchart 2500 may be implemented by system 2400, as shown in FIG. 24. Accordingly, flowchart 2500 will be described with continued reference to FIG. 24. Other structural and operational embodiments will be apparent to persons skilled in the relevant art(s) based on the discussion regarding flowchart 2500 and system 2400 of FIG. 24.

Flowchart 2500 begins with step 2502. In step 2502, a plurality of globally-unique values is generated. The plurality comprises a first globally-unique value, a second globally-unique value, and a third globally-unique value. For example, with reference to FIG. 1, QRNG 2416 generates a plurality of globally-unique values (e.g., RNaj 2422A, RNbj 2422B, and RNcj 2422C).

In accordance with one or more embodiments, each of the plurality of globally-unique values are randomly-generated values.

In accordance with one or more embodiments, the randomly-generated values are generated by a quantum random number generator. For example, with reference to FIG. 24, QRNG 2416 generates the plurality of globally-unique values.

In step 2504, the plurality of globally-unique values are stored in a database of the computing system, each of the plurality also being physically-implemented as a machine-readable format. For example, with reference to FIG. 24, QRNG 2416 may store the plurality of globally-unique values in database 2406. As shown in FIGS. 2-4B, the plurality of globally-unique values may be physically-implemented as a machine-readable format via QR codes 202 and 204, QR codes 300A and 300B, tag devices 400A and 400B, tag device 400C and QR code 402, smart card 400D, etc.

In step 2506, the first globally-unique value is associated with the second globally-unique value and the third globally-unique value in the database. For example, with reference to FIG. 25, QRNG 2416 stores RNaj 2422A, RNbj 2422B, and RNcj 2422C in database 2506 such that RNaj 2422A, RNbj 2422B, and RNcj 2422C are associated with each other (e.g., they are stored in the same row of database 2406).

In step 2508, one of the plurality of globally-unique values is received from an application executing on a computing device that reads the one of the plurality of globally-unique values from the physically-implemented machine-readable format. For example, with reference to FIG. 24, network interface 2412 receives message 2430 that comprises RNaj 2422A from DIA 2420 executing on computing device 2404. DIA 2420 reads RNaj 2422A from the physically-implemented machine-readable format via which RNaj 2422A is stored and/or retrieved.

In step 2510, the second globally-unique value associated with the globally-unique value is designated as a first secure key for the application. For example, with reference to FIG. 25, QRNG 2416 designates RNbj 2422B associated with RNaj 2422A as a first secure key for DIA 2420.

In step 2512, the third globally-unique value associated with the globally-unique value is designated as a buffer key for the application. For example, with reference to FIG. 25, QRNG 2416 designates RNcj 2422C associated with RNaj 2422A as a buffer key for DIA 2420.

Figure 26:
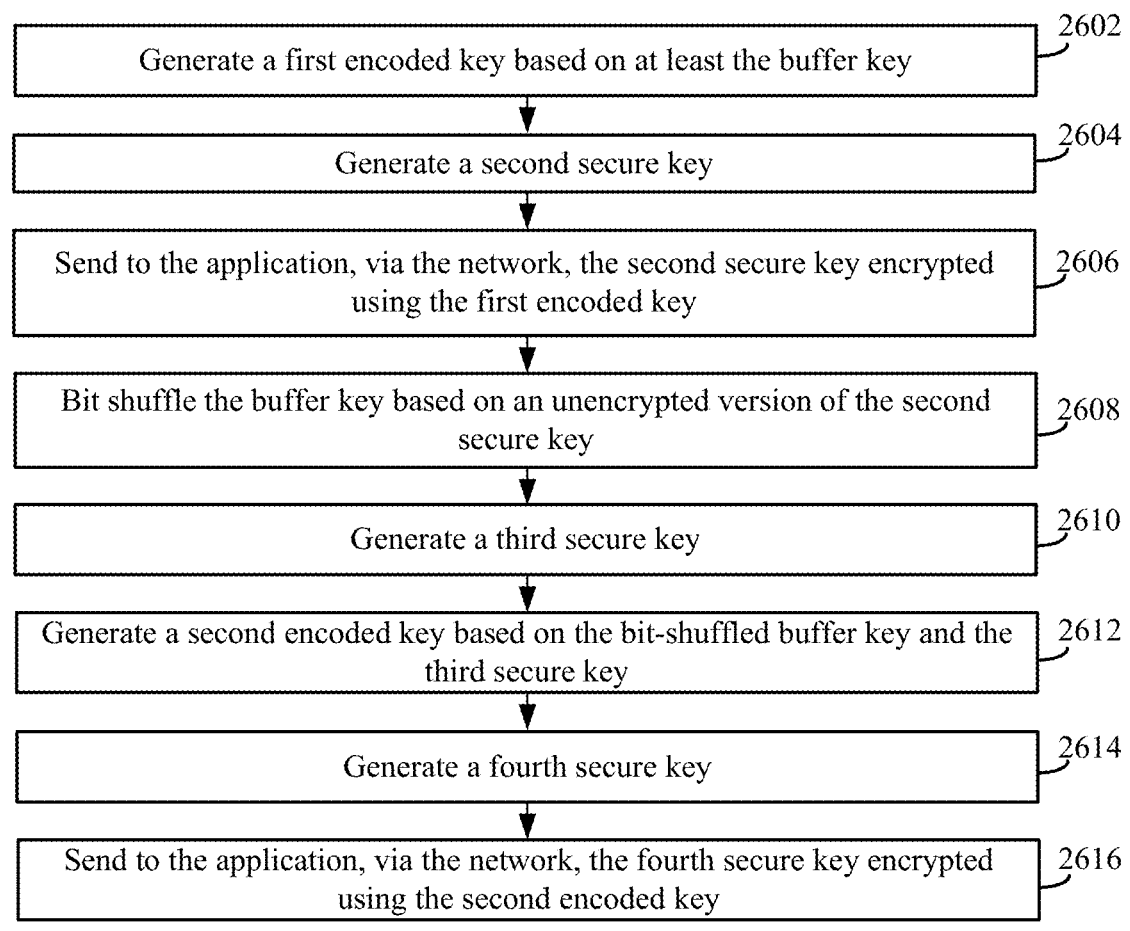
FIG. 26 shows a flowchart of a method for performing a key flush operation in accordance with an example embodiment.

FIG. 26 shows a flowchart 2600 of a method for performing a key flush operation in accordance with an example embodiment. In an embodiment, flowchart 2600 may be implemented by system 2400, as shown in FIG. 24. Accordingly, flowchart 2600 will be described with continued reference to FIG. 24. Other structural and operational embodiments will be apparent to persons skilled in the relevant art(s) based on the discussion regarding flowchart 2600 and system 2400 of FIG. 24.

Flowchart 2600 begins with step 2602. In step 2602, a first encoded key is generated based on at least the buffer key. For example, with reference to FIG. 24, key manager 2414 generates a first encoded key based on the buffer key (e.g., RNcj 2422C) and a previously-generated secure key (e.g., globally-unique random value 2442, which is referred to as SK2 above).

In step 2604, a second secure key is generated. For example, with reference to FIG. 24, QRNG 2416 generates the second secure key (e.g., globally-unique random value 2446, referred to as SK3 above).

In step 2606, the second secure key is encrypted using the first encoded key and sent to the application via the network. For example, with reference to FIG. 24, key manager 2414 encrypts the second secure key (e.g., globally-unique random value 2446, referred to as SK3 above) using the first encoded key. The encrypted second secure key is sent to DIA 2420 via message 2448.

In step 2608, the buffer key is bit shuffled based on an unencrypted version of the second secure key. For example, with reference to FIG. 24, key manager 2414 bit shuffles the buffer key (i.e., RNcj 2422C) based on any of the bits of the second secure key (e.g., globally-unique random value 2446, referred to as SK3 above).

In step 2610, a third secure key is generated. For example, with reference to FIG. 24, QRNG 2416 generates the third secure key (e.g., globally-unique random value 2450, referred to as SK4 above).

In step 2612, a second encoded key is generated based on the bit-shuffled buffer key and the third secure key. For example, with reference to FIG. 24, key manager 2414 generates a second encoded key based on the bit-shuffled buffer key and globally-unique random value 2450 (referred to as SK4 above). In other embodiments, such a key is used to deliver a symmetric key to encrypt a message between two communicating parties. In yet other embodiments, the bit-shuffled buffer key is used for this purpose.

In accordance with one or more embodiments, a bit-wise XOR operation is performed on the bit-shuffled buffer key and the third secure key. For example, with reference to FIG. 24, key manager 214 performs a bit-wise XOR operation on the bit-shuffled buffer key and globally-unique random value 2450.

In step 2614, a fourth secure key is generated. For example, with reference to FIG. 24, QRNG 2416 generates the fourth secure key (e.g., globally-unique random value 2454 (referred to as SK5 above).

In step 2616, the fourth secure key is encrypted using the second encoded key and sent to the application via the network. For example, with reference to FIG. 24, key manager 2414 encrypts globally-unique random value 2454 using the second encoded key and sends the encrypted globally-unique random value 2454 (shown as encrypted globally-unique random value 2454') to network interface 2412, and network interface 2412 sends message 2556 to DIA 2420 comprising encrypted globally-unique random value 2454' via network 2418.

Figure 27:
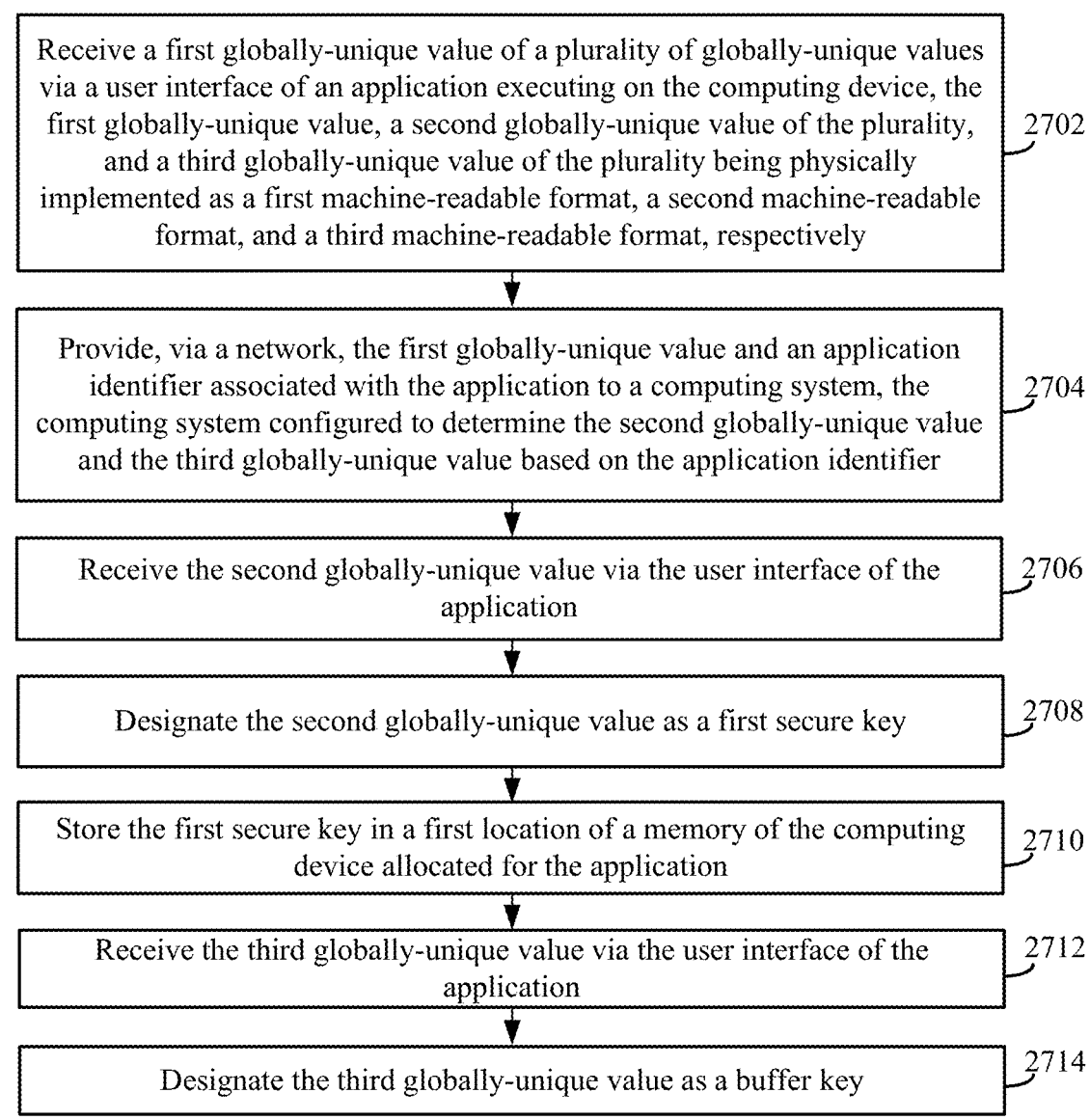
FIG. 27 shows a flowchart of a method for receiving a secure key by a computing device in accordance with an example embodiment.
Figure 28:
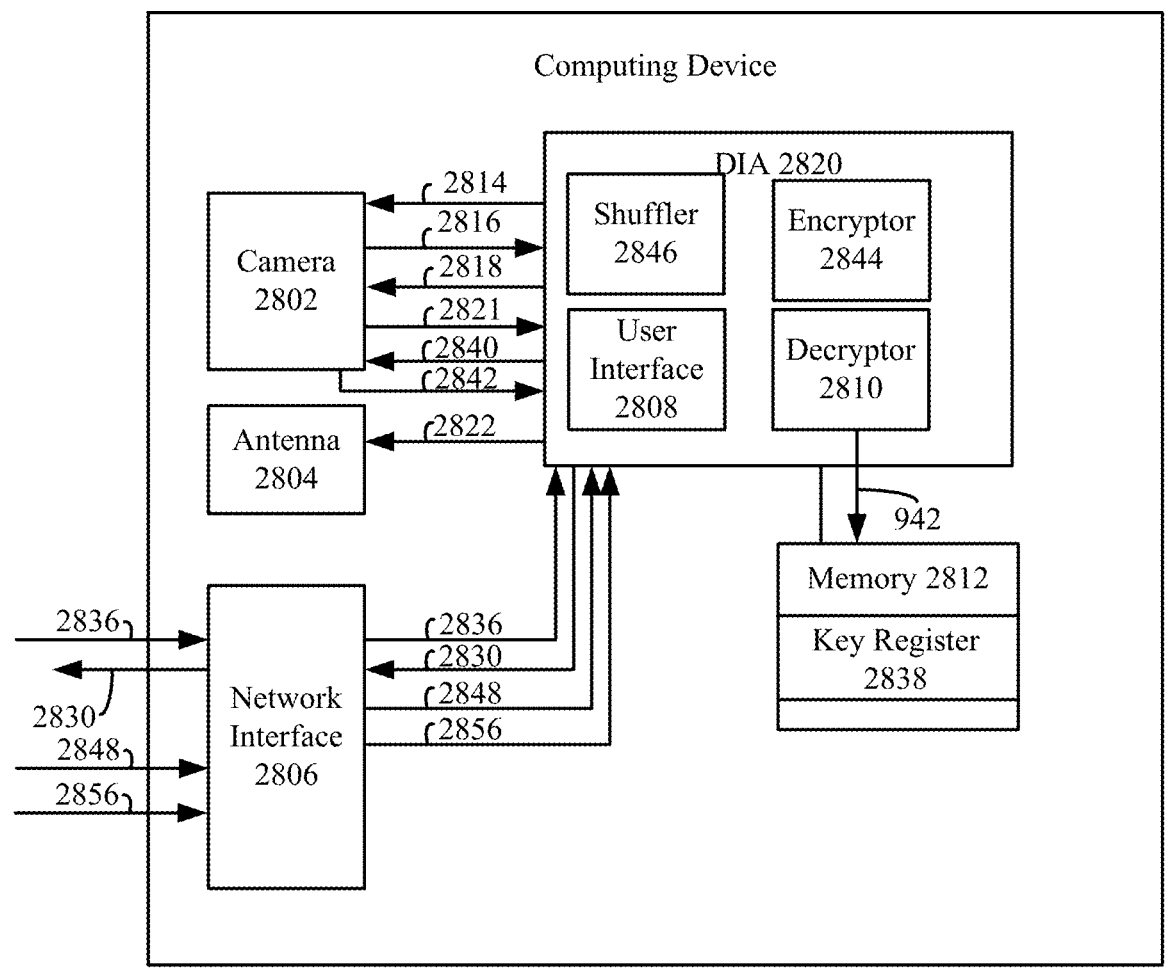
FIG. 28 depicts a block diagram of computing device in accordance with an example embodiment.

FIG. 27 shows a flowchart 2700 of a method for receiving a secure key by a computing device in accordance with an example embodiment. In an embodiment, flowchart 2700 may be implemented by a computing device 2800, as shown in FIG. 28. Accordingly, flowchart 2700 will be described with reference to FIG. 28. FIG. 28 depicts a block diagram of computing device 2800 in accordance with an example embodiment. Computing device 2800 is an example of computing device 2404, as described above with reference to FIG. 24. As shown in FIG. 28, computing device 2800 comprises a DIA 2820, a camera 2802, an antenna 2804, a network interface 2806, and a memory 2812. Network interface 2806 enables network-based communications with each other components over a network. Examples of such network interface 2806, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. DIA 2820 comprises a user interface 2808, a decryptor 2810, an encryptor 2844, and a shuffler 2846. DIA 2820 is an example of DIA 2420, as described above with reference to FIG. 24. Other structural and operational embodiments will be apparent to persons skilled in the relevant art(s) based on the discussion regarding flowchart 2700 and computing device 2800 of FIG. 28.

Flowchart 2700 begins with step 2702. In step 2702, a first globally-unique value of a plurality of globally-unique values is received via a user interface of an application executing on the computing device. The first globally-unique value is physically implemented in a first machine-readable format, a second globally-unique value of the plurality of globally-unique values, and a third globally-unique value of the plurality of globally-unique values being physically implemented as a first machine-readable format, a second machine-readable format, and a third machine-readable format, respectively. For example, with reference to FIG. 28, a first globally-unique value of a plurality of globally-unique values is received via user interface 2808 of DIA 2820. For instance, user interface 2808 may comprise one or more GUI screens that solicit the user to input the first globally-unique value of the plurality.

In step 2704, the first globally-unique value and an application identifier associated with the application are provided to a computing system via a network. The computing system is configured to determine the second globally-unique value and the third globally-unique value based on the application identifier. For example, with reference to FIG. 28, DIA 2820 may generate a message 2830 that includes the first globally-unique value (e.g., RNaj 2422A, as shown in FIG. 24). Message 2830 may be provided to network interface 2806, which provides message 2830 via a network (e.g., network 2418, as shown in FIG. 24). Message 2830 is an example of message 2430, as described above with reference to FIG. 24.

In step 2706, the second globally-unique value is received via the user interface of the application. For example, with reference to FIG. 28, the second globally-unique value of the plurality of globally-unique values is received via user interface 2808 of DIA 2820. For instance, user interface 2808 may comprise one or more GUI screens that solicit the user to input the second globally-unique value of the plurality.

In step 2708, the second globally-unique value is designated a first secure key. For example, with reference to FIG. 28, DIA 2820 may designate the second globally-unique value (e.g., RNbj 2422B, as shown in FIG. 24) as the first secure key.

In step 2710, the first secure key is stored in a first location of a memory of the computing device allocated for the application. For example, the first secure key is stored in a location of memory 2812 (e.g., key register 2838) of computing device 2804. Key register 2838 is an example of key register 2438, as described above with reference to FIG. 24.

In step 2712, the third globally-unique value is received via the user interface of the application. For example, with reference to FIG. 28, the third globally-unique value of the plurality of globally-unique values is received via user interface 2808 of DIA 2820. For instance, user interface 2808 may comprise one or more GUI screens that solicit the user to input the third globally-unique value of the plurality.

In step 2714, the third globally-unique value is designated a buffer key. For example, with reference to FIG. 28, DIA 2820 may designate the third globally-unique value (e.g., RNcj 2422C, as shown in FIG. 24) as the buffer key.

In accordance with one or more embodiments, the first machine-readable format is a first quick response code, the second machine-readable format is a second quick response code, and the third machine-readable format is a third quick response code. For example, with reference to FIG. 3, the first machine-readable format is QR code 300A, the second machine-readable format is QR code 300B, and the third machine-readable format is another QR code (not shown).

In accordance with one or more embodiments, receiving the first globally-unique value via the user interface comprises capturing the first quick response code via the application, and decoding the first quick response code to obtain the first globally-unique value. For example, with reference to FIG. 28, user interface 2808 of DIA 2820 may instruct the user to capture the first QR code and provide a command 2814 to camera 2802, which causes camera 2802 to be activated. Camera 2802 captures the first QR code and provides the captured QR code (shown as QR code 2816) to DIA 2820. DIA 2820 decodes captured QR code 2816 and obtains the first globally-unique value. In accordance with one or more embodiments, receiving the second globally-unique value via the user interface comprises capturing the second quick response code via the application, and decoding the second quick response code to obtain the second globally-unique value. For example, with reference to FIG. 28, user interface 2808 of DIA 2820 may instruct the user to capture the second QR code and provide a command 2818 to camera 2802, which causes camera 2802 to be activated. Camera 2802 captures the second QR code and provides the captured QR code (shown as QR code 2821) to DIA 2820. DIA 2820 decodes captured QR code 2821 and obtains the second globally-unique value. In accordance with one or more embodiments, receiving the third globally-unique value via the user interface comprises capturing the third quick response code via the application, and decoding the third quick response code to obtain the third globally-unique value. For example, with reference to FIG. 28, user interface 2808 of DIA 2820 may instruct the user to capture the third QR code and provide a command 2840 to camera 2802, which causes camera 2802 to be activated. Camera 2802 captures the third QR code and provides the captured QR code (shown as QR code 2842) to DIA 2820. DIA 2820 decodes captured QR code 2842 and obtains the third globally-unique value.

In accordance with one or more embodiments, the buffer key is stored in a second location of the memory of the computing device allocated for the application. For example, with reference to FIG. 28, the buffer key is stored in a second location of memory 2812.

In accordance with one or more embodiments, the first machine-readable format comprises first data stored via a first near-field communication-based tag device, the second machine-readable format comprises second data stored via a second near-field communication-based tag device, the third machine-readable format comprises third data stored via a third near-field communication-based tag device (e.g., tag device 400A, tag device 400B, etc.).

In accordance with one or more embodiments, receiving the first globally-unique value comprises reading the first near-field communication-based tag device to obtain the first globally-unique value, receiving the second globally-unique value via the user interface comprises reading the second near-field communication-based tag device to obtain the second globally-unique value, and receiving the third globally-unique value via the user interface comprises reading the third near-field communication-based tag device to obtain the third globally-unique value. For example, with reference to FIG. 28, user interface 2808 of DIA 2820 may instruct the user to provide the first globally-unique value and provide a command 2822 to antenna 2804, which causes antenna 2804 to be activated. Antenna 2804 is configured to read a first NFC-based tag device to obtain the first globally-unique value therefrom. User interface 2808 of DIA 2820 may subsequently instruct the user to provide the second globally-unique value and provide command 2822 to antenna 2804, which causes antenna 2804 to be activated. Antenna 2804 reads a second NFC-based tag device to obtain the second globally-unique value therefrom. User interface 2808 of DIA 2820 may also instruct the user to provide the third globally-unique value and provide command 2822 to antenna 2804, which causes antenna 2804 to be activated. Antenna 2804 reads a third NFC-based tag device to obtain the third globally-unique value therefrom.

In accordance with one or more embodiments, a command from the computing system is received via the network that instructs the application to perform a key flush operation to replace the first secure key stored in the first location of the memory with another secure key, and the first secure key is replaced with the other secure key in accordance with the key flush operation. For example, with reference to FIG. 28, application 2820 receives a command 2836 (e.g., from computing system 2402, as shown in FIG. 24) to perform a key flush operation to replace the first secure key stored in key register 2838 with another secure key, and the first secure key is replaced with the other secure key in accordance with the key flush operation.

Figure 29:
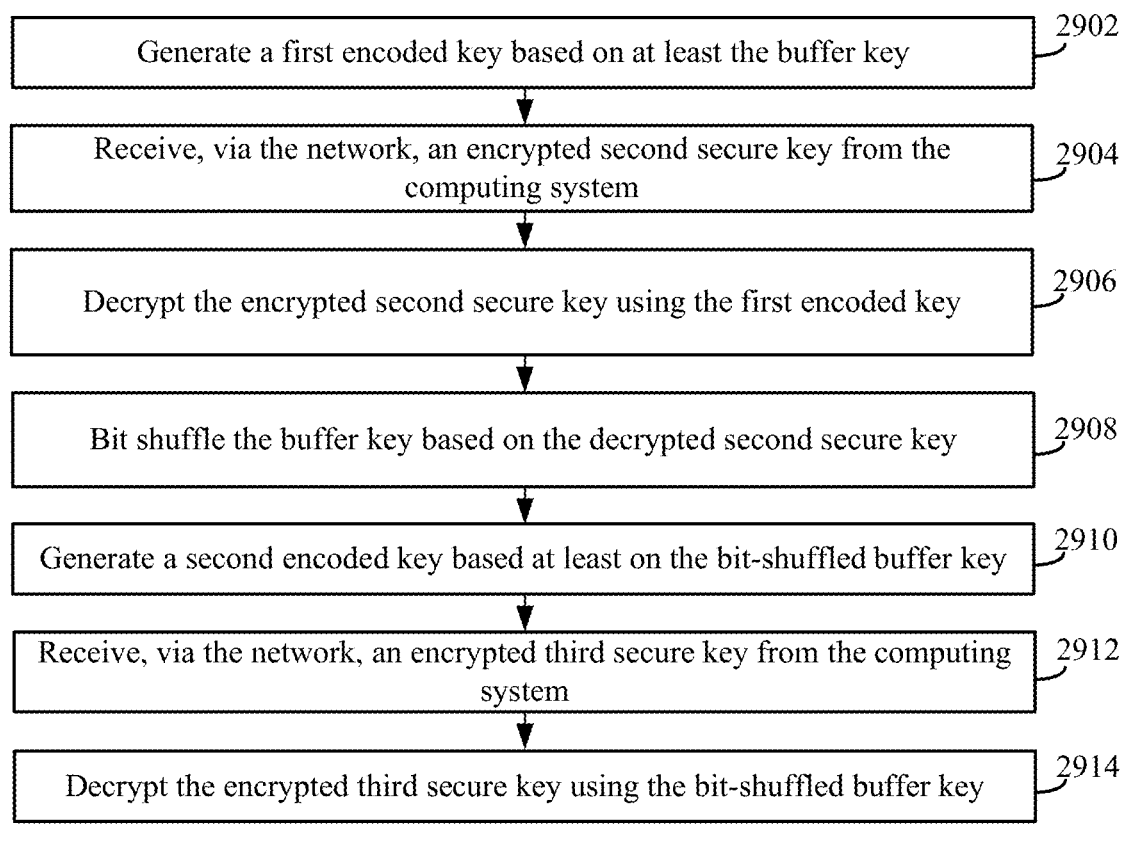
FIG. 29 shows a flowchart of a method for performing a key flush operation in accordance with another example embodiment.

FIG. 29 shows a flowchart 2900 of a method for performing a key flush operation in accordance with another example embodiment. In an embodiment, flowchart 2900 may be implemented by computing device 2800, as shown in FIG. 28. Accordingly, flowchart 2900 will be described with continued reference to FIG. 28. Other structural and operational embodiments will be apparent to persons skilled in the relevant art(s) based on the discussion regarding flowchart 2900 and computing device 2800 of FIG. 28.

Flowchart 2900 begins with step 2902. In step 2902, a first encoded key is generated based on at least the buffer key. For example, with reference to FIG. 28, encryptor 2844 generates a first encoded key based on at least the buffer key (e.g., RNcj 2422C, as shown in FIG. 24) and a previously-generated secure key (e.g., globally-unique random value 2442 (as shown in FIG. 24), which is referred to as SK2 above. Globally-unique random value 2442 may be received by network interface 2806 in an encrypted fashion via a message 2844 from the computing system (e.g., computing system 2402, as shown in FIG. 24). Message 2844 is an example of message 2444, as described above with reference to FIG. 24. Network interface 2806 provides message 2444 to DIA 2820. Decryptor 2810 decrypts the encrypted secure key to obtain the decrypted secure key. Encryptor 2844 generates the first encoded key based on the buffer key and the decrypted secure key. For example, encryptor 2844 may perform a bit-wise XOR operation on the buffer key and the decrypted secure key to obtain the first encoded key.

In step 2904, an encrypted second secure key is received from the computing system via the network. For example, with reference to FIG. 28, network interface 2806 may receive a message 2848 from the computing system (e.g., computing system 2402) via the network (e.g., network 2418, as shown in FIG. 24). Message 2848 comprises the encrypted second secure key (e.g., encrypted globally-unique random value 2446', as shown in FIG. 24). Message 2848 is an example of message 2448, as shown in FIG. 24.

In step 2906, the encrypted second secure key is decrypted using the first encoded key. For example, with reference to FIG. 28, decryptor 2810 decrypts encrypted globally-unique random value 2446' using the first encoded key. For instance, decryptor 2810 may perform a bit-wise XOR operation on encrypted globally-unique random value 2446' and the first encoded key to obtain decrypted globally-unique random value 2446.

In step 2908, the buffer key is bit shuffled based on the decrypted second secure key. For example, with reference to FIG. 28, shuffler 2846 bit shuffles the buffer key (e.g., RNcj 2422C) based on globally-unique random value 2446.

In step 2910, a second encoded key is generated based on at least the bit-shuffled buffer key. For example, with reference to FIG. 28, encryptor 2844 generates a second encoded key based on at least the bit-shuffled buffer key and another globally-unique random value (e.g., globally-unique random value 2450 (referred to as SK4 above), which was previously received by DIA 2820.

In step 2912, an encrypted third secure key is received from the computing system via the network. For example, with reference to FIG. 28, network interface 2806 receives a message 2856 from computing system 2402 (as shown in FIG. 24). Message 2856 comprises the encrypted third secure key (encrypted globally-unique random value 2454', as shown in FIG. 24). Message 2856 is an example of 2456, as described above with reference to FIG. 24. Message 2856 is provided to DIA 2820.

In step 2914, the encrypted third secure key is decrypted using the bit-shuffled buffer key. For example, with reference to FIG. 28, decryptor 2810 decrypts encrypted globally-unique random value 2454' using the bit-shuffled buffer key to obtain the decrypted third secure key (e.g., globally-unique random value 2454, as shown in FIG. 24). For example, decryptor 2810 may perform a bit-wise XOR operation on the bit-shuffled buffer key and encrypted globally-unique random value 2454' to obtain encrypted globally-unique random value 2454.

In accordance with one or more embodiments, the decrypted third secure key is stored in the first location of the memory, the decrypted third secure key being the other secure key that replaces the first secure key. For example, with reference to FIG. 28, the decrypted third secure key (e.g., obtain encrypted globally-unique random value 2454) is stored in key register 2838 of memory 2812.

2. Sending Encrypted Messages Between SAP OTPs

Figure 30:
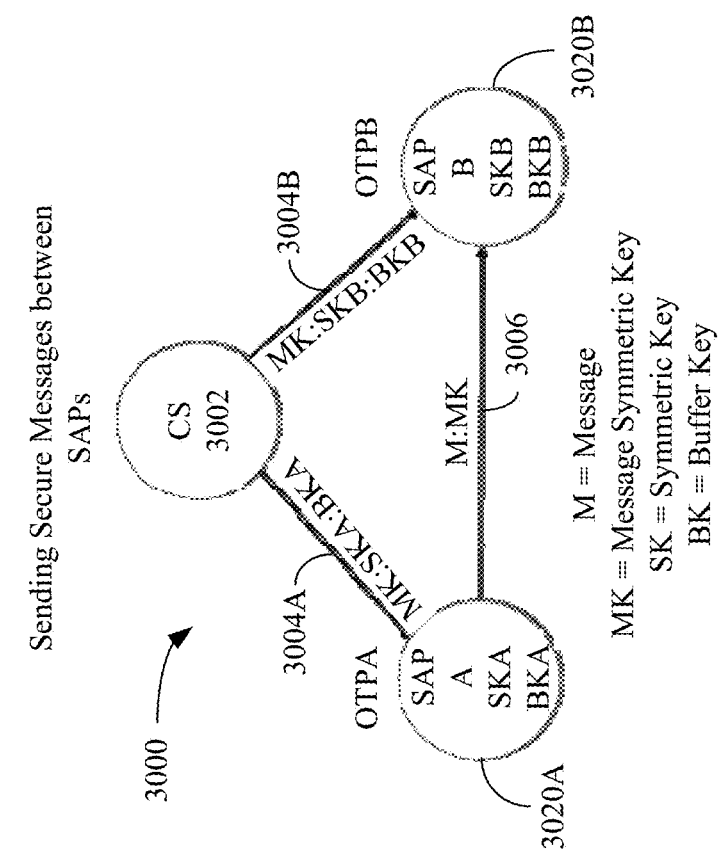
FIG. 30 depicts a block diagram of a system for sending encrypted messages between secure access portals in accordance with an example embodiment.

FIG. 30 depicts a block diagram of a system 3000 for sending encrypted messages between secure access portals in accordance with an example embodiment. As shown in FIG. 30, system 3000 comprises a computing system 3002, a first DIA 3020A and a second DIA 3020B. Computing system 3002 is an example of computing system 2402, as described above with reference to FIG. 24. DIAs 3020A and 3020B are examples of DIA 2420, as described above with reference to FIG. 24. DIAs 3020A and 3020B are configured as SAPs in accordance with the embodiments described in Subsection D.1.

Two users, User A and User B, desire to communicate securely using their SAP OTPs (i.e., DIAs 3020A and 3020B, respectively). User A initiates by their SAPA sending its App random number (ARNA) to SAPB which sends its ARNB along with ARNA to the computing system 3002. Computing system 3002 accesses both ARN files to retrieve the BK and current secure key ($SK_C$) from both. It then creates a message key, MK, which is sent to DIA 3020A and 3020B via messages 3004A and 3004B, respectively. The MK is encrypted with their respective current secure keys and BKs, MK:$SK_C$:BK. DIAs 3020A and 3020B decrypt messages 3004A and 3004B, respectively, with their respective current secure keys and BKs to retrieve MK, which they now both know. Computing system 3002 next sends new SKs encrypted with the current one and BK for each as explained above, which DIAs 3020A and 3020B decrypt and replace the current one with the new one in their key registers. Now User A of DIA 3020A can send to User B of DIA 3020B a message, M 3006, encrypted with MK, which DIA 3020B decrypts with MK to retrieve message M 3006. A new MK is then sent to both DIAs 3020A and 3020B by computing system 3002 to continue the secure communication between the DIAs 3020A and 3020B.

A MIM sees five random number streams $N_1$=MK:$SK_C$(A):BK(A), $N_2$=MK:$SK_C$(B):BK(B), $N_3$=$SK_N$(A):$SK_C$(A):BK(A), $N_4$=$SK_N$(B):$SK_C$(B):BK(B), $N_5$=M:MK For a known message attack assume M=1, then the MIM sees $N_5$=M:MK=MK and MK is now known. From $N_1$ and $N_2$ with MK known now $SK_C$(A):BK(A) and $SK_C$(B):BK(B) are known which cannot reveal either $SK_C$ or BK of both. The encrypted message exchange provides no knowledge of the SKs of DIA 3020B to DIA 3020A and vice versa. There is nothing to be done except a brute force attack to retrieve any of the keys, which each have $2^{256}$=$10^{77}$ possible values, taking multiple ages of the universe to go through all of them. And when finally obtained, it does not provide any knowledge of the other SKs. Therefore, The SKs are kept secret and no SKs are discoverable from one device to the other from a combination of MIM and known message attacks knowing one's own SKs. The only exception is if User A could know BK(B) which could only be provided by User B. As discussed above, the only sure way to prevent this occurrence is to deny knowledge of any BK to any user. Approaches for accomplishing this will be discussed further below.

3. Authenticating a Phone Call to Prevent Phone Fraud

User A initiates the phone to call to User B whereby SAPA (e.g., DIA 3020A) sends its ARNA to SAPB (e.g., DIA 3020B), which sends its ARNB along with ARNA to the computing system 3002. Computing system 3002 accesses both ARN files to retrieve the BK and current SKC from both. It then creates a message key, MK, which is sent to both DIAs 3020A and 3020B encrypted with their respective $SK_C$s and BKs. DIAs 3020A and 3020B decrypt the messages with their respective $SK_C$s and BKs to retrieve MK, which they now both know. DIA 3020A sends MK to DIA 3020B and if the MK known by DIA 3020B matches the MK received by DIA 3020A, the call goes through. Neither has access to the other's SKs.

If an imposter purloins User A's phone number and tries to call User B, they won't have the SKs or BP in their key registers to successfully complete the call, and DIA 3020B will issue a fraud alert to DIA 3020B B for follow-up.

4. Securely Communicating with Locally Generated Keys

Figure 31:
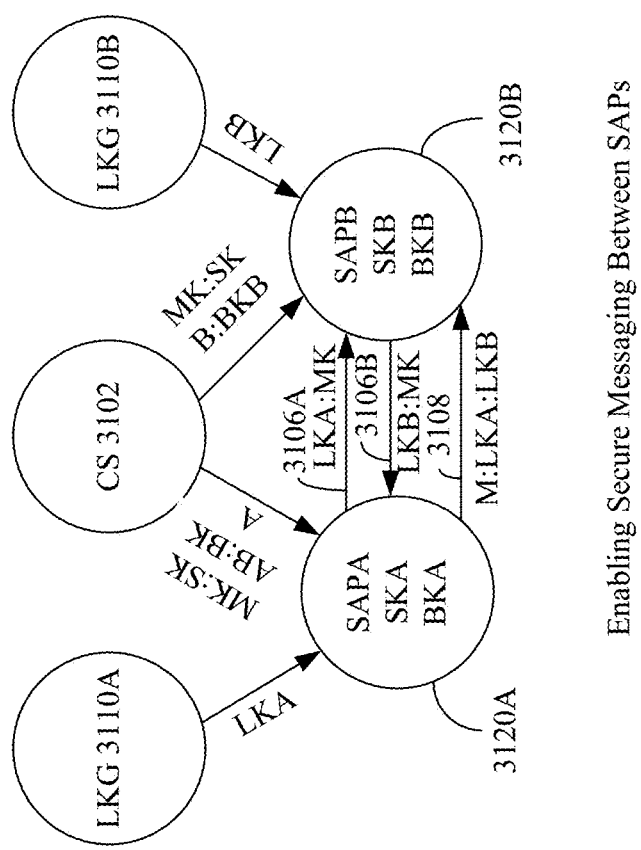
FIG. 31 depicts a block diagram of a system for securely communicating with locally-generated keys in accordance with an example embodiment.

FIG. 31 depicts a block diagram of a system 3100 for securely communicating with locally-generated keys in accordance with an example embodiment. As shown in FIG. 31, system 3100 comprises a computing system 3104, a first DIA 3120A, a second DIA 3120B, a first local key generator 3110A, and a second local key generator 3110B. Computing system 3102 is an example of computing system 2402, as described above with reference to FIG. 24. DIAs 3120A and 3120B are examples of DIA 2420, as described above with reference to FIG. 24. DIAs 3020A and 3020B are configured as SAPs in accordance with the embodiments described in Subsection D.1.

Both User A and User B each have access to local key (LK) generators (LKGs), which satisfy the criterial for true random numbers and wish to communicate securely with each other with their SAP OTPs (e.g., DIA 3120A and 3120B) using their LKs. The LKGs may be incorporated into DIAs 3120A and 3120B, respectively. User A initiates by their DIA 3120A sending its ARNA to DIA 3120B, which sends its ARNB along with ARNA to the computing system 3102. Computing system 3102 accesses both ARN files to retrieve the BK and current SKC from both. It then creates a message key, $MK_1$, which is sent to both encrypted with their respective $SK_C$s and BKs via messages 3104A and 3104B, respectively. DIAs 3120A and 3120B decrypt messages 3104A and 3104B, respectively with their respective $SK_C$s and BKs to retrieve $MK_1$, which they now both know to send a message M securely encrypted with $MK_1$, via messages. In this case the message M will be an $LKA_j$ from the local key generator (LKGA) from DIA 3120A to DIA 3120B encrypted with $MK_1$, $LKA_j$:$MK_1$ which DIA 3120B decrypts with $MK_1$ to retrieve and store in memory $LKA_j$. A new message key, $MK_2$ is sent to both from computing device 3102. Now DIA 3120B sends to DIA 3120A an $LKB_j$ from its local key generator LKGB encrypted with $MK_2$, $LKB_j$:$MK_2$ which DIA 3120A decrypts with $MK_2$ to retrieve and store in memory $LKB_j$. Both now know the first key from their respective LKGs. Now DIA 3120A can send a new LKA key encrypted with the current one, $LKA_{j+1}$:$LKA_j$, to DIA 3120B via a message 3108, and DIA 3120B can send a new LKB key to DIA 3120A encrypted with the current one, $LKB_{j+1}$:$LKB_j$.

Now DIA 3120A can send a new message, MN 3106A, to DIA 3120B encrypted with MN:$LKA_{j+1}$:$LKB_{j+1}$ which DIA 3120B decrypts with $LKA_{j+1}$: $LKB_{j+1}$ to retrieve the message. DIA 3120B can also send a message, MM 3106B, to DIA 3120A encrypted in the same manner. The session continues until complete and the connection closes. No residual LKs are kept in key registers of DIAs 3120A and 3120B. A new session will commence with sending new MKs to the SAPs to initiate the LKGs providing the session keys as described above.

A MIM will see a random number stream of $N_1$=$MK_1$:$SKA_i$:BK(A), $N_2$=$MK_1$:$SKB_i$:BK(B), $N_3$=$LKA_j$:$MK_1$, $N_4$=$SKA_{i+1}$:$SKA_i$:BKA, $N_5$=$SKB_{i+1}$:$SKB_i$:BKB, $N_6$=$MK_2$:$SKA_{i+1}$:BK(A), $N_7$=$MK_2$:$SKB_i$:BK(B), $N_8$=$LKB_j$:$MK_2$, $N_9$=$LKA_{j+1}$:$LKA_j$, $N_{10}$=$LKB_{j+1}$:$LKB_j$, $N_{11}$=$M_N$: $LKA_{j+1}$ $LKB_{j+1}$. There is nothing that can be retrieved that would expose SKs. However, if a known message attack is launched, assume MN=1 for example, then the data stream $N_{11}=LKA_{j+1}:LKB_{j+1}$, but there is no way to determine $LKA_{j+1}$ or $LKB_{j+1}$ from this other than brute force attack which takes multiple ages of the universe to go through all the $2^{256}=10^{77}$ possibilities.

5. Secure Log-on Such as to Access a Bank Account

The bank will use its SAP OTP (or DIA) for a secure session. Upon hitting "login" the user device SAPA (e.g., DIA 3020A, as shown in FIG. 30) sends its ARN to the bank SAP, SAPB, which sends its ARN along with the ARN of SAPA to the computing system (e.g., computing system 3002). Computing system 3002 accesses both ARN files to retrieve the BK and current SKC from both. It then creates a message key, MK, which is sent to both the bank SAP and DIA 3020A encrypted with their respective SKCs and BKs. The SAPs decrypt the messages with their respective SKCs and BKs to retrieve MK, which they now both know to send a message M securely encrypted with MK. DIA 3020A encodes with MK a Last Transaction Tracking Link (TTL) random number sent by the bank to DIA 3020A upon closing out the last session and sends that to SAPB encrypted with MK. SAPB decodes it with the MK to retrieve the random number. The bank's transaction database has accessed the ARN file to retrieve that same number and if they match the login proceeds and gives the client access to their account. This is shown in FIG. 30, where the message is the TTL random number. No one other than the client would have the correct keys and random number in its key registers and computing system 3002 to allow access, so no password is required. The last TTL session number serves that purpose. Upon closing the current session, the SAPB sends a new transaction tracking link random number encoded with the MK.

As with the other above examples the SKs of either party have not been exposed to the other, keeping them secret. A MIM would see nothing that could be exploited, as nothing but random numbers have been sent between SAPs. The session could also be encrypted as with the above examples where MKs are used to send data, protecting the SKs from exposure.

6. Obtaining a "Digital Credit or Debit Card"

A customer simply logs on to a credit/debit card "vendor or bank's" website to request their "personal digital card". A SAP to SAP secure communication is achieved by both the vendor's database (VDB) SAPV and the customer or applicant's smart device SAPC by SAPC sending its ARN (e.g., ARNC) to SAPV which then sends ARNC and its ARNV to the computing system (e.g., computing system 2402, as shown in FIG. 24). The computing system accesses both ARN files to retrieve the BK and current SKC from both. It then creates a message key, MK, which is sent to both SAPV and SAPC encrypted with their respective SKCs and BKs. The SAPs decrypt the messages with their respective SKCs and BKs to retrieve MK, which they now both know to send a message M securely encrypted with MK. After a credit check of customer/applicant the vendor then can enroll the new credit card customer/applicant via the secure link and sends the customer/applicant a card/customer ID (CID) comprising of a 256-bit random number encrypted with the current MK, after which a new MK is created and sent with the above process. This is shown in FIG. 30 with the message being the CID. The customer/applicant's SAP (e.g., DIA 3020A) then creates a cloud file on their smart device for this particular vendor's "digital credit or debit card" and stores the decrypted CID, within the smart device's memory. The transaction is completed with the vendor's SAP sending the customer/applicant's SAP a Vendor Database (VDB) SAP Transaction Tracking Link Secure Key (SKV) encrypted with the current MK which is then stored in memory in the vendor's cloud card file as well in the SAPC key memory. Subsequent user log-ons then proceed similar to that described above for Secure Log-on.

From a retail store perspective, on enrolling to use the card services, the store's SAP logs on as described above, and the VDB obtains the store's SAP Application's Random Number (ARNS) and sends the store SAP a store Random Number ID, the SID, and also a SKV which is then stored in a VDB ARNS cloud file.

7. Using the "Digital Credit or Debit Card"

To purchase a product from a retail store, the customer selects the "card" to use from their smart devices card folder menu (such as with digital wallet) and "taps" their smart device to the wireless port of the "card" reader store SAP and sends its ARN (ARNC) to the store SAP which then sends it along with the store's SAP ARN, the ARNS, to the card vender's database (VDB) SAP along with the dollar amount of the transaction and the SID is encrypted with the SKV. The VDB looks up the file associated with the ARNS and uses the SKV in the file to decrypt the SID and if it matches that store in the file the store is authenticated for the transaction. The VDB looks up the file associated with ARNC, and sends the ARNC SAP a message "OK to process the dollar amount?" On the customer hitting the displayed "YES" icon, the customer's SAP then sends the CID encrypted with the SKV to the VDB SAP. The VDB decrypts the CID with the SKV stored in the ARNC file, and if matches that what was stored within the ARNC file, the user is authenticated, and the transaction file is unlocked to perform the transaction. After completion, the VDB SAP sends the customer's SAP a new SKV encrypted with the current one which is then stored in memory for the next transaction. It also sends the store SAP a new SKV encrypted with the current one which is stored in the store SAP for the next transaction.

8. Customer Transaction File

The transaction records (TRs) are linked by random numbers which are the SKVs sent by the VDB SAP to the customer SAP to form a chain or links which are forever linked:

1. SKV1-TR1-SKV2 SKV2-TR2-SKV3 SKV3-TR3-SKV4 . . . SKVn-TRn-SKV(n+1)

On the completion of transaction TRn, which refers back to TR(n−1) through SKV(n−1), a new SKV(n+1) is then sent to the user's SAP encrypted with SKVn. To initiate a new transaction, the user SKV(n+1) needs to be authenticated, which is done by the user's SAP using it to encrypt the CID. The VDB SAP decrypts with the SKV(n+1) stored in in its ARNC file and if the decrypted CID matches that in the cloud file, then SKV(n+1) is authenticated allowing access to the previous transaction to create the next one. The user would be the only one with the correct SKV and CID within their application for its authentication, locking out access to anyone else.

Each transaction, Tn, insures the account criteria are met according to regulations and best bank practices.

Theoretically, maintaining the perfect secrecy of the keys allows the key distribution of subsequent keys to continue indefinitely. However, a new first key and BK can be obtained at any time desired. A protocol may be established that does this on some periodic or scheduled basis. Or it can be done spontaneously as described below. An enabling feature is that an SAP can interact with another smart device with a DIA installed thereon via very short range communication (an inch or less) such as with NFC to download a first SK and BK from the computing system (e.g., computing system 3002, as shown in FIG. 30) and send it to the other device to enable its SAP operation or re-start a SAP with a new first key and BK. The steps for enabling a new SAP are:
1. User B desires to obtain a new SK0 and BK0 and places his SAP (i.e., SAPB or DIA 3020B) user device in close proximity to User A's user device (within an inch).
2. User A's SAP (i.e., SAPA or DIA 3020A) communicates short range to obtain the ARN of SAPB (i.e., ARNB) from SAPB.
3. SAPA sends its ARN (i.e., ARNA) and ARNB to the computing system with a SK0 and BK request.
4. If ARNA folder permission status is set to "OK to mate" then the next step proceeds. If not, the process stops, and SAPB is sent the message "seek another device."
5. The computing system obtains a first key, SK0, from its RN data-store and sends it encrypted to SAPA with the current key associated with ARNA. The computing system associates SK0 with ARNB.
6. SAPA decrypts with its current key to obtain SK0 which it sends to SAPB which stores it as its first SK, SK0.
7. In the same manner, the BK0 is sent to SAPB enabling SAP operation.
8. The ARNB file folder permission status is set to "OK to mate."
9. Optionally, then SAPB can refresh SK0 and BK0 for SAPA.

All this happens within a millisecond. A key manager at a data center can walk around to every SAP smart device and tap it with their SAP smart phone to install a new first key and BK in them.

Figure 32:
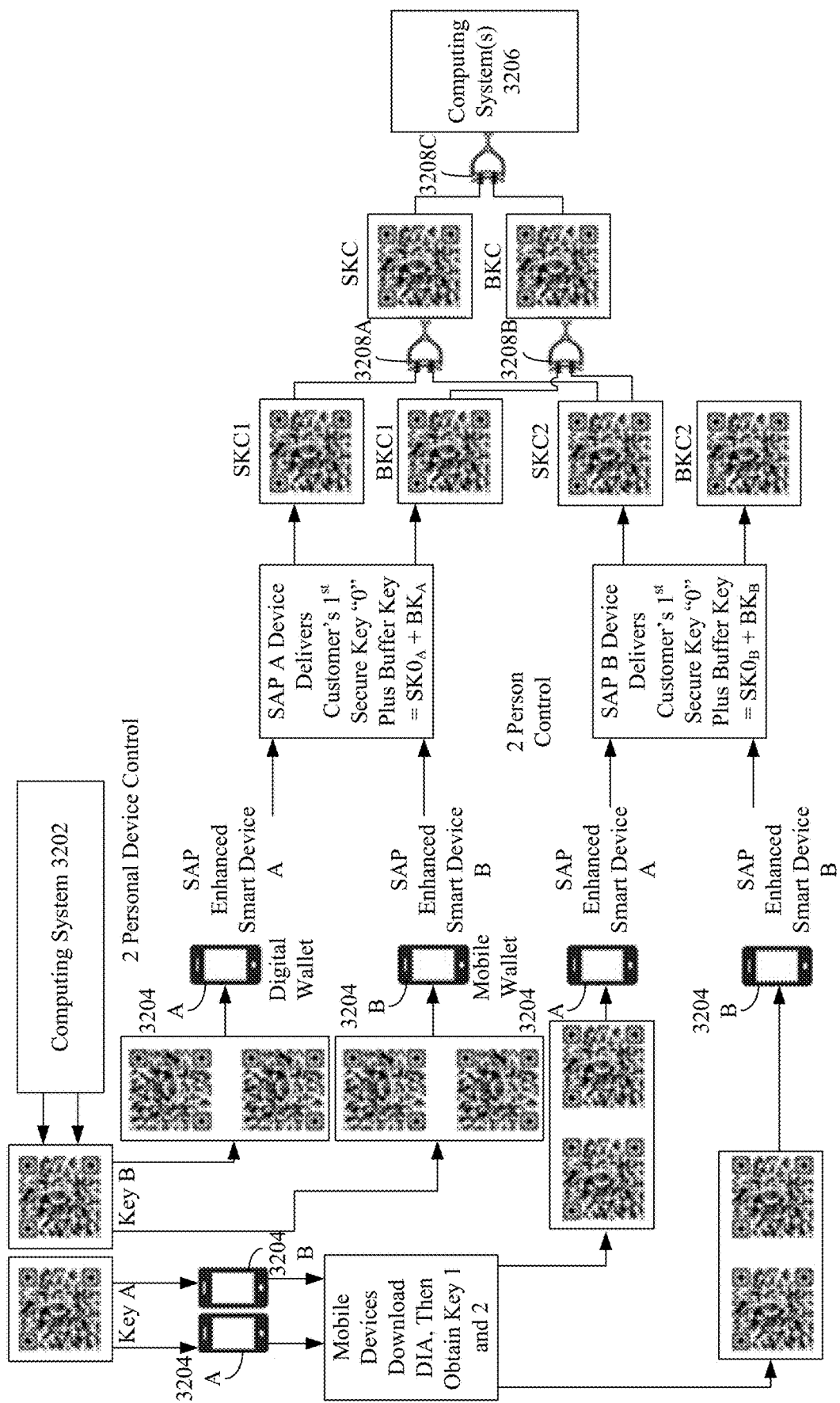
FIG. 32 depicts a block diagram of a system for two-person control in accordance with an embodiment.

The problem with this, of course, if User A knows its SAP SKs and BK, it will know SK0 and the BK0 loaded into the new device and be able to decode all secure messaging the new device engages in with a MIM attack. This is referred to as the known key attack, which could be viral if the new SAP is used to create another one, and so on, spreading throughout networks, making them unsecure if a massive MIM attack is launched that could read and record all SAP communication. To prevent such a scenario, a two-man control to prevent anyone from knowing SK0 and the BK may be utilized. Such an approach is as follows:
  a. Split Key Mitigation (2-Person Control) with Key Download from Two SAP phones The following section is described with reference to FIG. 32. FIG. 32 depicts a block diagram of a system 3200 for two-person control in accordance with an embodiment. As shown in FIG. 32, system 3200 comprises a first mobile device 3204A, a second mobile device 3204B, and one or more computing systems 3206. Each of first mobile device 3204A, second mobile device 3204B, and computing devices 3206 are configured to execute a DIA configured as an SAP (as described above). Computing system 3202 is an example of computing system 2402, and mobile devices 3204A and 3404B are examples of computing device 2404, as respectively described above with reference to FIG. 24. Examples of computing system(s) 3206 include, but are not limited to, a modem, an internal network and core computer system, a card reader, a Wi-fi router, a laptop, a domain name system (DNS) server, a tablet, etc.
1. Assume each party knows their own first key $SK_0$ and BK as described above but not the other person's first key and BK.
2. The first person (e.g., the user of mobile device 3204A) of the 2-person control may be referred to as SAPA and the second person (e.g., the user of mobile device 3204B) of the 2-person control may be referred to as SAPB. The user (e.g., the user of computing system(s) 3206) receiving their $1^{st}$ initialization key and BK from SAPA and SAPB is labeled as SAPC.
3. SAPA taps SAPC and via short range communication, such as with NFC, SAPC sends its Application Random Number "C" (ARNC) to SAPA.
4. SAPA sends ARNC along with ARNA to computing system 3202, which creates the 1st key, SKC1 associated with ARNC and sends it to SAPA encrypted with the current SAPA key which then decrypts it to recover the first SKC1 and sends that over the shortrange link to SAPC. The User of SAPA knows this key, SKC1 it just sent to SAPC if it is doing a MIM known key attack and monitoring all the communication from its device with the SDB.
5. The process repeats after refreshing with a new SAPA key to send the buffer-key, BKC1 to SAPC.
6. Next SAPB taps SAPC and via short range communication, such as with NFC, SAPC then sends its ARNC to SAPB.
7. SAPB then sends the ARNC along with the ARNA to computing system 3202, which creates the second key, SKC2 which the computing system 3202 associates with ARNC and then sends that to SAPB encrypted with the current SAPB key which then decrypts it to recover the SKC2 and then sends that over the shortrange link to SAPC. User SAPB knows this key, SKC2.
8. The process repeats as per above to send BKC2 to SAPC
9. SAPC, for example, performs a bit-wise XOR on SKC1 and SKC2 (shown as XOR 3208A) to obtain SKC (i.e., SKC1:SKC2=SKC), which is the first key of SAPC.
10. SAPC, for example, performs a bit-wise XOR on BKC1 and BKC2 (shown as XOR 3208B) to obtain BKC (i.e., BKC1:BKC2=BKC)), which is the BKC for SAPC.
11. Computing system 3202 also, for example, performs a bit-wise XOR on SCK1 and SCK 2 (i.e., SKC1:SKC2=SKC), which is associated with ARNC within computing system 3202. It does the same for BKC1:BKC2=BKC.
12. Now SAPC does a key flush and BK bit rotation as described above and now becomes operational as a SAP OTP and its ARNC file folder permission status is set to "OK to mate."
13. Although user SAPA knows the SKC1 and BKC1 it sent to SAPC and user SAPB knows the SKC2 and BKC2 it sent to SAPC neither know the SKC first key and BKC of SAPC and BKC and cannot know the final values of SK and BK after step 12.

These procedures prevent anyone from knowing and spreading known keys through the SAP network and obtaining the keys from others guaranteeing its security.

Two-person read of key cards could proceed basically in the same way, with User A using SAPC to read a first QRC card, and then handing the phone physically as they are leaving the area to someone else, User B who then reads a second QRC card, accomplishing the same result as above.

Phones could be delivered to customers from a phone company, such as Apple and Samsung, pre-loaded with a SAP, which could then periodically be re-loaded as above as part of a security protocol.

When a phone SAP enables another phone SAP operation, the new SAP could reciprocate by downloading a new SK and BK to "refresh" the first phone. So when two phone "mate" a new SAP is created which in turn refreshes the other. Two SAP phones could mate to refresh one another's SK and BK at any time. Mating is by permission of the ARN folder status for being OK to mate.

These techniques to insure no one has knowledge of SK0 and BP allows for rapid expansion of SAP and OTP capability throughout all networks. It is envisioned in the future that SAP capability can be widely available through existing infrastructures with internet access such as banks, ATM's, service stations, convenience stores, retail stores, etc. where App software or hardware can be installed. Once installed, SAP operation is enabled through the process above with a SAP mobile smart device, such as a smart phone, downloading the first key and BK to it. Once SAP enabled it becomes a universal SAP access point where a user can just "tap" their smart device with the downloaded App to it and the first key and BK are downloaded from it to enable SAP operation of the user smart device through the short-range communication path as described above. Periodically, the owner of the SAP universal access point(s) will refresh with a new first key and BP with their mobile SAP smart device as described above.

Network devices (such as computers, routers, etc.) can be SAP enabled by downloading the app software and using key cards with a device camera to obtain SK0 and BK or using NFC short range communication to obtain from a SAP phone. These network devices be refreshed on a periodic schedule basis or spontaneously by any authorized user.

9. Smart Phone Application Security

Figure 33:
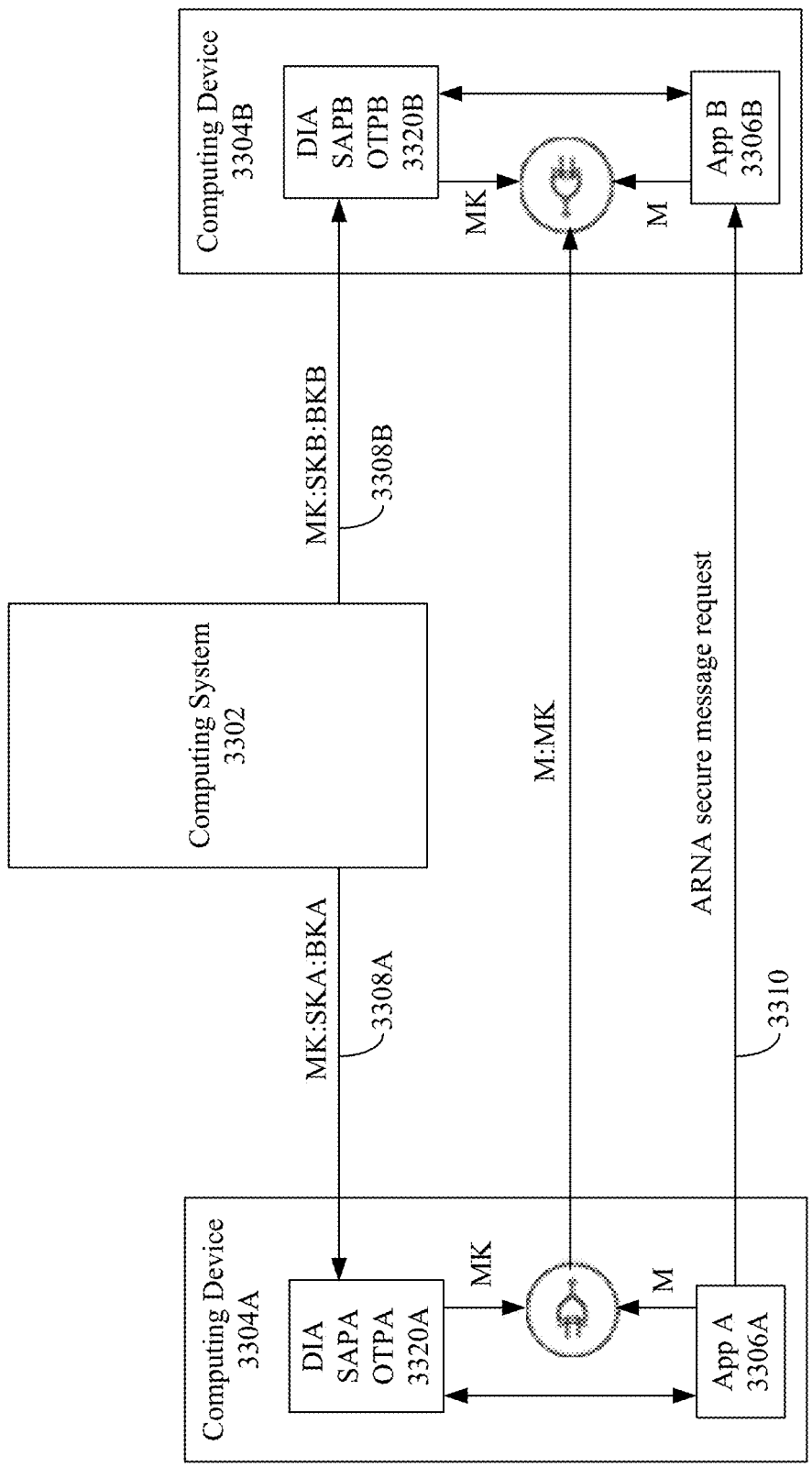
FIG. 33 depicts a block diagram of a system for providing symmetric key encryption for an application installed on a computing device in accordance with an example embodiment.

The following section is described with reference to FIG. 33. FIG. 33 depicts a block diagram of a system 3300 for providing symmetric key encryption for an application installed on a computing device in accordance with an example embodiment. As shown in FIG. 33, system 3300 comprises a computing system 3302, a first computing device 3304A, a second computing device 3304B. Computing system 3302 is an example of computing system 2402, and computing devices 3304A and 3304B are examples of computing device 2404, as respectively described above with reference to FIG. 24. Computing device 3304A comprises a DIA 3320A and an application 3306A, and computing device 3304B comprises a DIA 3320B and an application 3306B. DIAs 3320A and 3320B are examples of DIA 2420, as described above with reference to FIG. 24.

DIAs 3320A and 3320B function as both an SAP and an OTP to supply true random numbers for symmetric key encryption for other installed applications such as Digital Wallet or Secure Messaging (e.g., applications 3306A and 3306B) and as the means of facilitating the delivery of symmetric keys to other SAP OTPs serving as the interface communication channel between applications 3306A and 3306B and computing system 3302 for requesting delivery of such keys for applications 3306A and 3306B described earlier. One application (e.g., application 3306A) would send to the other application (e.g., application 3306B) a secure communication request 3310 by sending the SAP ARNA (e.g., the ARNA of DIA 3320A) to application 3306B, which sends the ARNA and ARNB through DIA 3320B to computing system 3302. Computing system 3302 sends the message key, MK to both DIA 3320A and DIA 3320B via respective messages 3308A and 3308B respectively, to enable encrypted communication as shown. To provide security without passwords applications 3306A and 3306B would maintain last sent Transaction Tacking Link random numbers, described above to authenticate renewed access to the other application.

III. Example Mobile Device and Computer System Implementation

Each of computing system 102, computing device 104, symmetric key engine 108, database 106, QRNG 116, key manager 114, network interface 112, DIA 120 and/or key register 138 of FIG. 1, QRNG 716, key manager 710, rotator 702 and/or encryptor 704 of FIG. 7, computing device 900, DIA 920, user interface 908, decryptor 910, memory 912, key register 938, camera 902, antenna 904, and/or network interface of FIG. 9, computing system 1102, DIAs 1120A and/or 1120B of FIG. 11, computing system 1202, DIAs 1220A and/or 1220B of FIGS. 12A and 12B, databases 1204 and/or 1206 of FIG. 12B, computing system 1302, DIAs 1320A and 1320B and/or database 1304 of FIG. 13, computing system 1402, PoS Reader 1404, DIAs 1420A and 1420B, database 1408 and/or block generator 1424 of FIG. 14, system 1500A (and/or any of the components thereof) of FIG. 15A, computing system 1602, DIAs 1620A and 1620B, QRNGs 1616A and 1616B of FIG. 16, computing system 1702, computing device 1704, VAP 1720, key register 1738, secure voting engine 1708, QRNG 1716, verifier 1714, network interface 1712, and/or database 1706 of FIG. 17, computing system 1902, DIA 1920A, automation application 1920B, database 1906, QRNG 1916 and/or key manager 1914 of FIG. 19, systems 2000, 2100, 2200 and/or 2300 of FIGS. 21-23, computing system 2402, computing device 2404, symmetric key engine 2408, database 2406, QRNG 2416, key manager 2414, network interface 2412, DIA 2420, and/or key register 2438 of FIG. 24, computing device 2800, DIA 2820, shuffler 2846, encryptor 2844, user interface 2808, decryptor 2810, camera 2802, antenna 2804, network interface 2806, memory 2812, and/or key register 2838 of FIG. 28, computing system 3002, DIAs 3020A and 3020B, local key generator 3110A, local key generator 3110B, computing system 3102, and/or DIAs 3120A and 3120B of FIG. 31, mobile devices 3204A and 3204B, XOR gates 3208A-3208C, computing system 3202, and/or computing system(s) 3206 of FIG. 32, computing system 3302, computing devices 3304A and 3304B, DIAs 3320A and 3320B, and/or applications 3306A and 3306B of FIG. 33, and/or any of the components respectively described therein, and flowcharts 500, 600, 800, 1000, 2500, 2600, 2700, and/or 2900 may be implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 34:
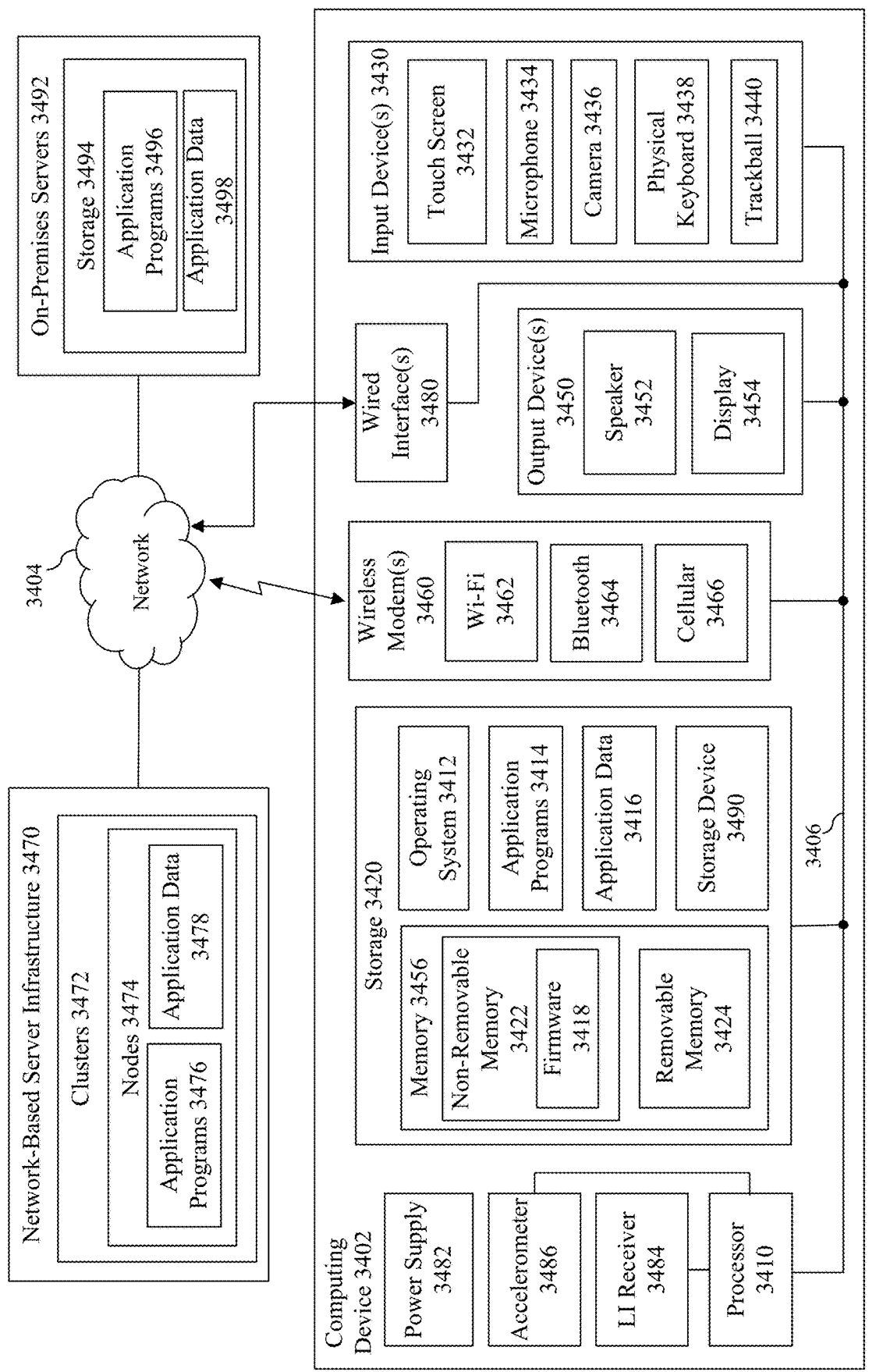
FIG. 34 is a block diagram of an example processor-based computer system that may be used to implement various embodiments.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 34. FIG. 34 shows a block diagram of an exemplary computing environment 3400 that includes a computing device 3402, a network-based server infrastructure 3470, and an on-premises servers 3492. As shown in FIG. 34, computing device 3402, network-based server infrastructure 3470, and on-premises storage 3492 are communicatively coupled via network 3404. Network 3404 comprises one or more networks such as local area networks (LANs), wide area networks (WANs), enterprise networks, the Internet, etc., and may include one or more wired and/or wireless portions. Network 3404 may additional or alternatively include a cellular network for cellular communications.

Embodiments described herein may be implemented in one or more of computing device 3402, network-based server infrastructure 3470, and on-premises servers 3492. For example, in some embodiments, computing device 3402 may be used to implement systems, clients, or devices, or components/subcomponents thereof, disclosed elsewhere herein. In other embodiments, a combination of computing device 3402, network-based server infrastructure 3470, and/or on-premises servers 3492 may be used to implement the systems, clients, or devices, or components/subcomponents thereof, disclosed elsewhere herein. Computing device 3402, network-based server infrastructure 3470, and on-premises storage 3492 are described in detail as follows.

Computing device 3402 can be any of a variety of types of computing devices. For example, computing device 3402 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 3402 may alternatively be a stationary computing device such as a desktop computer, a personal computer (PC), a stationary server device, a minicomputer, a mainframe, a supercomputer, etc.

As shown in FIG. 34, computing device 3402 includes a variety of hardware and software components, including a processor 3410, a storage 3420, one or more input devices 3430, one or more output devices 3450, one or more wireless modems 3460, one or more wired interface(s) 3480, a power supply 3482, a location information (LI) receiver 3484, and an accelerometer 3486. Storage 3420 includes memory 3456, which includes non-removable memory 3422 and removable memory 3424, and a storage device 3490. Storage 3420 also stores an operating system 3412, application programs 3414, and application data 3416. Wireless modem(s) 3460 include a Wi-Fi modem 3462, a Bluetooth modem 3464, and a cellular modem 3466. Output device(s) 3450 includes a speaker 3452 and a display 3454. Input device(s) 3430 includes a touch screen 3432, a microphone 3434, a camera 3436, a physical keyboard 3438, and a trackball 3440. Not all components of computing device 3402 shown in FIG. 34 are present in all embodiments, additional components not shown may be present, and any combination of the components may be present in a particular embodiment. These components of computing device 3402 are described as follows.

A single processor 3410 (e.g., central processing unit (CPU), microcontroller, a microprocessor, signal processor, ASIC (application specific integrated circuit), and/or other physical hardware processor circuit) or multiple processors 3410 may be present in computing device 3402 for performing such tasks as program execution, signal coding, data processing, input/output processing, power control, and/or other functions. Processor 3410 may be a single-core or multi-core processor, and each processor core may be single-threaded or multithreaded (to provide multiple threads of execution concurrently). Processor 3410 is configured to execute program code stored in a computer readable medium, such as program code of operating system 3412 and application programs 3414 stored in storage 3420. Operating system 3412 controls the allocation and usage of the components of computing device 3402 and provides support for one or more application programs 3414 (also referred to as "applications" or "apps"). Application programs 3414 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 3402 can communicate with any other component according to function, although not all connections are shown for ease of illustration. For instance, as shown in FIG. 34, bus 3406 is a multiple signal line communication medium (e.g., conductive traces in silicon, metal traces along a motherboard, wires, etc.) that may be present to communicatively couple processor 3410 to various other components of computing device 3402, although in other embodiments, an alternative bus, further busses, and/or one or more individual signal lines may be present to communicatively couple components. Bus 3406 represents one or more of any of several types of bus structures, including a memory bus or memory controller, a peripheral bus, an accelerated graphics port, and a processor or local bus using any of a variety of bus architectures.

Storage 3420 is physical storage that includes one or both of memory 3456 and storage device 3490, which store operating system 3412, application programs 3414, and application data 3416 according to any distribution. Non-removable memory 3422 includes one or more of RAM (random access memory), ROM (read only memory), flash memory, a hard disk (e.g., a magnetic disk drive for reading from and writing to a hard disk), and/or other physical memory device type. Non-removable memory 3422 may include main memory and may be separate from or fabricated in a same integrated circuit as processor 3410. As shown in FIG. 34, non-removable memory 3422 stores firmware 3418, which may be present to provide low-level control of hardware. Examples of firmware 3418 include BIOS (Basic Input/Output System, such as on personal computers) and boot firmware (e.g., on smart phones). Removable memory 3424 may be inserted into a receptacle of or otherwise coupled to computing device 3402 and can be removed by a user from computing device 3402. Removable memory 3424 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 3490 may be present that are internal and/or external to a housing of computing device 3402 and may or may not be removable. Examples of storage device 3490 include a hard disk drive, a solid-state drive (SSD), a thumb drive (e.g., a USB (Universal Serial Bus) flash drive), or other physical storage device.

One or more programs may be stored in storage 3420. Such programs include operating system 3412, one or more application programs 3414, and other program modules and program data. Examples of such application programs may include, for example, computer program logic (e.g., computer program code/instructions) for implementing one or more of symmetric key engine 108, database 106, QRNG 116, key manager 114, and/or DIA 120 of FIG. 1, QRNG 716, key manager 710, rotator 702 and/or encryptor 704 of FIG. 7, DIA 920, user interface 908, decryptor 910, and/or camera 902 of FIG. 9, DIAs 1120A and/or 1120B of FIG. 11, DIAs 1220A and/or 1220B of FIGS. 12A and 12B, databases 1204 and/or 1206 of FIG. 12B, DIAs 1320A and 1320B and/or database 1304 of FIG. 13, PoS Reader 1404, DIAs 1420A and 1420B, database 1408 and/or block generator 1424 of FIG. 14, system 1500A (and/or any of the components thereof) of FIG. 15A, DIAs 1620A and 1620B, QRNGs 1616A and 1616B of FIG. 16, VAP 1720, key register 1738, secure voting engine 1708, QRNG 1716, verifier 1714, and/or database 1706 of FIG. 17, DIA 1920A, automation application 1920B, database 1906, QRNG 1916 and/or key manager 1914 of FIG. 19, systems 2000, 2100, 2200 and/or 2300 of FIGS. 21-23, symmetric key engine 2408, database 2406, QRNG 2416, key manager 2414, and/or DIA 2420 of FIG. 24, DIA 2820, shuffler 2846, encryptor 2844, user interface 2808, decryptor 2810, and/or camera 2802 of FIG. 28, DIAs 3020A and 3020B, local key generator 3110A, local key generator 3110B, and/or DIAs 3120A and 3120B of FIG. 31, DIAs 3320A and 3320B, and/or applications 3306A and 3306B of FIG. 33, and/or any of the components respectively described therein, and flowcharts 500, 600, 800, 1000, 2500, 2600, 2700, and/or 2900 described herein, including portions thereof, and/or further examples described herein.

Storage 3420 also stores data used and/or generated by operating system 3412 and application programs 3414 as application data 3416. Examples of application data 3416 include web pages, text, images, tables, sound files, video data, and other data, which may also be sent to and/or received from one or more network servers or other devices via one or more wired or wireless networks. Storage 3420 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 3402 through one or more input devices 3430 and may receive information from computing device 3402 through one or more output devices 3450. Input device(s) 3430 may include one or more of touch screen 3432, microphone 3434, camera 3436, physical keyboard 3438 and/or trackball 3440 and output device(s) 3450 may include one or more of speaker 3452 and display 3454. Each of input device(s) 3430 and output device(s) 3450 may be integral to computing device 3402 (e.g., built into a housing of computing device 3402) or external to computing device 3402 (e.g., communicatively coupled wired or wirelessly to computing device 3402 via wired interface(s) 3480 and/or wireless modem(s) 3460). Further input devices 3430 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 3454 may display information, as well as operating as touch screen 3432 by receiving user commands and/or other information (e.g., by touch, finger gestures, virtual keyboard, etc.) as a user interface. Any number of each type of input device(s) 3430 and output device(s) 3450 may be present, including multiple microphones 3434, multiple cameras 3436, multiple speakers 3452, and/or multiple displays 3454.

One or more wireless modems 3460 can be coupled to antenna(s) (not shown) of computing device 3402 and can support two-way communications between processor 3410 and devices external to computing device 3402 through network 3404, as would be understood to persons skilled in the relevant art(s). Wireless modem 3460 is shown generically and can include a cellular modem 3466 for communicating with one or more cellular networks, such as a GSM network for data and voice communications within a single cellular network, between cellular networks, or between the mobile device and a public switched telephone network (PSTN). Wireless modem 3460 may also or alternatively include other radio-based modem types, such as a Bluetooth modem 3464 (also referred to as a "Bluetooth device") and/or Wi-Fi 3462 modem (also referred to as an "wireless adaptor"). Wi-Fi modem 3462 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 3402 can further include power supply 3482, LI receiver 3484, accelerometer 3486, and/or one or more wired interfaces 3480. Example wired interfaces 3480 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 3480 of computing device 3402 provide for wired connections between computing device 3402 and network 3404, or between computing device 3402 and one or more devices/peripherals when such devices/peripherals are external to computing device 3402 (e.g., a pointing device, display 3454, speaker 3452, camera 3436, physical keyboard 3438, etc.). Power supply 3482 is configured to supply power to each of the components of computing device 3402 and may receive power from a battery internal to computing device 3402, and/or from a power cord plugged into a power port of computing device 3402 (e.g., a USB port, an A/C power port). LI receiver 3484 may be used for location determination of computing device 3402 and may include a satellite navigation receiver such as a Global Positioning System (GPS) receiver or may include other type of location determiner configured to determine location of computing device 3402 based on received information (e.g., using cell tower triangulation, etc.). Accelerometer 3486 may be present to determine an orientation of computing device 3402.

Note that the illustrated components of computing device 3402 are not required or all-inclusive, and fewer or greater numbers of components may be present as would be recognized by one skilled in the art. For example, computing device 3402 may also include one or more of a gyroscope, barometer, proximity sensor, ambient light sensor, digital compass, etc. Processor 3410 and memory 3456 may be co-located in a same semiconductor device package, such as being included together in an integrated circuit chip, FPGA, or system-on-chip (SOC), optionally along with further components of computing device 3402.

In embodiments, computing device 3402 is configured to implement any of the above-described features of flowcharts herein. Computer program logic for performing any of the operations, steps, and/or functions described herein may be stored in storage 3420 and executed by processor 3410.

In some embodiments, server infrastructure 3470 may be present. Server infrastructure 3470 may be a network-accessible server set (e.g., a cloud-based environment or platform). As shown in FIG. 34, server infrastructure 3470 includes clusters 3472. Each of clusters 3472 may comprise a group of one or more compute nodes and/or a group of one or more storage nodes. For example, as shown in FIG. 34, cluster 3472 includes nodes 3474. Each of nodes 3474 are accessible via network 3404 (e.g., in a "cloud-based" embodiment) to build, deploy, and manage applications and services. Any of nodes 3474 may be a storage node that comprises a plurality of physical storage disks, SSDs, and/or other physical storage devices that are accessible via network 3404 and are configured to store data associated with the applications and services managed by nodes 3474. For example, as shown in FIG. 34, nodes 3474 may store application data 3478.

Each of nodes 3474 may, as a compute node, comprise one or more server computers, server systems, and/or computing devices. For instance, a node 3474 may include one or more of the components of computing device 3402 disclosed herein. Each of nodes 3474 may be configured to execute one or more software applications (or "applications") and/or services and/or manage hardware resources (e.g., processors, memory, etc.), which may be utilized by users (e.g., customers) of the network-accessible server set. For example, as shown in FIG. 34, nodes 3474 may operate application programs 3476. In an implementation, a node of nodes 3474 may operate or comprise one or more virtual machines, with each virtual machine emulating a system architecture (e.g., an operating system), in an isolated manner, upon which applications such as application programs 3476 may be executed.

In an embodiment, one or more of clusters 3472 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 3472 may be a datacenter in a distributed collection of datacenters. In embodiments, exemplary computing environment 3400 comprises part of a cloud-based platform such as Amazon Web Services® of Amazon Web Services, Inc. or Google Cloud Platform™ of Google LLC, although these are only examples and are not intended to be limiting.

In an embodiment, computing device 3402 may access application programs 3476 for execution in any manner, such as by a client application and/or a browser at computing device 3402. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 3402 may additionally and/or alternatively synchronize copies of application programs 3414 and/or application data 3416 to be stored at network-based server infrastructure 3470 as application programs 3476 and/or application data 3478. For instance, operating system 3412 and/or application programs 3414 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 3420 at network-based server infrastructure 3470.

In some embodiments, on-premises servers 3492 may be present. On-premises servers 3492 are hosted within an organization's infrastructure and, in many cases, physically onsite of a facility of that organization. On-premises servers 3492 are controlled, administered, and maintained by IT (Information Technology) personnel of the organization or an IT partner to the organization. Application data 3498 may be shared by on-premises servers 3492 between computing devices of the organization, including computing device 3402 (when part of an organization) through a local network of the organization, and/or through further networks accessible to the organization (including the Internet). Furthermore, on-premises servers 3492 may serve applications such as application programs 3496 to the computing devices of the organization, including computing device 3402. Accordingly, on-premises servers 3492 may include storage 3494 (which includes one or more physical storage devices such as storage disks and/or SSDs) for storage of application programs 3496 and application data 3498 and may include one or more processors for execution of application programs 3496. Still further, computing device 3402 may be configured to synchronize copies of application programs 3414 and/or application data 3416 for backup storage at on-premises servers 3492 as application programs 3496 and/or application data 3498.

As used herein, the terms "computer program medium," "computer-readable medium," and "computer-readable storage medium," etc., are used to refer to physical hardware media. Examples of such physical hardware media include any hard disk, magnetic disk, optical disk, other physical hardware media such as RAMs, ROMs, flash memory, digital video disks, zip disks, MEMs (microelectronic machine) memory, nanotechnology-based storage devices, and further types of physical/tangible hardware storage media of storage 3420. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 3414) may be stored in storage 3420. Such computer programs may also be received via wired interface(s) 3480 and/or wireless modem(s) 3460 over network 3404. Such computer programs, when executed or loaded by an application, enable computing device 3402 to implement features of embodiments discussed herein. Accordingly, such computer programs represent controllers of the computing device 3402.

Embodiments are also directed to computer program products comprising computer code or instructions stored on any computer-readable medium or computer-readable storage medium. Such computer program products include the physical storage of storage 3420 as well as further physical storage types.

IV. Further Example Embodiments

A method performed by an application executing on a computing device is described herein. The method includes: receiving a first globally-unique value of a plurality of globally-unique values via a user interface of an application executing on the computing device, the first globally-unique value, a second globally-unique value of the plurality, and a third globally-unique value of the plurality being physically implemented as a first machine-readable format, a second machine-readable format, and a third machine-readable format, respectively; providing, via a network, the first globally-unique value and an application identifier associated with the application to a computing system, the computing system configured to determine the second globally-unique value and the third globally-unique value based on the application identifier; receiving the second globally-unique value via the user interface of the application; designating the second globally-unique value as a first secure key; storing the first secure key in a first location of a memory of the computing device allocated for the application; receiving the third globally-unique value via the user interface of the application; and designating the third globally-unique value as a buffer key.

In an implementation of the method, the first machine-readable format is a first quick response code, the second machine-readable format is a second quick response code, and the third machine-readable format is a third quick response code.

In an implementation of the method, said receiving the first globally-unique value via the user interface comprises: capturing the first quick response code via the application; and decoding the first quick response code to obtain the first globally-unique value; said receiving the second globally-unique value via the user interface comprises: capturing the second quick response code via the application, and decoding the second quick response code to obtain the second globally-unique value; and said receiving the third globally-unique value via the user interface comprises: capturing the third quick response code via the application, and decoding the third quick response code to obtain the third globally-unique value.

In an implementation of the method, the method further comprises: storing the buffer key in a second location of the memory of the computing device allocated for the application.

In an implementation of the method, the method further comprises: receiving, via the network, a command from the computing system that instructs the application to perform a key flush operation to replace the first secure key stored in the first location of the memory with another secure key; and replacing the first secure key with the other secure key in accordance with the key flush operation.

In an implementation of the method, the key flush operation comprises: generating a first encoded key based on at least the buffer key; receiving, via the network, an encrypted second secure key from the computing system; decrypting the encrypted second secure key using the first encoded key; bit shuffling the buffer key based on the decrypted second secure key; generating a second encoded key based on at least the bit-shuffled buffer key; receiving, via the network, an encrypted third secure key from the computing system; and decrypting the encrypted third secure key using the bit-shuffled buffer key.

In an implementation of the method, the method further comprises: storing in the decrypted third secure key in the first location of the memory, the decrypted third secure key being the other secure key that replaces the first secure key.

A method performed by a computing system is also described herein. The method includes: generating a plurality of globally-unique values comprising a first globally-unique value, second globally-unique value, and a third globally-unique value; storing the plurality of globally-unique values in a database of the computing system, each of the plurality of globally-unique values also being physically implemented as a machine-readable format; associating, in the database, the first globally-unique value with the second globally-unique value and the third globally-unique value; receiving, via a network, one of the plurality of globally-unique values from an application executing on a computing device that reads the one of the plurality of globally-unique values from the physically-implemented machine-readable format; designating the second globally-unique value associated with the globally-unique value as a first secure key for the application; and designating the third globally-unique value associated with the globally-unique value as a buffer key for the application.

In an implementation of the method, each of the plurality of globally-unique values are randomly-generated values.

In an implementation of the method, the randomly-generated values are generated by a quantum random number generator.

In an implementation of the method, the method further comprises: generating a first encoded key based on at least the buffer key; generating a second secure key; sending to the application, via the network, the second secure key encrypted using the first encoded key; bit shuffling the buffer key based on an unencrypted version of the second secure key; generating a third secure key; generating a second encoded key based on the bit-shuffled buffer key and the third secure key; generating a fourth secure key; and sending to the application, via the network, the fourth secure key encrypted using the second encoded key.

In an implementation of the method, generating a second encoded key comprises: performing a bit-wise XOR operation on the bit-shuffled buffer key and the third secure key.

A system is further described herein. The system includes: at least one processor circuit; and at least one memory stores program code that, when executed by the at least one processor circuit, perform operations, the operations comprising: generating a plurality of globally-unique values comprising a first globally-unique value, second globally-unique value, and a third globally-unique value; storing the plurality of globally-unique values in a database of the computing system, each of the plurality of globally-unique values also being physically implemented as a machine-readable format; associating, in the database, the first globally-unique value with the second globally-unique value and the third globally-unique value; receiving, via a network, one of the plurality of globally-unique values from an application executing on a computing device that reads the one of the plurality of globally-unique values from the physically-implemented machine-readable format; designating the second globally-unique value associated with the globally-unique value as a first secure key for the application; and designating the third globally-unique value associated with the globally-unique value as a buffer key for the application.

In an implementation of the system, each of the plurality of globally-unique values are randomly-generated values.

In an implementation of the system, the randomly-generated values are generated by a quantum random number generator.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A method performed by an application executing on a computing device, comprising:
    receiving a first globally-unique value of a plurality of globally-unique values via a user interface of an application executing on the computing device, the first globally-unique value, a second globally-unique value of the plurality, and a third globally-unique value of the plurality being physically implemented as a first machine-readable format, a second machine-readable format, and a third machine-readable format, respectively;
    providing, via a network, the first globally-unique value and an application identifier associated with the application to a computing system, the computing system configured to determine the second globally-unique value and the third globally-unique value based on the application identifier;
    receiving the second globally-unique value via the user interface of the application;
    designating the second globally-unique value as a first secure key;
    storing the first secure key in a first location of a memory of the computing device allocated for the application;
    receiving the third globally-unique value via the user interface of the application; and
    designating the third globally-unique value as a buffer key.

2. The method of claim 1, wherein the first machine-readable format is a first quick response code, wherein the second machine-readable format is a second quick response code, and wherein the third machine-readable format is a third quick response code.

3. The method of claim 2, wherein said receiving the first globally-unique value via the user interface comprises:
    capturing the first quick response code via the application; and
    decoding the first quick response code to obtain the first globally-unique value;
    wherein said receiving the second globally-unique value via the user interface comprises:
        capturing the second quick response code via the application, and
        decoding the second quick response code to obtain the second globally-unique value; and
    wherein said receiving the third globally-unique value via the user interface comprises:
        capturing the third quick response code via the application, and
        decoding the third quick response code to obtain the third globally-unique value.

4. The method of claim 1, further comprising:
    storing the buffer key in a second location of the memory of the computing device allocated for the application.

5. The method of claim 1, further comprising:
    receiving, via the network, a command from the computing system that instructs the application to perform a key flush operation to replace the first secure key stored in the first location of the memory with another secure key; and
    replacing the first secure key with the other secure key in accordance with the key flush operation.

6. The method of claim 5, wherein key flush operation comprises:
    generating a first encoded key based on at least the buffer key;
    receiving, via the network, an encrypted second secure key from the computing system;
    decrypting the encrypted second secure key using the first encoded key;
    bit shuffling the buffer key based on the decrypted second secure key;
    generating a second encoded key based on at least the bit-shuffled buffer key;
    receiving, via the network, an encrypted third secure key from the computing system; and
    decrypting the encrypted third secure key using the bit-shuffled buffer key.

7. The method of claim 6, further comprising:
    storing the decrypted third secure key in the first location of the memory, the decrypted third secure key being the other secure key that replaces the first secure key.

8. A method performed by a computing system, comprising:
    generating a plurality of globally-unique values comprising a first globally-unique value, second globally-unique value, and a third globally-unique value;
    storing the plurality of globally-unique values in a database of the computing system, each of the plurality of globally-unique values also being physically implemented as a machine-readable format;
    associating, in the database, the first globally-unique value with the second globally-unique value and the third globally-unique value;
    receiving, via a network, one of the plurality of globally-unique values from an application executing on a computing device that reads the one of the plurality of globally-unique values from the physically-implemented machine-readable format;
    designating the second globally-unique value associated with the globally-unique value as a first secure key for the application; and designating the third globally-unique value associated with the globally-unique value as a buffer key for the application.

9. The method of claim 8, wherein each of the plurality of globally-unique values are randomly-generated values.

10. The method of claim 9, wherein the randomly-generated values are generated by a quantum random number generator.

11. The method of claim 8, further comprising:

generating a first encoded key based on at least the buffer key;

generating a second secure key;

sending to the application, via the network, the second secure key encrypted using the first encoded key;

bit shuffling the buffer key based on an unencrypted version of the second secure key;

generating a third secure key;

generating a second encoded key based on the bit-shuffled buffer key and the third secure key;

generating a fourth secure key; and sending to the application, via the network, the fourth secure key encrypted using the second encoded key.

12. The method of claim 11, wherein generating a second encoded key comprises:

performing a bit-wise XOR operation on the bit-shuffled buffer key and the third secure key.

13. A system, comprising:

at least one processor circuit; and at least one memory stores program code that, when executed by the at least one processor circuit, perform operations, the operations comprising:

generating a plurality of globally-unique values comprising a first globally-unique value, second globally-unique value, and a third globally-unique value;

storing the plurality of globally-unique values in a database of the computing system, each of the plurality of globally-unique values also being physically implemented as a machine-readable format;

associating, in the database, the first globally-unique value with the second globally-unique value and the third globally-unique value;

receiving, via a network, one of the plurality of globally-unique values from an application executing on a computing device that reads the one of the plurality of globally-unique values from the physically-implemented machine-readable format;

designating the second globally-unique value associated with the globally-unique value as a first secure key for the application; and designating the third globally-unique value associated with the globally-unique value as a buffer key for the application.

14. The system of claim 13, wherein each of the plurality of globally-unique values are randomly-generated values.

15. The system of claim 14, wherein the randomly-generated values are generated by a quantum random number generator.

* * * * *